(12) United States Patent
Jones et al.

(10) Patent No.: US 7,004,384 B2
(45) Date of Patent: Feb. 28, 2006

(54) ATM CURRENCY DISPENSER WITH BELT TENSIONING ARRANGEMENT

(75) Inventors: Brian Jones, Navarre, OH (US); H. Thomas Graef, Bolivar, OH (US); Michael Harty, North Canton, OH (US); Michael S. Johnson, Clinton, OH (US); Kenneth Kontor, Chesterland, OH (US)

(73) Assignee: Diebold Self-Service Systems division of Diebold, Incorporated, North Canton, OH (US)

( * ) Notice: Subject to any disclaimer, the term of this patent is extended or adjusted under 35 U.S.C. 154(b) by 0 days.

(21) Appl. No.: 10/797,403

(22) Filed: Mar. 9, 2004

(65) Prior Publication Data

US 2004/0178263 A1    Sep. 16, 2004

Related U.S. Application Data

(60) Provisional application No. 60/453,609, filed on Mar. 10, 2003.

(51) Int. Cl.
    *G06F 17/60*    (2006.01)

(52) U.S. Cl. ........................................ 235/379; 705/43

(58) Field of Classification Search ................ 235/379; 902/12–15; 705/43; 271/3.14, 12
    See application file for complete search history.

(56) References Cited

U.S. PATENT DOCUMENTS

| | | | | |
|---|---|---|---|---|
| 5,039,086 A | * | 8/1991 | Matsuno et al. | 271/227 |
| 5,850,075 A | * | 12/1998 | Brannan et al. | 235/379 |
| 6,032,948 A | * | 3/2000 | Peebles et al. | 271/224 |
| 6,276,603 B1 | * | 8/2001 | Patterson | 235/379 |
| 6,371,473 B1 | * | 4/2002 | Saltsov et al. | 271/3.01 |
| 6,398,108 B1 | * | 6/2002 | Swinton et al. | 235/379 |
| 6,443,442 B1 | * | 9/2002 | Willis et al. | 271/11 |
| 6,510,985 B1 | * | 1/2003 | Clark et al. | 235/379 |
| 6,685,183 B1 | * | 2/2004 | Kim | 271/114 |

* cited by examiner

*Primary Examiner*—Thien M. Le
*Assistant Examiner*—Edwyn Labaze
(74) *Attorney, Agent, or Firm*—Daniel D. Wasil; Ralph E. Jocke; Walker & Jocke

(57) ABSTRACT

An ATM includes a currency note dispenser having a currency cassette, a note picker, a note transporter, and a note presenter. A cassette tambour door automatically opens during insertion of the cassette into the dispenser. The picker can pick notes through the opening. A spring loaded housing wall tab retains the picker shaft in mating connection with a drive pin. The transporter can move notes vertically and horizontally. The transporter includes belts between an idle shaft and a drive shaft. The idle shaft is vertically movable relative to a drive shaft to maintain belt tension. The transporter also includes convexly tapered rollers that automatically recenter a loose belt. A presenter gate is at a note dispensing outlet of the ATM. The gate is opened by actuating a lever linked with an arm connected to the gate. The gate opens by moving a pin upward in an angled slot.

20 Claims, 48 Drawing Sheets

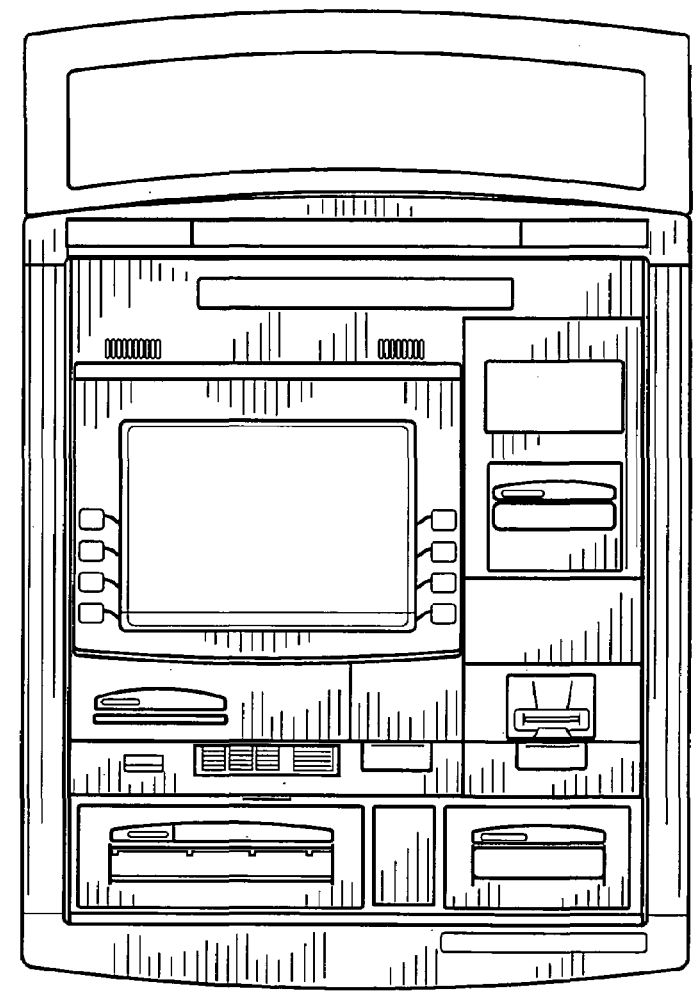

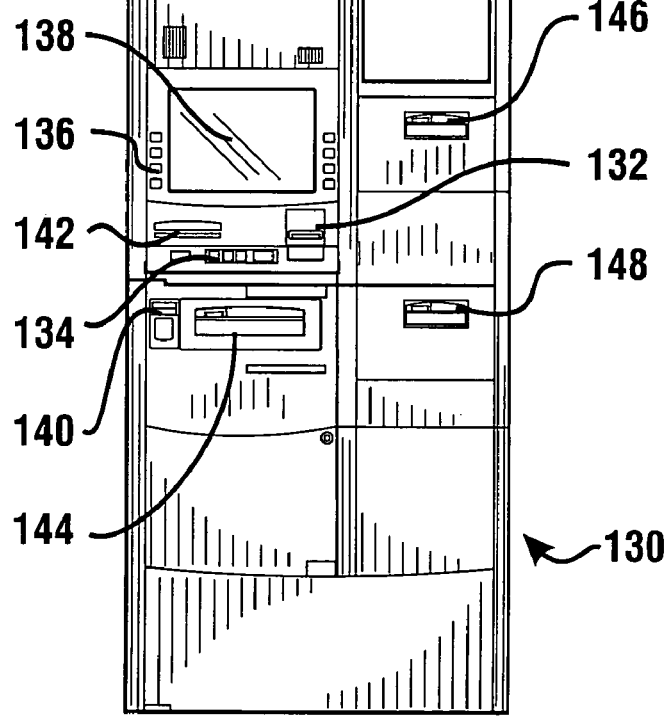

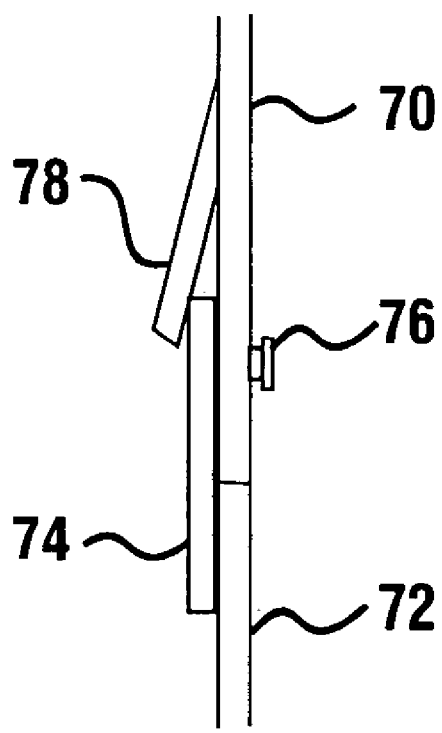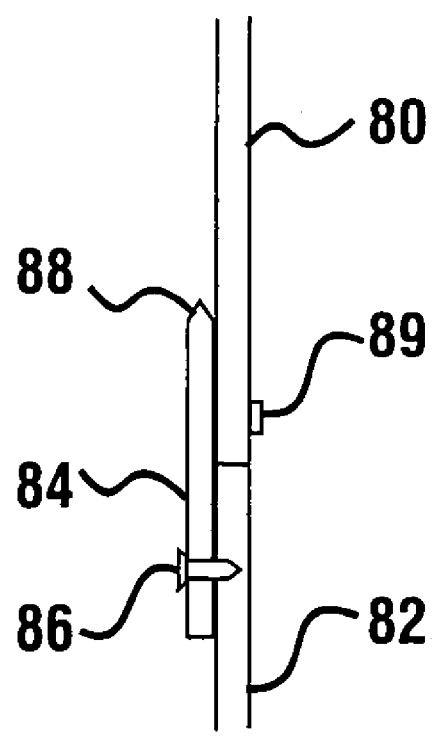
FIG. 15  FIG. 16

ATM CURRENCY DISPENSER WITH BELT TENSIONING ARRANGEMENT

CROSS REFERENCE TO RELATED APPLICATIONS

This application claims the benefit of U.S. Provisional Application No. 60/453,609 filed Mar. 10, 2003, and the disclosure thereof is incorporated herein by reference.

TECHNICAL FIELD

This invention relates to automated banking machines.

BACKGROUND ART

Automated banking machines are known in the prior art. One type of automated banking machine, known as an automated teller machine (ATM), allows a bank customer to conduct banking transactions without the necessity of a banking employee directly taking part. Such transactions might include making deposits to accounts, checking balances, transferring funds, obtaining a cash withdrawal, or obtaining other items. As used herein, the phrase automated banking machine (or automated transaction machine) is not intended to limit the scope of the disclosure, but may include any type of device that enables automating transactions involving transfers representative of value.

Other types of automated banking machines may be used to dispense currency to a customer, bank teller, cashier or other service provider. Automated banking machines may be used to dispense various types of items to customers. Some types of automated banking machines may dispense items such as tickets, coupons, vouchers, or other items of value. Automated banking machines generally store a multitude of such items in a fashion enabling the machine to quickly deliver one or more items without error. Some automated banking machines may accept deposits in the form of envelopes, checks, cash, or other items. Some automated banking machines may be used for providing credit, making bill payments, or to debit or deposit funds in various accounts.

The devices enabling storage and delivery of the sheet items may at times require replenishing, maintenance, or repair. In automated banking machines such as those made by Diebold, Incorporated, the assignee of the present invention, sheet items that are dispensed are generally held in cassettes. The cassettes are enabled to be replaced by authorized personnel who have gained access to a secure chest portion of the machine which houses the cassettes. This enables authorized personnel to quickly replenish items to be dispensed. This can be done by replacing the cassettes or by removing the cassettes, adding sheets thereto and reinstalling the cassettes.

While replenishing sheet items may readily be accomplished, it is sometimes necessary to conduct more extensive maintenance or repair activities. In the event repair or replacement of certain components of the machine are necessary, the sheet dispenser assembly may need to be removed from the housing. The weight and delicate nature of some components of the sheet dispenser assembly can make removal and reinstallation of the dispenser mechanism difficult. The dispenser mechanism may also include a number of stacked dispenser modules for storing and selectively dispensing documents stored in the cassettes. The stacked dispenser modules may also need to be disassembled. Very accurate positioning and alignment of dispenser mechanism components are often required for proper operation of the machine, which necessitates care during reinstallation. The proper alignment and securement of stacked dispenser modules are also required. All of these requirements add to the difficulty in servicing the dispenser mechanism.

DISCLOSURE OF INVENTION

Thus there exists a need for an apparatus and method for more easily and/or efficiently operating, removing, disassembling, and reinstalling a sheet dispenser assembly of an automated banking machine to facilitate operation and servicing of components of the machine.

It is an object of an exemplary form of the present invention to provide a dispenser assembly for an automated banking machine.

It is a further object of an exemplary form of the present invention to provide a stackable dispenser module for an automated banking machine.

It is a further object of an exemplary form of the present invention to provide a stackable multimedia dispenser module for an automated banking machine.

It is a further object of an exemplary form of the present invention to provide a dispenser module which can be locked to another dispenser module in stacked relation.

It is a further object of an exemplary form of the present invention to provide a dispenser module which can be locked to another dispenser module in aligned relation.

It is a further object of an exemplary form of the present invention to provide a multimedia dispenser module which can be locked to another dispenser module in stacked and aligned relation for use in an automated banking machine.

It is a further object of an exemplary form of the present invention to provide an apparatus which enables a sheet dispenser of an automated banking machine to be more readily serviced.

It is a further object of an exemplary form of the present invention to provide a method of servicing an automated banking machine.

It is a further object of an exemplary form of the present invention to provide a method of assembling dispenser modules into locked and stacked relation for a sheet dispenser arrangement of an automated banking machine.

It is a further object of an exemplary form of the present invention to provide a method of disassembling dispenser modules from a locked and stacked relation.

It is a further object of an exemplary form of the present invention to provide a method of servicing a sheet dispenser of an automated banking machine that reduces the time and cost of removing and reinstalling dispenser modules.

It is a further object of an exemplary form of the present invention to provide an advanced function dispenser (AFD) having one or more dispenser mechanisms operative to transport media such as currency notes.

It is a further object of an exemplary form of the present invention to provide a cassette door and interlocking pin arrangement.

It is a further object of an exemplary form of the present invention to provide a picker shaft and drive pin releasable connection.

It is a further object of an exemplary form of the present invention to provide a spring loaded wall tab that is able to retain a picker shaft in connection with a drive pin.

It is a further object of an exemplary form of the present invention to provide wire holders formed in a dispenser module wall.

It is a further object of an exemplary form of the present invention to provide a sheet transporter including belts on an idler shaft and a drive shaft, with the idler shaft biased away from the drive shaft to maintain the belts in tension.

It is a further object of an exemplary form of the present invention to provide a sheet transporter including belts trapped in a sheet stack push plate, with the belts supported on crowned rollers.

It is a further object of an exemplary form of the present invention to provide a presenter gate arrangement, including a cam actuated movable gate, and a flexible rail to roller relationship operative to generate a wavy configuration to sheets exiting the presenter.

Further objects of exemplary forms of the present invention will be made apparent in the following Best Mode for Carrying Out Invention and the appended claims.

The foregoing objects are accomplished in an exemplary form of the invention which involves an automated banking machine dispenser. An exemplary dispenser can have a currency cassette, a note picker, a note transporter, and a note presenter. A cassette door can automatically open during insertion of the cassette into the dispenser. The picker can pick notes through the opening. A picker shaft can be held in biased mating engagement with a drive pin. The transporter can move notes in perpendicular directions (e.g., vertically and horizontally). The transporter can include an idle shaft and a drive shaft with belts therebetween. The idle shaft can be movable relative to a drive shaft to maintain belt tension. The transporter can also include tapered rollers that assist in centering a belt thereon. The presenter can have a gate adjacent a note dispensing outlet. The gate can be opened by actuating a lever linked with an arm in operative connection with the gate. The lever and arm linking can include a pin relatively movable in a slot.

The dispenser can include dispenser modules which house valuable documents or sheets (e.g., items). The items may include for example, currency, coupons, tickets, scrip, vouchers, and phone cards. The dispenser modules include structure which permits their securement to each other in stacked and aligned relation. Each module includes a pair of side walls. Each module includes a projection plate and a biasing latch arm on each side wall. The projection plates can be attached to the side walls. The latches can be cut out from the sidewalls. Each projection plate includes a pin. Each side wall includes a slot adapted to receive a pin.

Biasing tabs can also be cut out from the sidewalls. The tabs can be used to guide and retain the projection plates during the secured stacking of the modules.

During a stacking assembly the plates are operative to compress the latches. The latches are arranged to snap outward once a plate has slid beyond latch compression and toward alignment of the module. Once a latch has snapped outward the plate is no longer permitted to move in the opposite direction to again compress the latch.

Adjacent modules can be locked to each other due to latches preventing the movement of pins from slots. That is, the projection plates are prevented from movement in a first direction, because the pins would engage the side walls, and from movement in a second opposite direction, because the projection plates would engage the latches. The tabs can also be used to retain the pins in the slots.

Modules can be unlocked by compressing the latches, such as with a tool, to allow movement of the modules relative to each other.

Having easier ability to securely align and stack dispenser modules can facilitate repairs and/or replacement of dispenser mechanism components and/or automated banking machine components by service personnel. Sometimes it is desirable or necessary to entirely remove and disassemble the dispenser mechanism from the machine for service or replacement. The present invention provides a method of disassembling and/or assembling stacked dispenser modules to facilitate repair or replacement. The exemplary method of the invention also facilitates installation of new or refilled dispenser modules in the machine. Existing dispenser mechanisms for automated banking machines may also be retrofit with dispenser modules of an exemplary form of the invention.

BRIEF DESCRIPTION OF DRAWINGS

FIGS. 3, 4, and 5 show respective front, top, and side views of the machine of FIG. 2.

FIG. 6 shows a further alternative form of an automated banking machine.

FIGS. 7 and 8 show respective top and side views of the machine of FIG. 6.

FIG. 15 shows a partial end view of adjacent side walls of connected dispenser modules.

FIG. 16 shows an alternative end view of side walls of connected dispenser modules.

BEST MODE FOR CARRYING OUT INVENTION

Figure 1:
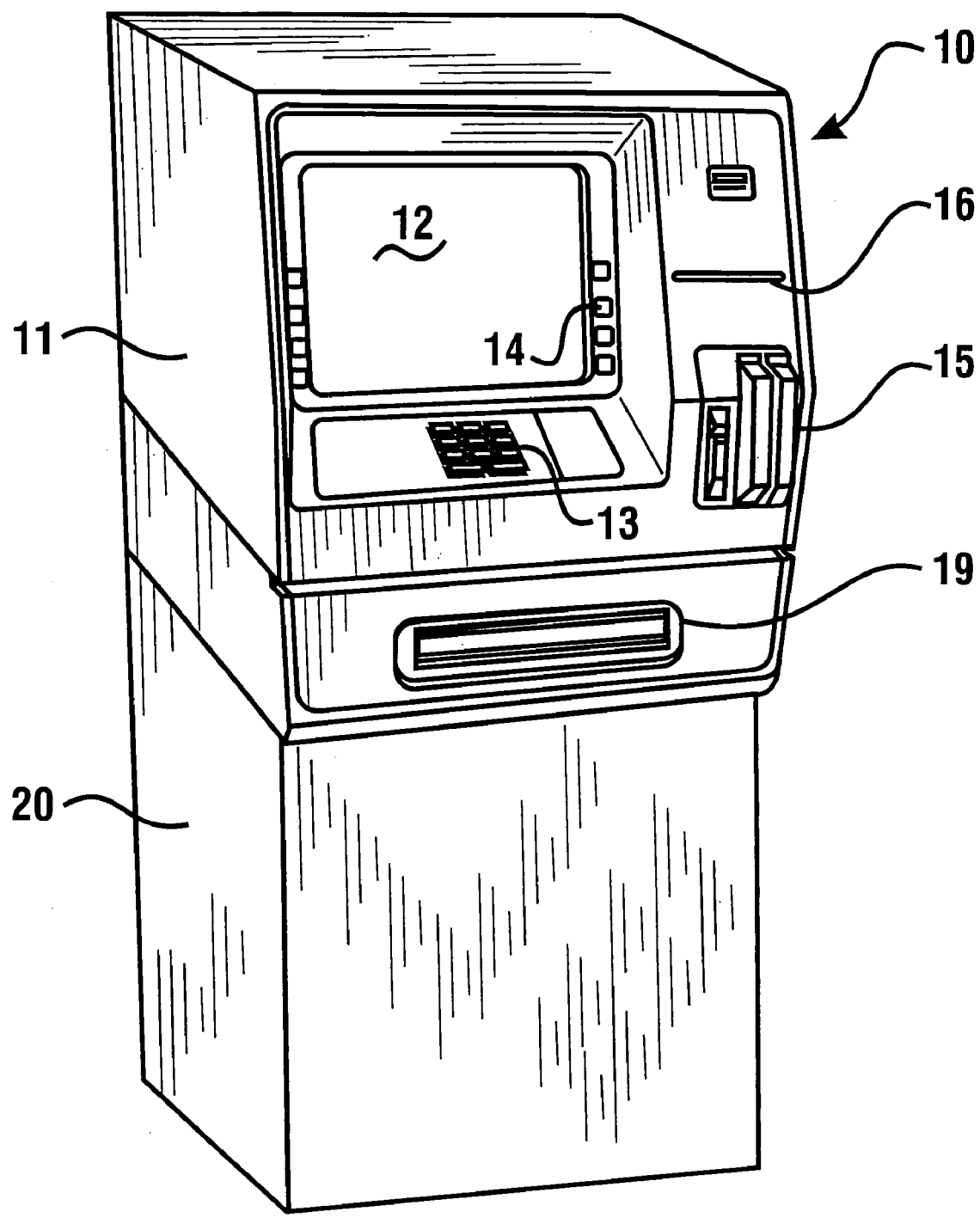
FIG. 1 is an isometric view of an automated banking machine.

Referring now to the drawings and particularly to FIG. 1 there is shown therein an automated banking machine, generally indicated by numeral 10, used in connection with an exemplary from of the present invention. The automated banking machine 10 can be an automated teller machine (ATM). The automated banking machine 10 includes a customer interface portion (e.g., fascia) and a document delivery portion.

The customer interface portion can be supported by an upper housing 11 and/or a lower housing 20, such as by attachment to the upper housing 11. The interface portion can include a display 12, such as a CRT screen or other output devices for providing outputs such as visual messages and prompts to a customer or user. The interface can also include input devices, such as a keypad 13, function buttons 14, and a card reader 15. The customer fascia can also include a receipt outlet 16 and may include other or different transaction function devices.

A document delivery portion of the machine 10 can be contained within a secure chest or lower housing 20. An opening 19 can be provided for delivery of sheets, such as currency notes, or other items to a user of the machine.

Figure 2:
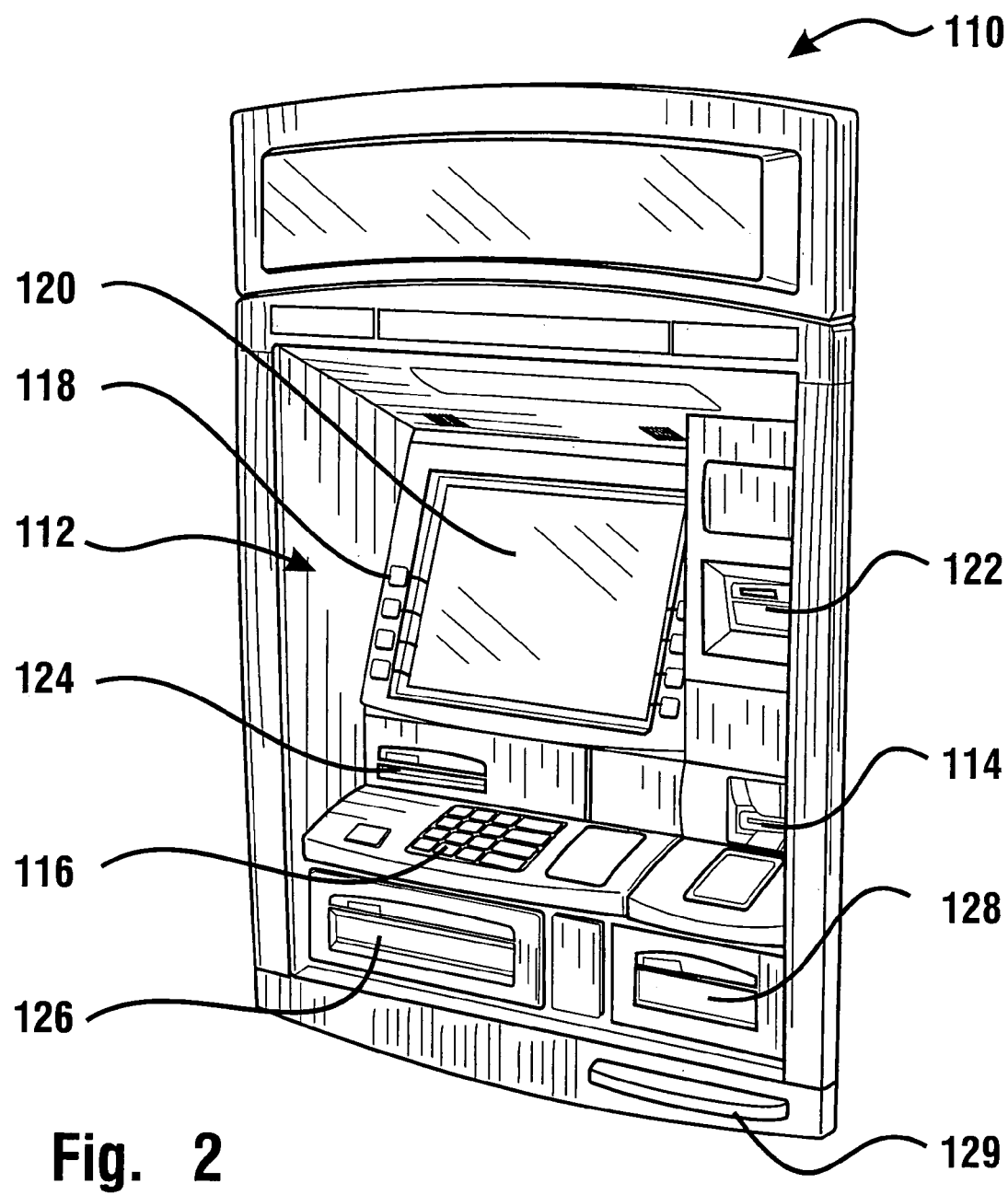
FIG. 2 shows an alternative form of an automated banking machine.

FIG. 2 shows another form of an automated banking machine generally indicated 110. The automated banking machine can be an ATM. However, other exemplary forms of the invention may use other types of automated banking machines. ATM 110 includes a fascia 112 which serves as a user or customer interface. The fascia includes a card slot 114, keypad 116, function keys 118, display 120, receipt outlet slot 122, mini account statement outlet 124, document (e.g., cash) withdrawal opening 126, document deposit opening 128, and a writing shelf 129.

Card slot 114 can be used to input a card having encoded data thereon that is usable to identify the customer and/or the customer's account information. Card slot 114 provides entry to a card reader input device for reading data encoded on the card. The machine may also include other input devices such as biometric readers that may be operative to receive customer identifying inputs such as fingerprints, iris scans, retina scans, face topography data, voice data, or other inputs that provide data that is usable to identify a user. An example of an ATM that uses biometric input devices and other types of input devices is shown in U.S. Pat. No. 6,023,688, the disclosure of which has been fully incorporated herein by reference.

Keypad 116 includes a plurality of keys which may be actuated by a customer to provide inputs to the machine. Function keys 118 can be used to permit a customer to respond to screen prompts. The display 120 may be a touch screen display which enables outputs through displays on the screen and enables customers to provide inputs by placing a finger adjacent to areas of the screen. Outlets 122, 124 may also be used to dispense other items from ticket printing mechanisms, check printing mechanisms, and other devices that operate to apply indicia to media in the course of performing transactions carried out with the machine. Various types of input and output devices may be included on user interfaces. Generally, in the case of an automated banking machine at least one input device is used to receive inputs that identify a user and/or an account. It should be understood that these features of the described ATM user interface are exemplary and in other forms of the invention the user interface may include different components and/or features and/or arrangements. For example, a different arrangement may have the locations of the receipt outlet slot and the mini statement outlet switched. Likewise, the card slot and the receipt outlet slot may be switched.

FIGS. 3, 4, and 5 show respective front, top, and side views of the ATM 110 of FIG. 2.

FIG. 6 shows another form of an automated banking machine generally indicated 130. The automated banking machine has a customer interface which includes a card reader slot 132, keypad 134, function keys 136, display 138, receipt outlet slot 140, mini statement outlet 142, document (cash) withdrawal opening 144, document deposit opening 146, and a bulk document deposit opening 148.

FIGS. 7 and 8 show respective top and side views of the automated banking machine 130 of FIG. 6.

Figure 9:
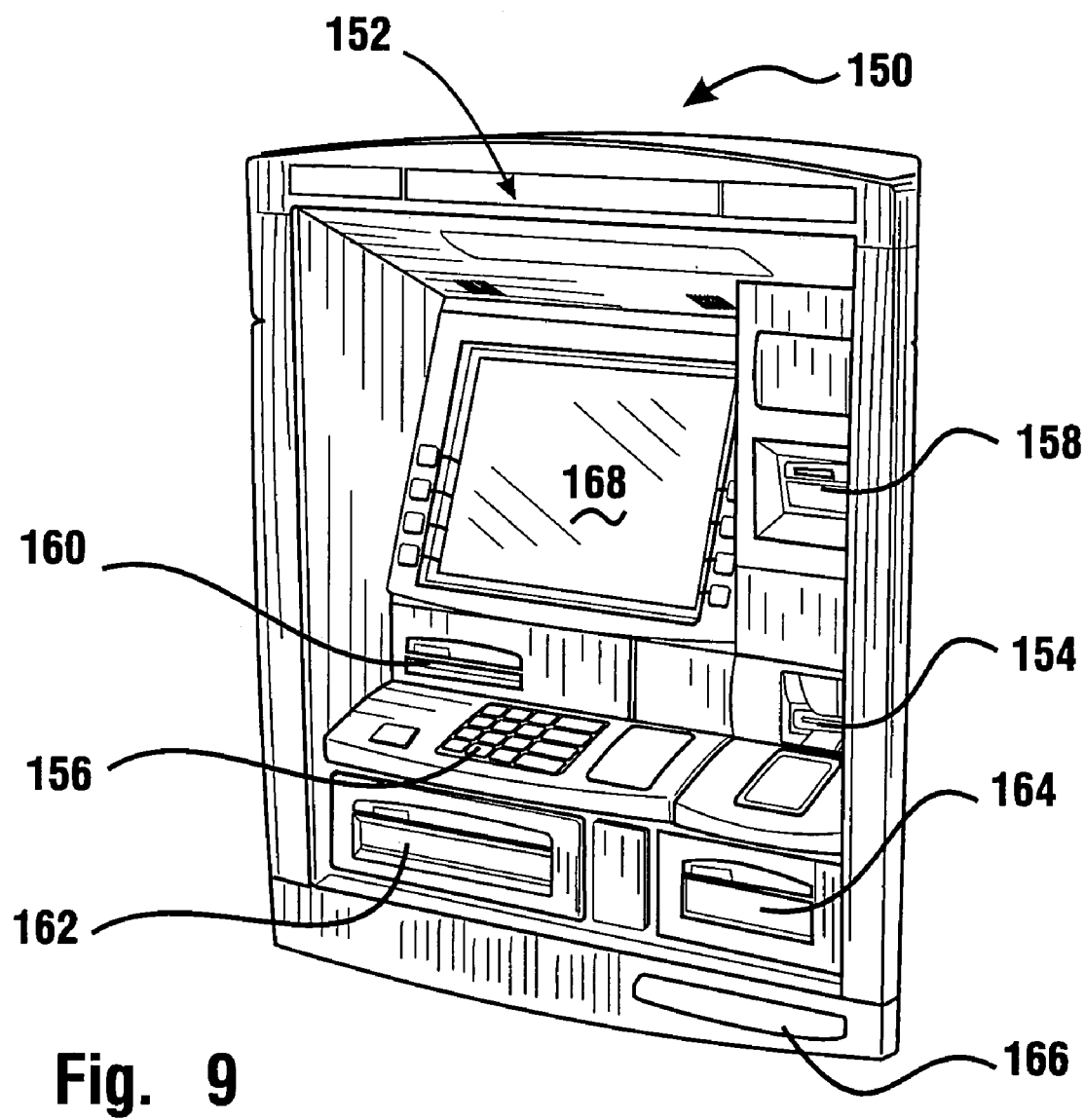
FIG. 9 shows a portion of an automated banking machine.

FIG. 9 shows a further form of a portion of an automated banking machine generally indicated 150. FIG. 9 shows a customer interface 152 similar to that of FIG. 2, including a card reader slot 154, keypad 156, receipt outlet slot 158, mini statement outlet 160, document (e.g., cash) withdrawal opening 162, document deposit opening 164, and writing shelf (or supply tray) 166. With use of a touch screen in display area 168, it may not be necessary to have function keys adjacent the screen.

Figure 10:
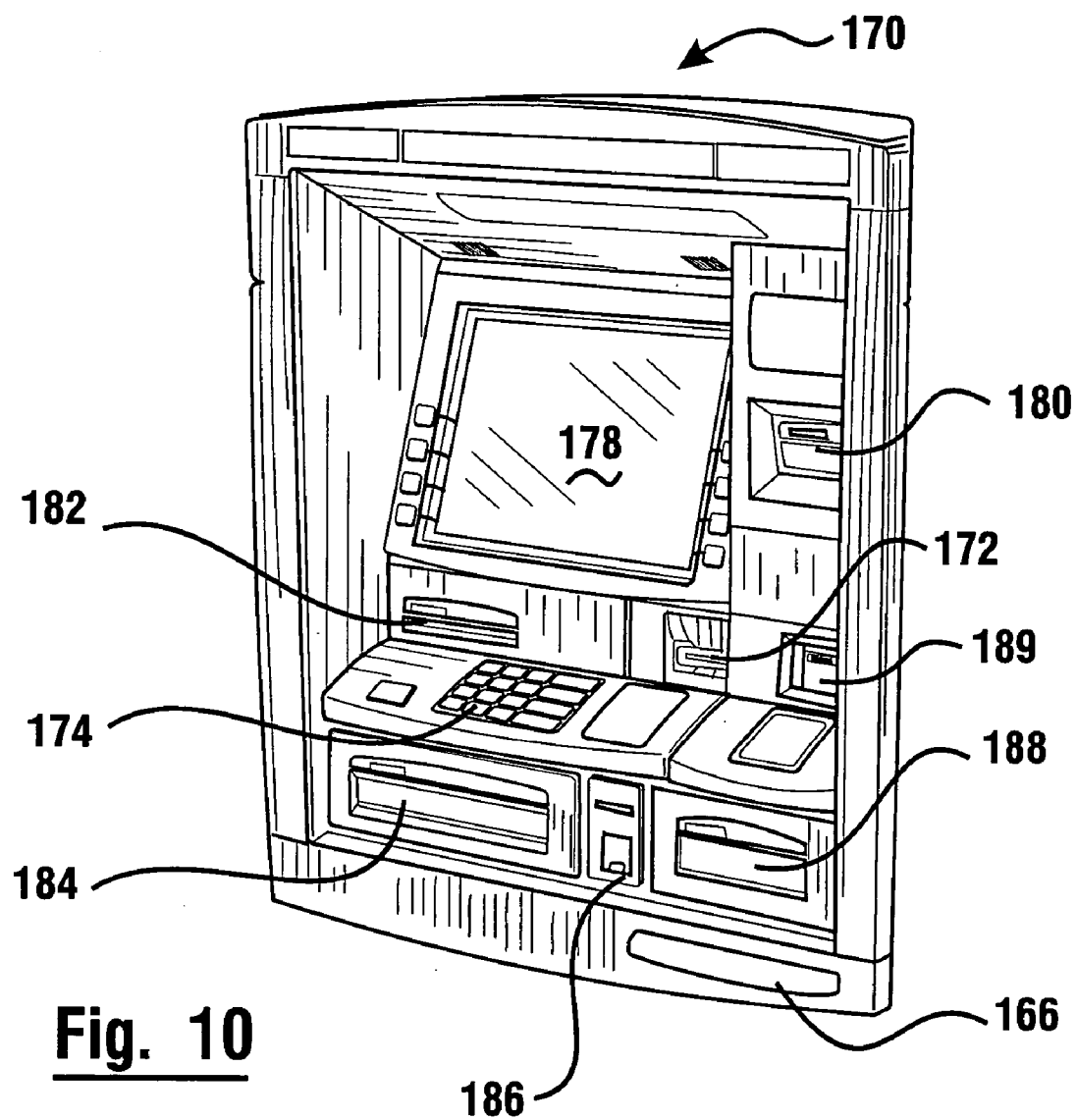
FIG. 10 shows an additional portion of an automated banking machine.

FIG. 10 shows an additional form of a portion of an automated banking machine generally indicated 170. FIG. 10 shows a customer interface including a card reader slot 172, keypad 174, touch screen display area 178, receipt outlet slot 180, mini statement outlet 182, document (cash) withdrawal opening 184, coin dispenser (or acceptor) opening 186, document deposit opening 188, and a bulk document deposit opening 189.

Of course it should be understood that the type and locations of particular inlets and outlets of the fascias shown herein are exemplary, and that other arrangements and configurations may be used. That is, the described ATM user interfaces are exemplary and in other exemplary embodiments the user interface may include different components and/or features and/or arrangements. For example, a different arrangement may have the locations of the receipt outlet slot and the mini statement outlet switched. Likewise, a card slot and a receipt outlet slot may be switched. An envelope storage holder may also be added thereto or substituted for therein in other arrangements.

Other exemplary embodiments of automated banking machines may have a different type of customer interface portion. For example, other exemplary embodiments may not include a customer fascia on or adjacent to a chest portion. Such alternative machines may be operated as document delivery devices only. Such exemplary embodiments may be used to deliver sheets or documents to a cashier, bank teller, or other service provider. Such alternative exemplary embodiments may also include a remotely positioned operator interface which can selectively cause documents to be delivered from a disposed machine.

Figure 11:
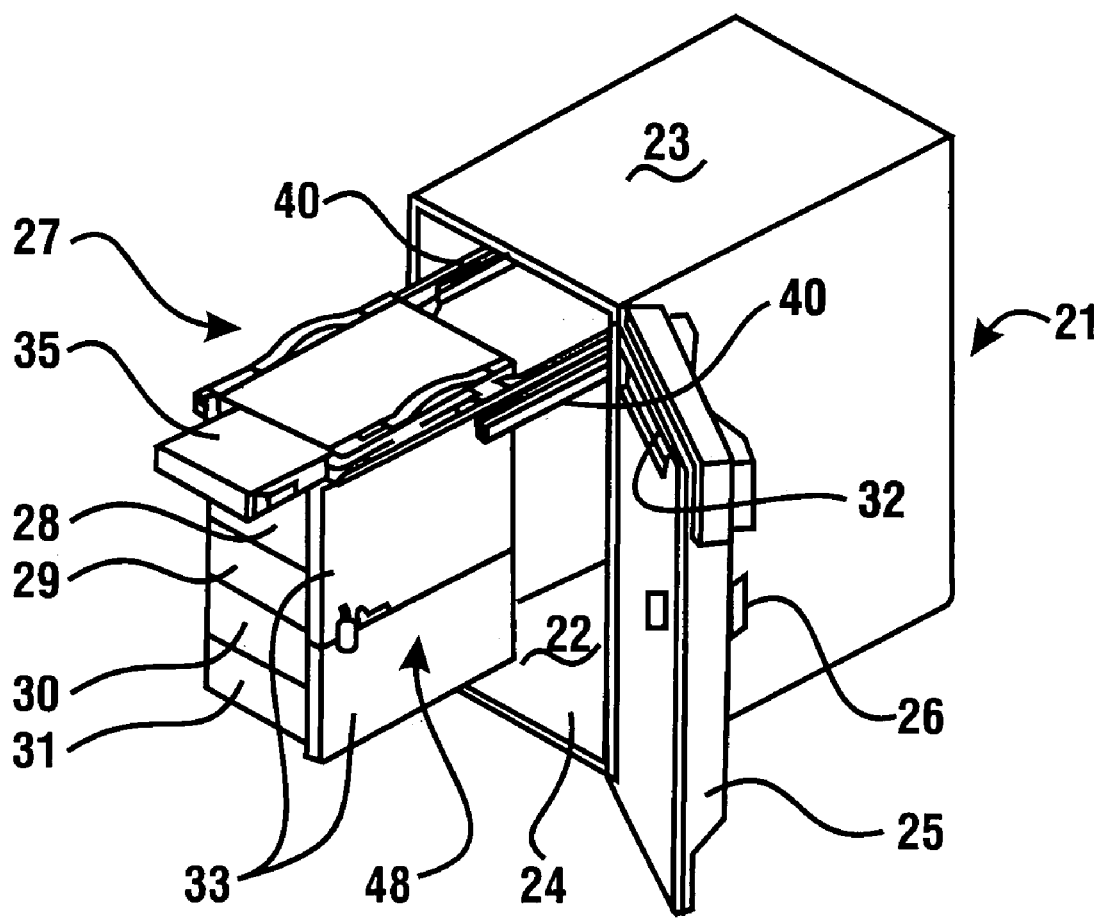
FIG. 11 is an isometric exploded view of a secure chest portion with an access door open and a dispenser mechanism having locked dispenser modules extended through the opening.

FIG. 11 shows an exemplary form of a secure chest portion 21 of an automated banking machine (e.g., ATM). Any of the previously discussed automated banking machines may include a secure chest portion in the manner shown in FIG. 11. The chest 21 encloses a secure area 22. Chest 21 includes an upper wall 23 which can support the upper housing and the customer interface portion of an automated banking machine. For example, the upper wall 23 could support the upper housing 11 and the customer interface portion of the automated banking machine 10 shown in FIG. 1. Chest 21 also has a service opening 24, and a door 25 which can selectively close the opening 24. When the banking machine is in use, the area 22 is closed by the door 25 and is secured and locked through use of a locking device 26. Any of a number of known devices may be used as a locking device 26 to secure the door in a closed position.

The secure area 22 of the chest 21 can be used to house numerous components of the banking machine. One of these components can be a dispenser, generally indicated by numeral 27. The dispenser 27 can include removable cassettes 28, 29, 30, and 31. The cassettes can hold valuable documents or other sheet materials or media, such as currency, travelers checks, coupons, scrip, vouchers, wagering slips, stamps, tickets, sheets, and phone cards. Thus, a dispenser may be a multimedia dispenser. Each cassette can have a picker mechanism associated therewith which can selectively operate to remove items, such as currency notes, from the cassette. The construction of the exemplary embodiment shown is such that two cassettes can be removably mounted in a dispenser frame or module 33. Although the dispenser 27 is shown as having two dispenser modules 33, a dispenser module may have more or fewer cassettes. Any number of dispenser modules may be included in a banking machine. Of course the number of dispenser modules may be limited by the physical size of the chest 21. Although an exemplary embodiment has two cassettes and document pickers per dispenser module, other exemplary embodiments may have other numbers or arrangements of dispenser modules, cassettes, and pickers.

Dispenser modules 33 can be secured together in stacked relation. A document presenter 35 can be attached to the top of a stack of dispenser modules. A presenter can be used to present one or more documents to a user of the machine. Stacked dispenser modules are shown in U.S. Pat. No. 6,293,540, the disclosure of which is incorporated herein by reference. Exemplary cassette and picker mechanism structures are shown in U.S. Pat. Nos. 5,099,423 and 5,141,127, the disclosures of which are incorporated herein by reference. The stacked relation allows documents from the cassettes to be picked from the cassettes and delivered to the presenter 35. Documents may be selectively moved by the presenter through an opening 32 to a user of the machine. Each of the cassettes 28, 29, 30, 31 inside the dispenser 27 can be independently removable therefrom. Each cassette holding location in the dispenser 27 can include a document picker mechanism and belt feed which can operate to deliver documents to the presenter 35. The dispenser of the exemplary form can include a plurality of feed rolls, belts, and other movable members for selectively engaging and moving documents. Motors and other drive devices can operate to move these movable members. The drive devices can operate in response to signals from a terminal controller, which can include one or more computers, which can control the dispensing of documents from the machine. An exemplary form of a controller and a control system for an automated banking machine is shown in U.S. Pat. No. 6,505,177, the disclosure of which is incorporated herein by reference.

The dispenser 27, which can include the document presenter (or feeder) 35 and the dispenser modules 33, can be releasably engaged to a pair of slides 40. The slides can be mounted in supporting connection with the inside of the chest 21. This construction enables the slides and thus the dispenser 27 to be extended and retracted through the opening 24 into and out of the chest 21. In the operative position of the banking machine the dispenser 27 is supported by the slides 40. In an exemplary embodiment the dispenser 27 is releasably engaged with the slides and is removable therefrom when the dispenser is extended on the slides outside of the chest. The dispenser 27 can be disengageable from the slides by moving the dispenser upward relative to the slides:

When the banking machine is in use, the door 25 is closed. The slides 40 can be retracted resulting in the document feeder 35 and the dispenser modules 33 being within the secure chest 21. The door 25 can be secured in a closed position with the lock device 26. Documents or other items can be dispensed responsive to signals from the terminal controller and delivered by the presenter 35 to a user through the opening 32 which can extend through the door 25.

It may be easily understood that the multitude of cooperating drives, feeders, movable members, and devices used in a dispenser to deliver documents to a user could malfunction. Periodic replacement or maintenance of certain components within the dispenser is also desirable to assure reliable operation. Thus, it may also be desirable in some circumstances to change the number and/or type of cassettes and picker mechanisms to accommodate different denominations of currency, coupons, stamps, or other documents. It may also be desirable to replace or upgrade a dispenser. All of these activities can require procedures to be performed on the machine dispenser. Alternatively, it may be desirable to gain access to components in the chest of the banking machine which are rendered difficult to access due to the presence of the dispenser in the chest.

The slides 40 enable service personnel to extend the dispenser 27 through the opening 24 once the door 25 has been opened. Extending the dispenser outward provides enhanced access to components of the dispenser for servicing. However, in some instances, access to certain components of the dispenser or components in the chest cannot be easily obtained even with the dispenser extended through the opening 24. In these cases, it would be desirable to disengage the dispenser 27 from the slides 40 and move the dispenser in order for work to be performed, or even to possibly replace the dispenser. In other cases, the dispenser may need to be disassembled, including the unstacking of dispenser modules. The dispenser may then need to be reassembled, including the stacking of dispenser modules.

An exemplary embodiment provides for the aligning, stacking, and securing together of dispenser modules, yet also permits the dispenser modules to be easily unstacked. In some exemplary arrangements the dispenser modules can be assembled in stacked relation and disassembled quickly therefrom without the use of tools. Dispenser modules can be assembled in a stacked relation either initially (e.g., new dispenser module, new dispenser, etc.) or during a reassembling process. As described hereinafter in further detail, a releasable locking arrangement can be used to position, align, and secure stacked dispenser modules together. A similar locking arrangement may also be used to secure the uppermost dispenser module to the document presenter. FIG. 11 shows a releasable locking arrangement, generally indicated by numeral 48, for adjacent dispenser modules 33.

Figure 12:
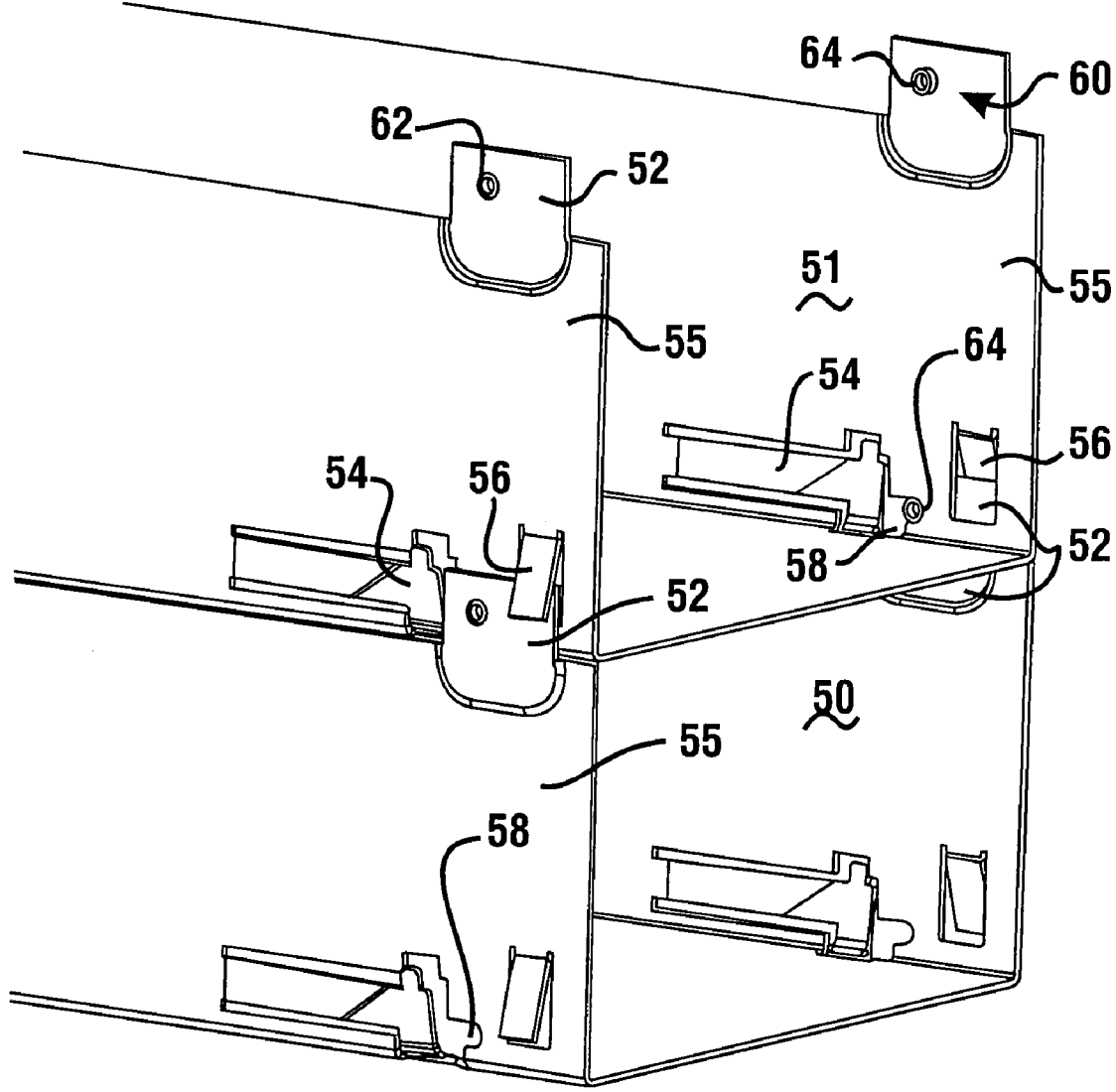
FIG. 12 shows a partial view of removably connected dispenser modules.

FIG. 12 shows dispenser modules 50, 51 secured together in a stacked relation or arrangement. Each dispenser module 50, 51 of the exemplary embodiment of FIG. 12 includes at least one projection 52, latch 54, and tab 56. The dispenser modules can be identical or they can differ, such as in dimensions (e.g., height). The modules of FIG. 12 may be stacked by being snapped together. In other exemplary embodiments a designated top dispenser module may be without a projection. Likewise, in further exemplary embodiments a designated lowermost dispenser module may be without a latch and/or a guide. For ease of description, only one side wall 55 of a module need be described. The opposite side wall of a module may be symmetrical with the described side wall.

Dispenser modules 50 can have a body, or a portion thereof, of material structurally sufficient to support the media contained therein. For example, a module body may comprise metal, plastic, polymer, fiberglass, resin, wood, or glass, or combinations thereof. A module body may comprise sheet metal. A module body may also be formed of a clear material that permits viewing therethrough.

A dispenser module 50 can include a cutout portion, opening, passage, or slot 58. In the exemplary embodiment of FIG. 12 the slot 58 has the shape of an inverted L. Alternatively, a slot may have other shapes.

A projection 52 can comprise a member, such as a plate, which functions to extend from a module. A projection member 52 permits a first module 51 to be removably latched or locked to an adjacent module 50 when the modules are in properly stacked alignment. A projection member 52 can be attached to a module or be of one piece with the module. Attaching or fastening may include known techniques, such as welding, screwing, bolting, use of nuts, etc.

As shown in more detail in FIGS. 15 and 16, a projection can project or extend from a module relatively flush with the module side wall. The projection may be biased toward remaining flush with the module side wall. Alternatively, a projection may extend outward away from a module side wall at a predetermined angle. For example, a projection may have an outwardly bias. In such case, a tab can act to hold, pull, or retain a projection member adjacent a side wall. A projection member may also be tapered at the top thereof to assist in slidingly engaging an adjacent module.

The projection member 52 includes an inwardly projecting pin 60. The projecting pin 60 can comprise a dowel pin or bolt or shaft. The pin 60 is of a length permitting its extension through a side wall 55 of an adjacent module. The pin 60 can be flanged at one or both ends. In an exemplary embodiment the pin has a flanged end 62 in fixed connection with the projection plate member 52. Alternatively the pin 60 may be freely movable relative to the projection plate member 52. The pin 60 is adapted to extend both vertically and horizontally in the slot 58 of a module 50, 51. An inner flanged end 64 of the pin 60 is adapted to locking engage the side wall of an adjacent module.

A latch or retainer or arm 54 can be cutout from a module body 50, 51. A guide or tab 56 can also be cutout from a module body. Alternatively, a latch and/or a guide can be separately fastened to a module body. Both latch 54 and guide 56 can be biasing members. For example, both a latch arm 54 and a tab 56 can be springs (e.g., latch spring and tab spring). Both a latch 54 and a guide 56 can have an unbiased position, such as the position shown in the lower module 50 of FIG. 12. As discussed in more detail herein, a latch 54 can be used to latch or lock a dispenser module projection member 52 in stacked position, and thus lock the adjacent modules in stack position. A tab 56 can be used to guide or align a dispenser module projection member, and thus the modules, during stacking securement. A tab 56 can also be used to retain a projection 52 from (outward) movement away from its side wall.

An exemplary operation of assembling secured stacked dispenser modules will now be described. In the exemplary operation the engagement and movement of securing components can (symmetrically) simultaneously occur on each side of the modules.

Figure 13:
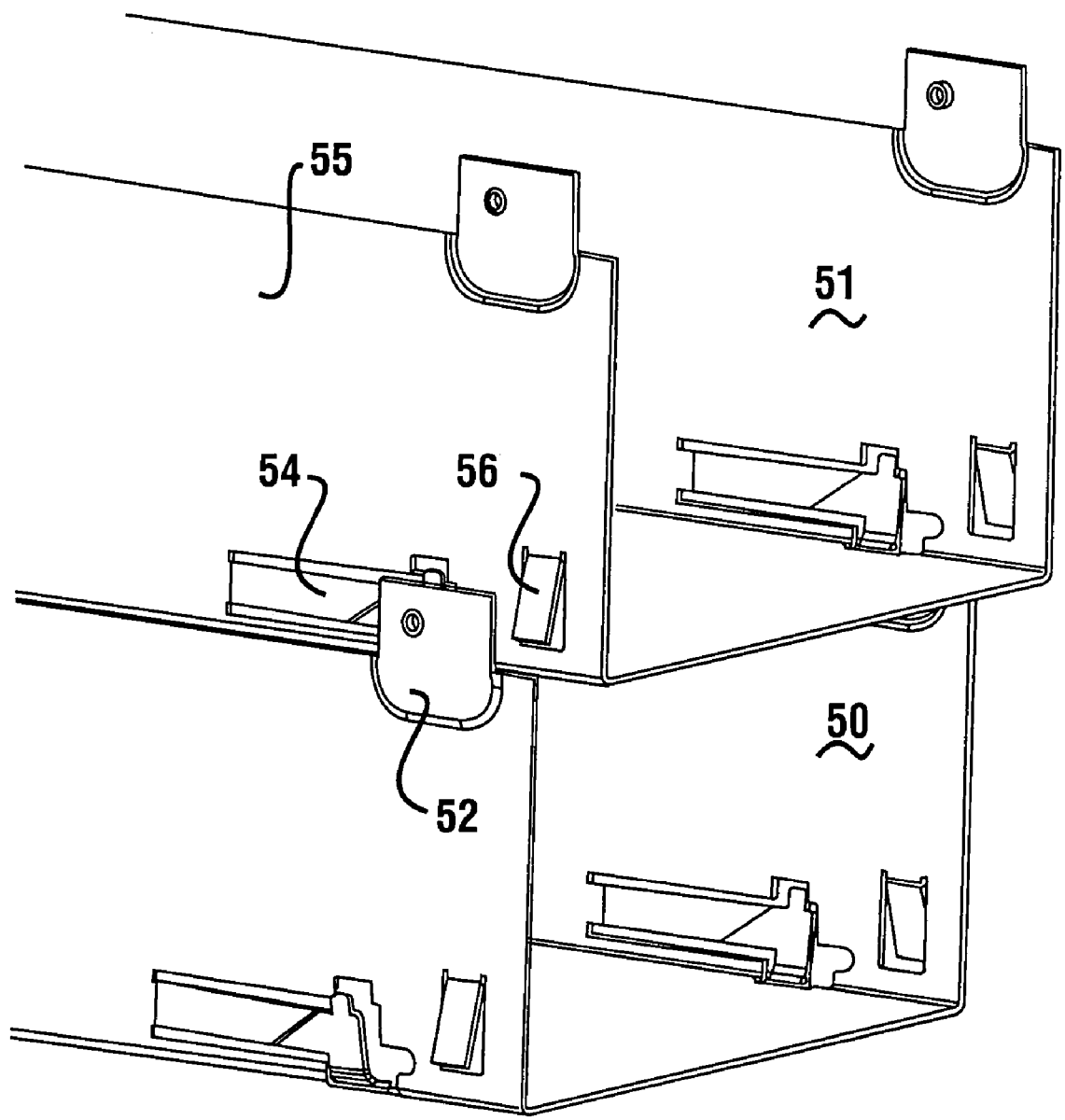
FIG. 13 shows a step in a process of connecting dispenser modules.

A first dispenser module 51 can be placed relatively onto a second dispenser module 50, as shown in FIG. 13. In this step a latch arm 54 of the first dispenser module 51 is biased or compressed back into the side wall 55 of the first dispenser module 51. This biased position may be achieved by the first module being lowered onto the second module at the position shown. Alternatively, the first module 51 may be placed relatively onto the second module 50 upstream of the shown position (i.e., the projection 52 being further away from the tab 56) and then slid toward the shown position. The initial starting position may also vary based on how far a projection 52 is angled away from its side wall. For example, a projection 52 attached flush with its side wall may have to start in a position (further upstream) so that the projection 52 avoids abutting engagement with an outwardly biased latch arm 54. That is, a module may have to be lowered (or raised) at a location that permits its lowering, i.e., the projection 52 is clear of contact with a latch arm 54. Alternatively, a module may be placed relatively onto another module without any lowering, e.g., the modules can be horizontally slid relative to each other.

Figure 14:
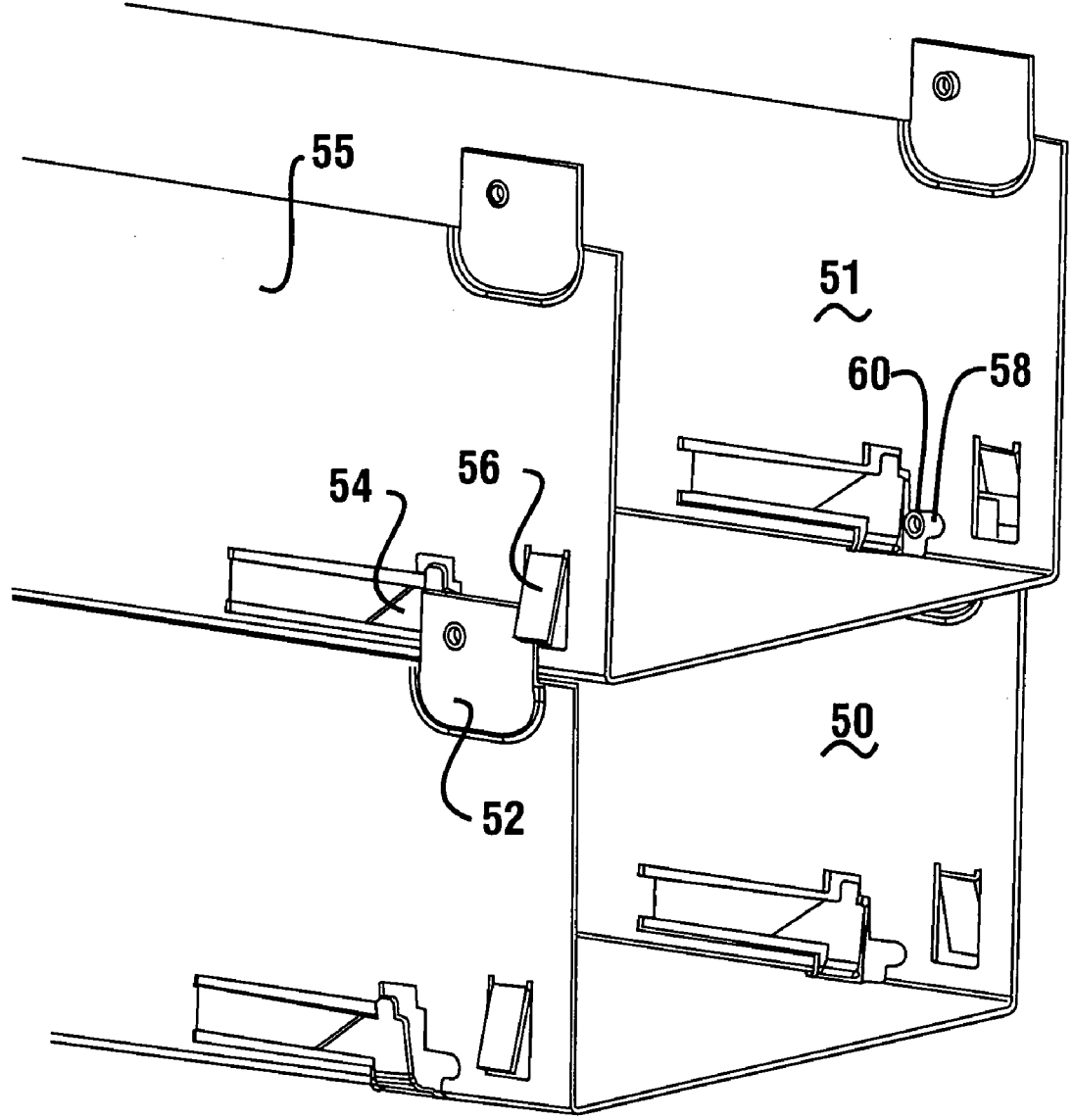
FIG. 14 also shows another step in a process of connecting dispenser modules.

In a next step, as shown in FIG. 14, the first module 51 can be slid further toward an aligned stacked relation with the second module 50. In this position the projections 52 of the second dispenser module 50 have respectively entered between the tabs 56 and the side walls 55 of the first module 51. Similarly, the pins 60 have entered the slots 58. The tab 56 can be used to guide, align, or biasingly retain a projection 52 during the secured stacking operation. For example, the tabs 56 can be used to bias the projections 52 toward a flush arrangement with the side walls 55. Also, other exemplary arrangements may have arrangements in which the pins enter the slots before or after the projections enter behind the tabs.

In a final step, as shown in FIG. 12, the first module 51 is slid further into aligned stacked relation with the second module 50. In this position the projections 52 of the second dispenser module 50 remain behind the tabs 56 of the first module 51. Furthermore, the pins 60 have slid (horizontally) in the slots 58 and their inner flanged ends 64 are in retaining engagement with the side walls of the first module 51. Additionally, the projections 52 have slid past the latch arms 54. Thus, the latch arms 54 (which are no longer compressed) have again become outwardly biased. That is, the latch arms 54 have snapped outwardly to prevent the projections 52 from disengaging movement in the direction toward the latch arms. Thus, the latch arms prevent the movement of the pins from the slots 58. It follows that the pin/slot arrangements and the latch/projection arrangements securely lock the adjacent modules 50, 51 in aligned and stacked relation.

In an exemplary form of module stacking, a second dispenser module is placed on and locked to a first dispenser module to create a dispenser module stack portion. Thereafter, a third dispenser module is placed on and locked to the already created dispenser module stack portion. The process can be repeated until the desired secured and aligned module stack is complete.

An exemplary operation of disassembling secured stacked dispenser modules will now be described. After the latch arms 54 are biased inwardly (i.e., compressed) then the projections 52 can again be moved outside of or into a position overlapping the compressed latch arms 54. The latch arms may be compressed by hand. In other exemplary embodiments use of a tool may be more convenient or necessary to compress the latch arms. The dispenser modules can then be moved (e.g., horizontally) relative to each other until the pins 60 are aligned in a position for (e.g., vertical) removal from the slot 58 (e.g., the position shown in FIG. 14). Thereafter, the dispenser modules can be moved (e.g., vertically) relative to (away from) each other to disengage the modules. The pins can be removed by passing vertically through a lower portion of the slot, which portion extends (horizontally) inwardly.

Alternatively, stack modules may be disassembled by reversing the previously discussed assembly steps. For example, the latch 54 can be compressed far enough to permit the plate 52 (and the pin 60 therewith) to slide past.

FIG. 15 shows a partial end view of adjacent side walls 70, 72 of connected dispenser modules. A relationship of a projection member 74, an inner flanged pin end 76, a tab 78, and adjacent side walls 70, 72 is also shown.

FIG. 16 shows an alternative partial end view of side walls 80, 82 of connected dispenser modules. A projection plate 84 is shown fastened to a side wall 80 via a screw 86. The projection plate 84 is also shown having a tapered end 88 and an extended pin 89.

Figure 17:
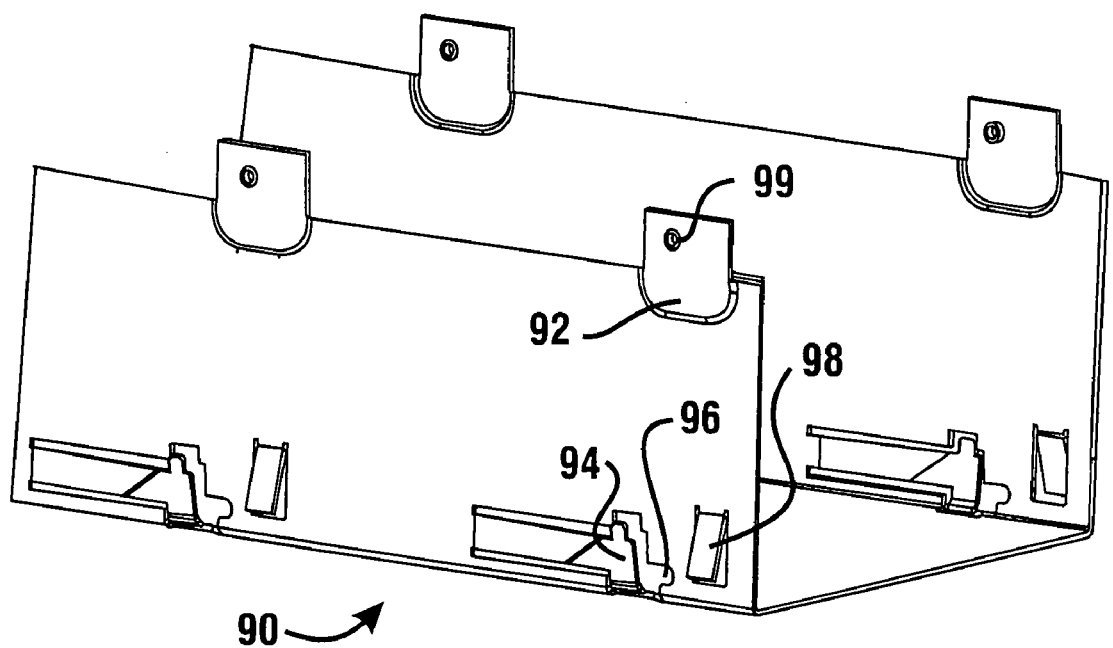
FIG. 17 shows a dispenser module with a plurality of releasable locking arrangements.

FIG. 17 shows a portion of a dispenser module 90 including a plurality of releasable locking arrangements. The dispenser module 90 includes side walls, each having plural projections 92, latch arms 94, slots 96, tabs 98, and pins 99.

Figure 18:
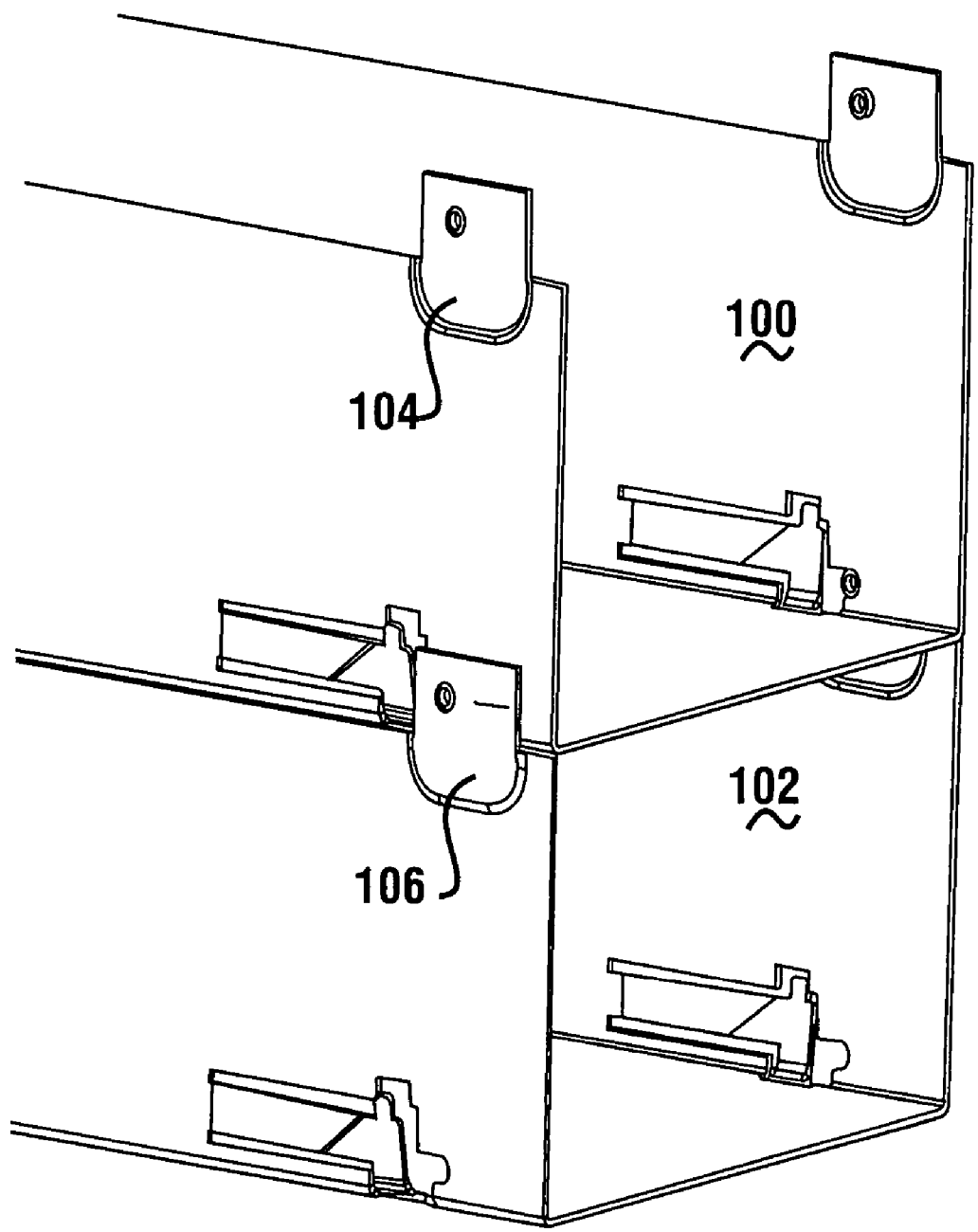
FIG. 18 shows a partial view of removably connected alternative dispenser modules.

FIG. 18 shows a portion of removably connected alternative dispenser modules 100, 102. The modules are similar to those of FIG. 12, except tabs are absent and (correspondingly) the projections 104, 106 are of smaller size. It should be understood that the sizes and locations of the projections, latches, tabs, pins, and slots may vary for different modules. For example, a stack of modules may have vertically alternating (relatively) small and large sized projections. That is, the lowermost module may have small sized projections and the next level module may have large sized projections. The other module structure (e.g., latches, slots, etc.) may also be sized to correspond to the sized projections of the adjacent modules.

Figure 19:
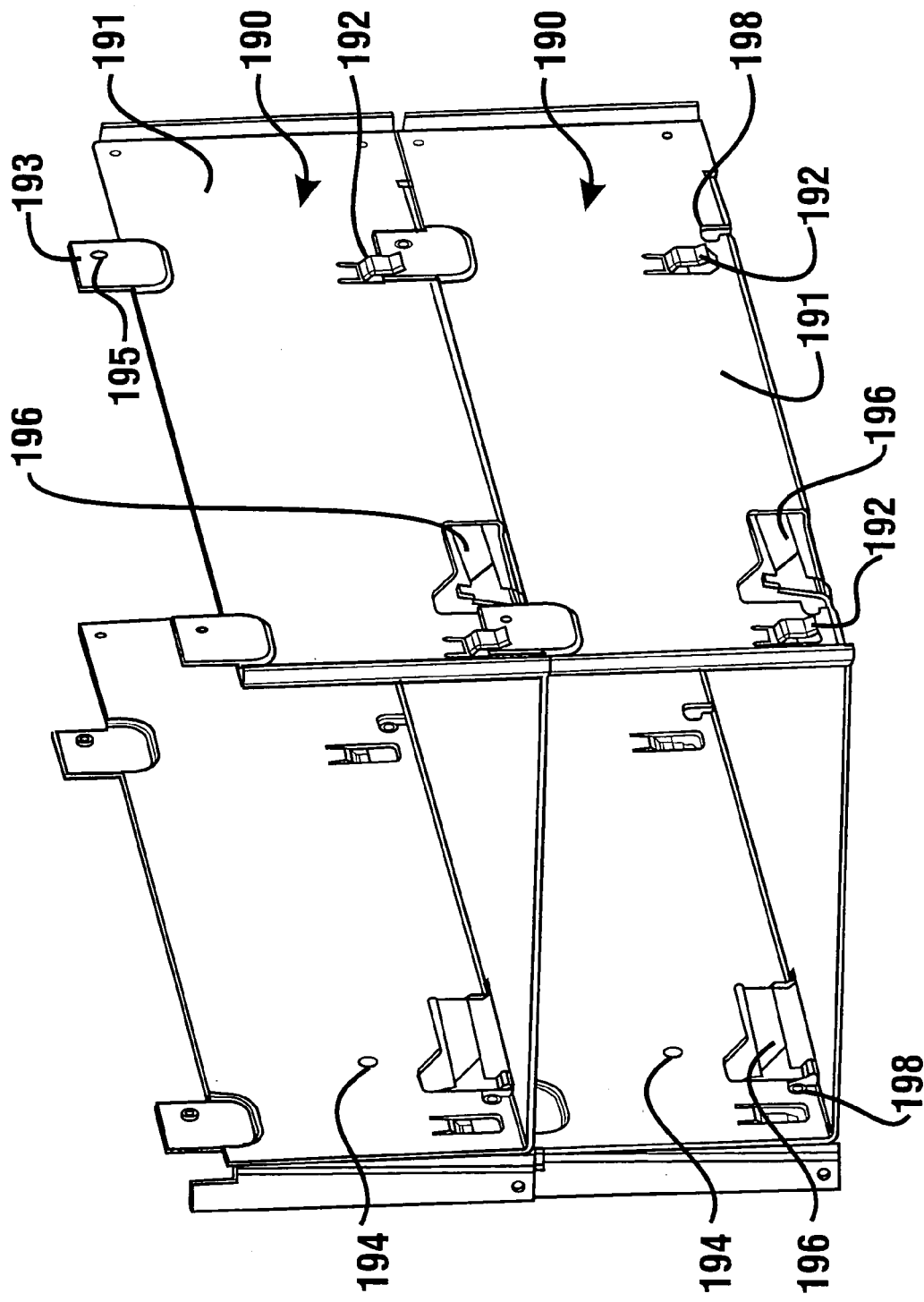
FIG. 19 shows an alternative form of stacked dispenser module portions.
Figure 20:
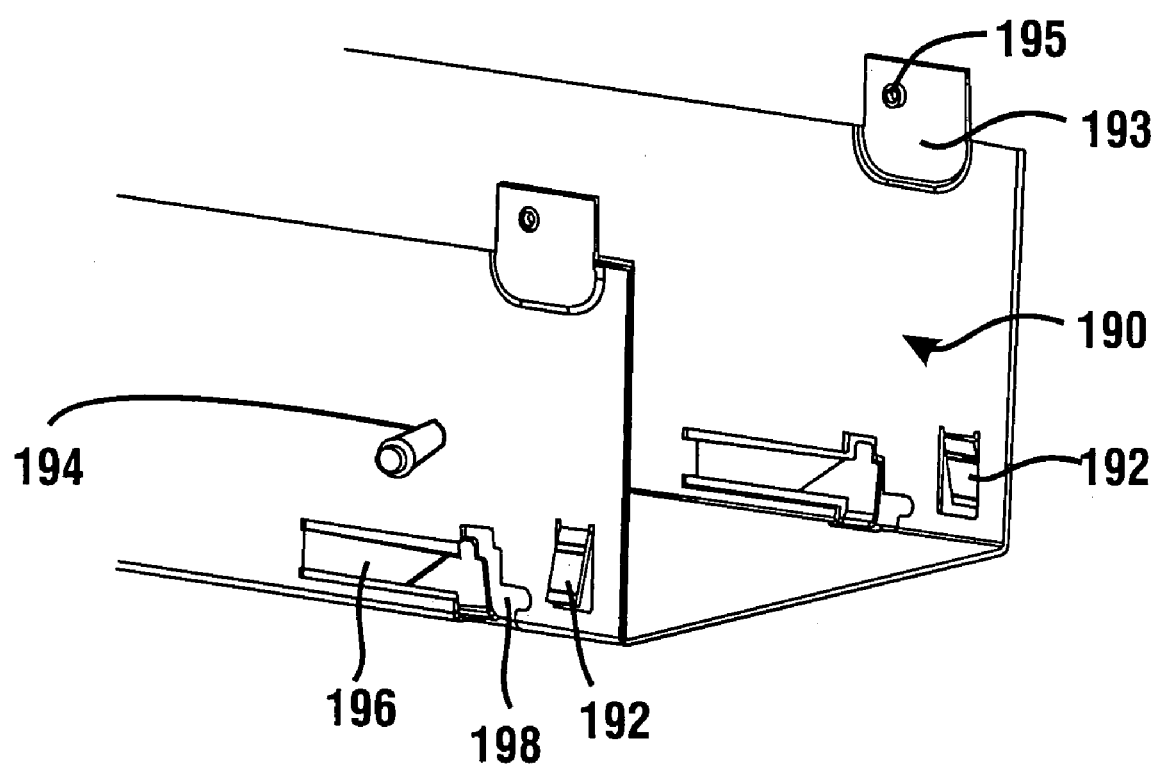
FIG. 20 is a different angled view of a dispenser module of FIG. 19.

FIGS. 19 and 20 show additional exemplary embodiments of a dispenser module portion 190. The modules of FIG. 19 may be stacked by being snapped together. Each of FIGS. 19 and 20 include a shaped tab 192 and at least one side wall pin 194. The tab 192 can be shaped (e.g., bent, corrugated, or curved) to provide additional engaging or biasing force, e.g., spring force. The pin 194, as shown more fully in FIG. 20, can be used to provide alignment of the module with the dispenser. That is, the pin 194 may act as a guide pin to engage a corresponding guide slot (or groove or rail) of the dispenser into which the module is inserted. The pin 194 may also be used during the handling and lifting of the module. That is, the pin may be used for guidance or engagement in positioning of the module during transport. FIG. 19 also shows that latch arms 196 need only be adjacent to one end of a module. The module end without latch arms can still have a slot 198, such as an inverted L-shaped slot. A dispenser module 190 can also include side walls 191, projection member 193, and a projection member pin 195.

Furthermore, the locking arrangements of all the modules in a stack may vary so that the stack may only be assembled one way. That is, the order of the modules in a stack can be determined by their predetermined locking arrangements. Thus, service personnel can be prevented from incorrectly stacking modules.

An exemplary embodiment provides for the capability of using removably lockable multimedia dispenser modules to facilitate the servicing of automated banking machine dispenser mechanisms. The exemplary arrangement can permit easier, faster, and less expensive access to dispenser mechanism components to facilitate repairs and/or replacement thereof by service personnel. The exemplary arrangement can also provide a method of separating and removing stacked modules of a dispenser assembly to facilitate repair or replacement. An exemplary method also facilitates aligning and releasably locking together the modules of a dispenser mechanism in an automated banking machine, such as an ATM.

While the exemplary embodiments described herein include particular structures to achieve the desirable results, those having skill in the art may devise numerous other exemplary embodiments with other structures which employ the same inventive principles described herein and which are encompassed by the subject matter as claimed. For example and without limitation, other embodiments may include other types and shapes of modules, projections, pins, latches, slots, tabs, fasteners, material, or other structures. Further, the structures described herein are not intended to limit the scope of the present application to the particular structures described herein.

Figure 21:
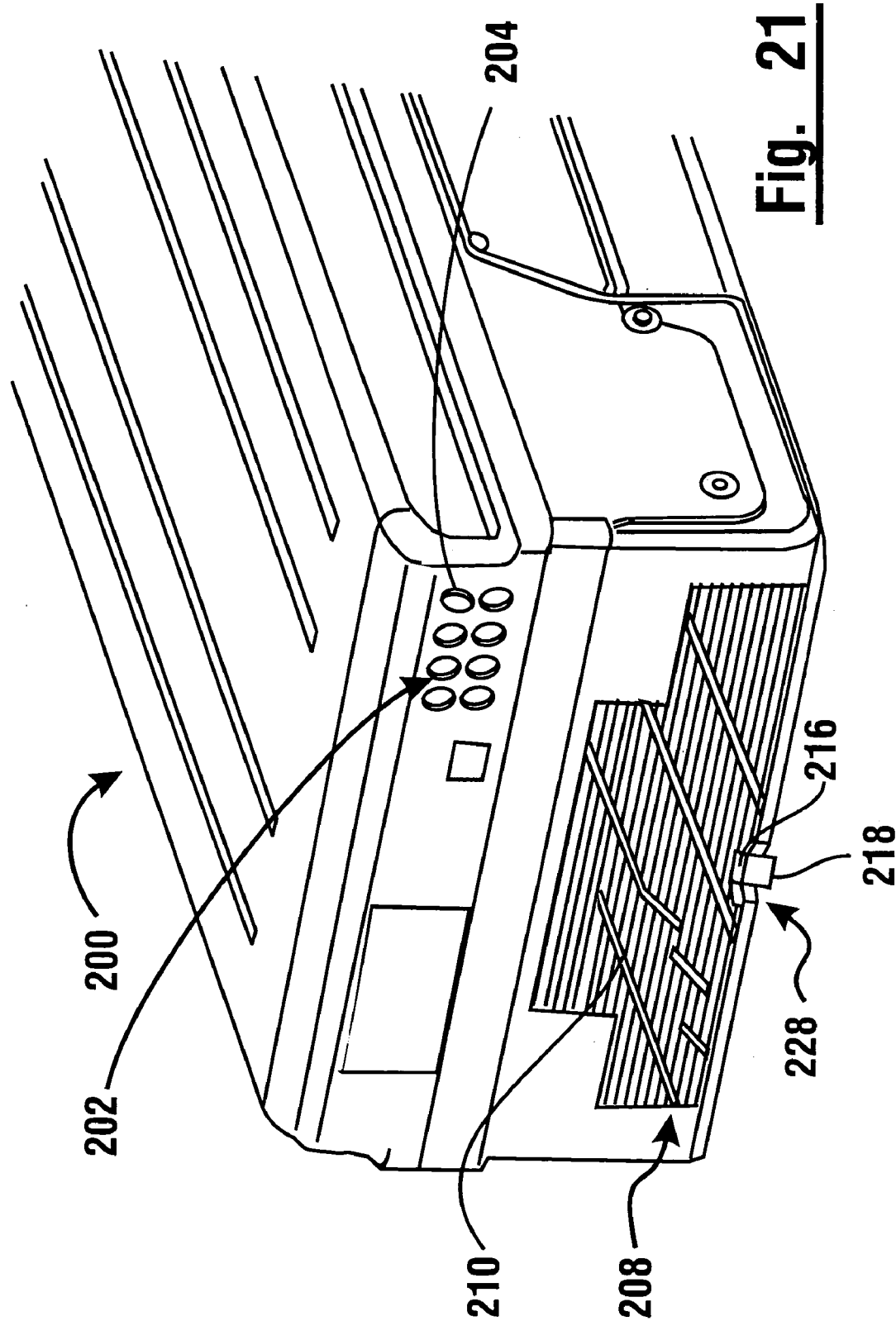
FIG. 21 shows a media cassette.

As previously discussed, a media cassette or canister can be removably mounted in an automated banking machine (e.g., ATM) dispenser module. FIG. 21 shows an exemplary form of a media (e.g., currency note) cassette. The cassette 200 includes at least one indicator button contact area 202 comprising a plurality of indicator buttons. For example, the button area may include a media low indicator button 204. The use and operation of information indication buttons for a cassette is described in detail in the disclosure of U.S. Pat. No. 4,871,085, which is incorporated herein by reference.

The cassette also includes a door 208. The door has a flexible or bendable portion. In an exemplary form of the invention, the door includes a tambour door section 210. The tambour section 210 can comprise a flexible corrugated or shutter-like arrangement having a number of thick parallel strips integrally attached together by thinner parallel links or webs. The tambour section can comprise an integral one-piece construction having alternating strips and links, with the strips and links parallel to each other. The strips can be rigid, whereas the links can be pliable. Hence, the door can bend at the thinner links. Tambour section materials can include plastic, metal, polymers, and/or vinyl, such as polyvinylchloride ("PVC"). However, in alternative exemplary embodiments other types of doors, flexible door sections (e.g., smooth non-tambour), and door materials (e.g., shape memory alloy, non-PVC polymers, plastic embedded with metal for strength, etc.) may be used.

The tambour door 210 can be arranged in the cassette housing for opening in a recessing or retracting manner. For example, the tambour door shown in FIG. 21 can be opened by moving in a first direction (vertically) downwardly and then curving into another direction (horizontally) underneath the cassette. The flexible door 210 may be able to move in two substantially perpendicular directions. The cassette housing can have a guide or track in which the tambour door 210 can ride during its opening and closing. For example, the sides of the door may be set in cassette housing supports or grooves which enable the door to slide relative to the cassette housing.

Opening of the door can permit a picker mechanism to be properly positioned to access and pick media (e.g., currency bills) from the cassette. As explained in more detail hereinafter, a cassette tambour door of an exemplary embodiment may be automatically opened during insertion of the cassette into its operating position in a dispenser module. It should be understood that the particular tambour door discussed herein is exemplary and that other sized and shaped tambour doors corresponding to other sized and shaped cassettes may also be used. However, the tambour doors may function in a similar manner during opening and closing.

Figure 22:
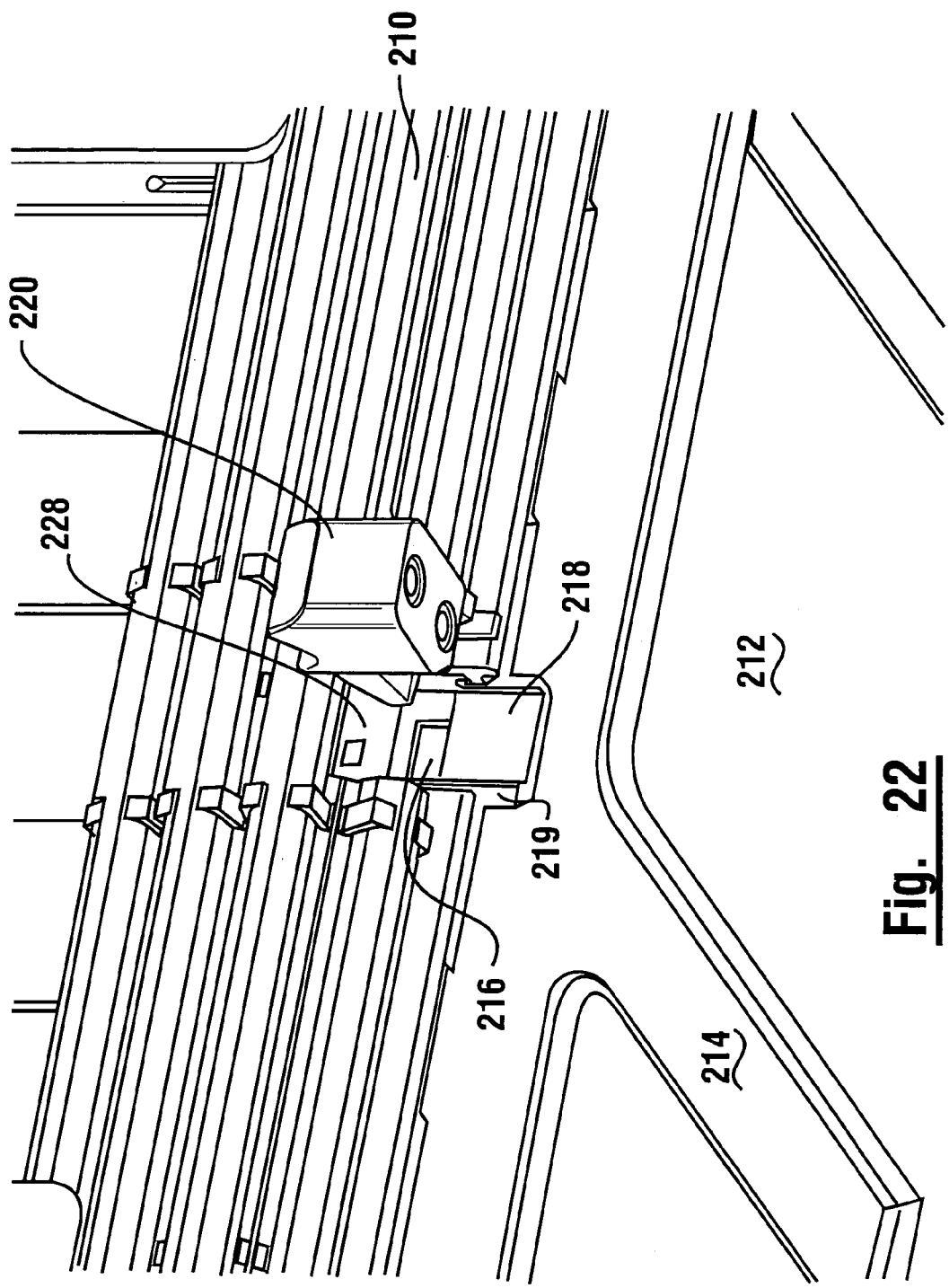
FIG. 22 shows a view of a tambour door portion of a cassette.

FIG. 22 shows a view of the tambour door section 210 in a closed position. A bottom portion 212 of the cassette housing frame is also shown in FIG. 22. The cassette housing includes a slot (or groove) 214 therein. The slot extends in a direction away from the closed tambour door. As explained in more detail hereinafter, the slot is operative for use in opening the tambour door.

As shown in FIG. 22, the tambour door 210 includes an opening (or hole or groove) 216. The opening's face can be substantially parallel to the face of the closed tambour door and substantially perpendicular to the slot direction. The door 210 further includes a lip or flange 218 extending adjacent to (e.g., beneath) the opening. The lip's face can also be substantially parallel to the face of the closed tambour door and substantially perpendicular to the slot direction. A portion of the door lip 218 is operative to be moved in the slot 214.

Figure 23:
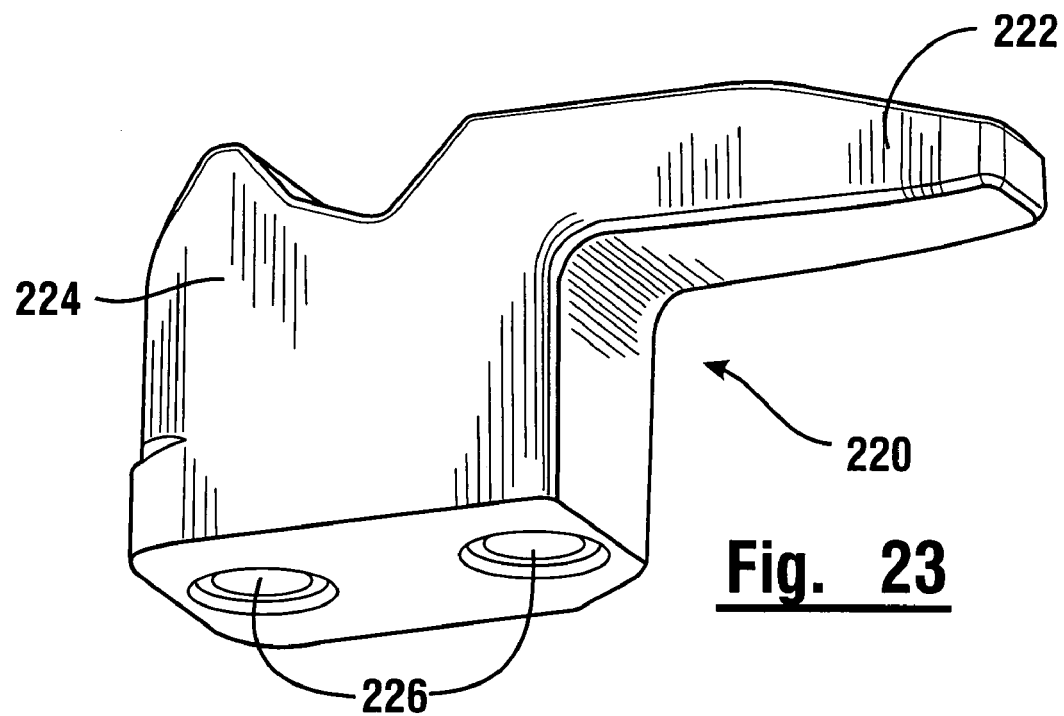
FIG. 23 shows an interlocking pin.
Figure 24:
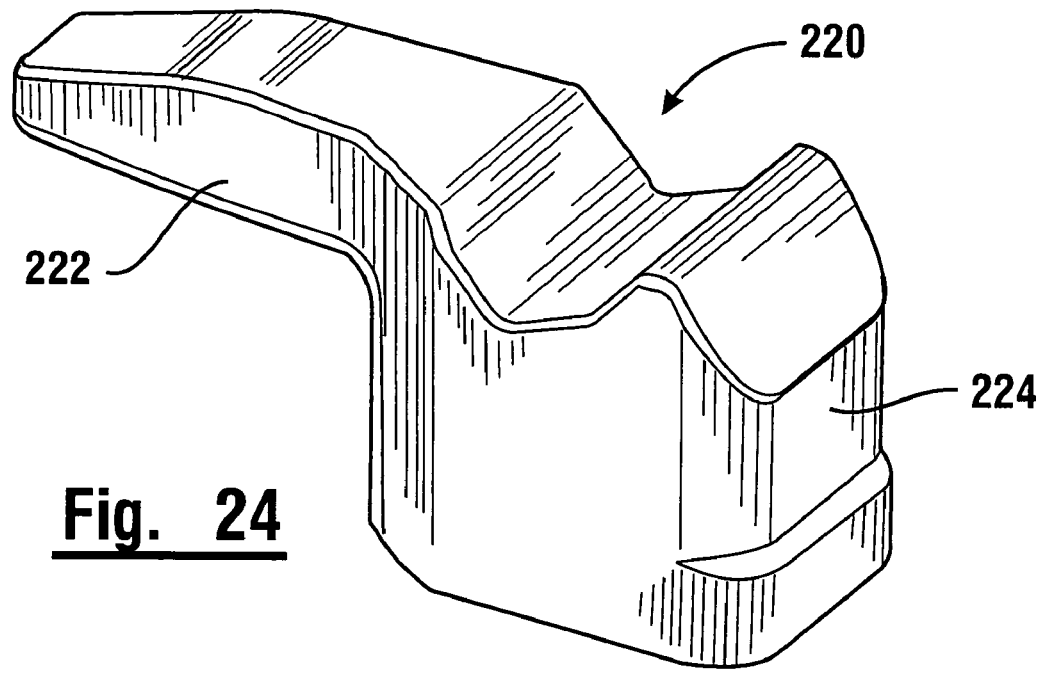
FIG. 24 shows another view of the interlocking pin of FIG. 23.

The opening 216 is operative to receive a portion of a push pin 220. Additional views of the exemplary pin 220 are shown in FIGS. 23 and 24. The pin may be fixed, such as fastened (e.g., bolted) into a dispenser module. For example the pin may have screw holes or bolt holes 226. The pin 220 functions to relatively push the tambour door 210 to an open position.

The pin 220 can include a head portion 222 and a body portion 224. The pin 220 is operative to gear with a tambour door section to cause relative movement of the tambour door. The pin head 222 is operative to key or protrude into the opening 216 so that the pin body 224 can engage (or abut) the door lip 218. The pin head-to-opening mating relationship can respectively comprise a male to female type of relationship. The pin head-to-opening relationship assists in preventing slippage of the pin body relative to the lip. It should be understood that the pin head can pass through the opening 216 with or without passing entirely through the door. For example, a door can have an indented closed member with one side open (i.e., an opening). The pin head 222 can pass through the open side and be received in the closed member. The closed member can be box-like with only one open side (e.g., like a cave).

The lip 218 may have flanges to guide and/or partially surround the pin body 224. For example, the lip may have tapered side flanges 219 to facilitate guidance of the pin body 224. The pin may have a relatively smooth and wavy contour. Such contour may be beneficial during contact with ridges of a tambour door.

The tambour section 210 of the door 208 can also have an open channel area leading to the opening and lip area. A channel 228 enables the pin to extend through the tambour section of the door to reach the opening and lip while the door is still in a fully closed position. In an exemplary arrangement, the channel 228 can be sized to receive the pin body 224 therein. For example, when the door is in a fully open position, the pin head 222 can extend through the door opening 216 and the pin body 224 can be entirely located in the channel 228. The channel 228 can have at least one taper to facilitate guidance of the pin into the channel and the door opening. For example, a taper may be on a side wall of the channel. The pin head can also include one or more tapered surfaces to assist in guiding the pin head into the channel and the door opening. FIG. 21 also shows a tapered channel 228, opening 216, and lip 218.

During an exemplary door opening operation, as the cassette 200 is inserted into a dispenser module the pin head 222 extends into the door opening 216 and the pin body 224 engages the door lip 218. With further insertion of the cassette, the pin-to-lip engagement prevents the door from proceeding in the insertion direction along with the cassette. Therefore, further movement of the cassette into the dispenser module results in the door 210 being further opened. The degree or percentage of a door actually opened can be determined based on the insertion distance of the cassette in the dispenser module. Magnitude of door openness can be directly proportional to cassette insertion distance.

The pin 220 acts relative to the cassette to push against the lip 218 to open the cassette door. The cassette and pin relationship can be predetermined such that when the cassette is fully inserted the door is fully open. The cassette slot 214 can also be of a predetermined length that permits the door to be fully opened.

With the pin head 222 located through the door opening 216 and the pin body 224 received in the channel 228, the arrangement provides for the pin 220 and tambour door 210 to be in a mating or interlocking relationship. The generated lock can be prevented from being removed (opened) until the door is again in a closed position. Removal of the cassette from the dispenser module can cause the door to automatically return to its closed position. As the cassette is being extracted, the pin body 224 abuts against at least one tambour strip to hold the door stationary while the cassette is moved. An abutted tambour strip can be that strip which is closest to the channel 228 but opposite to the door lip 218. In an alternative arrangement this closest tambour strip can have a lip to facilitate area engagement with the pin body.

Figure 25:
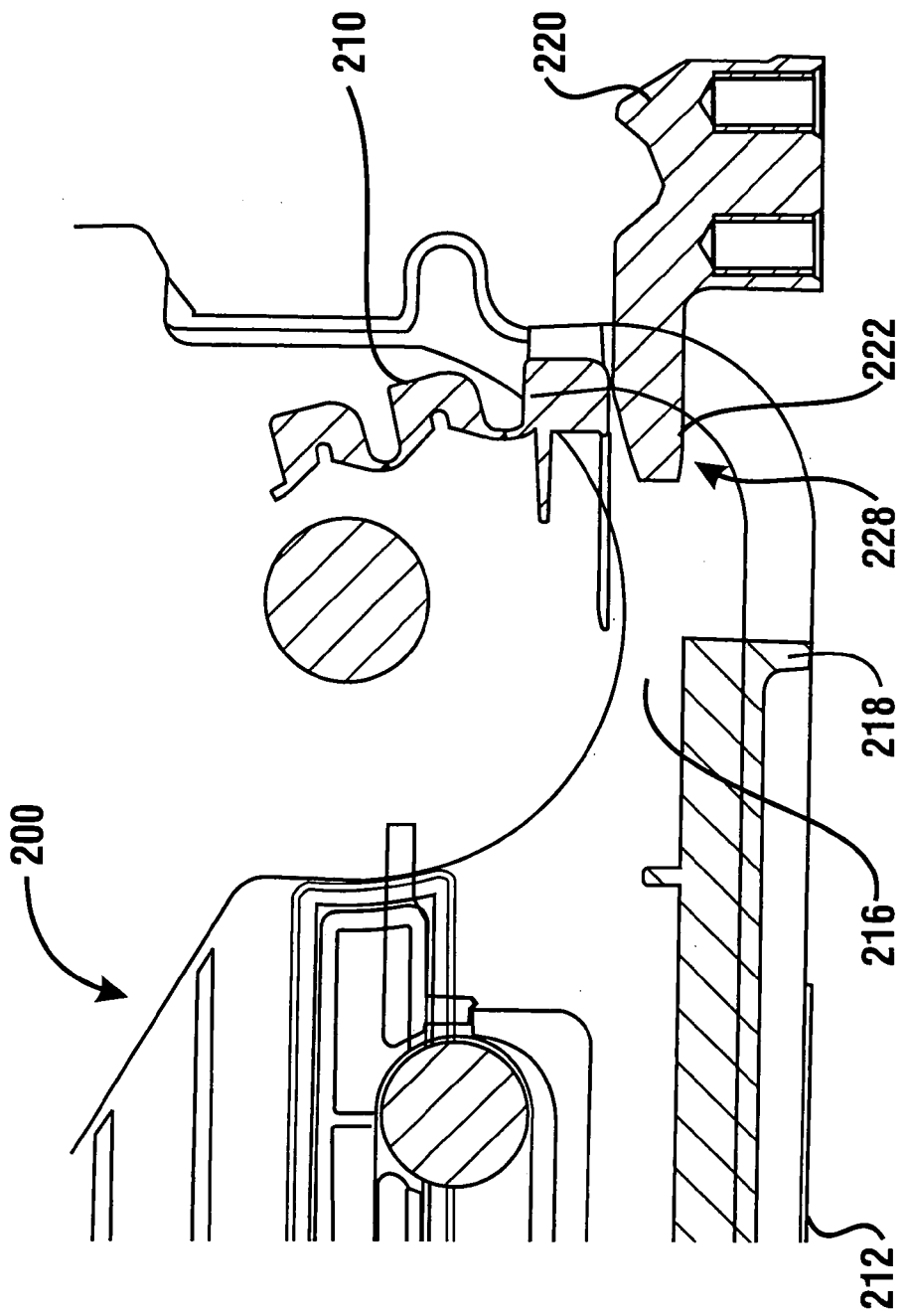
FIG. 25 shows a step in a door opening process.

FIG. 25 shows a first step in a door opening process. FIG. 25 is a cross sectional view of the cassette 200 taken through the door channel 228. The door is in a closed position enabling the opening to the channel 228 exposed to receive the pin head 222. The cassette 200 has been moved toward the pin 220 so that the pin head 222 has entered the door channel 228. That is, the pin head is located beneath a tambour section, prior to entry into the door opening. The cassette bottom portion 212, which includes the previously discussed slot 214, is also shown.

Figure 26:
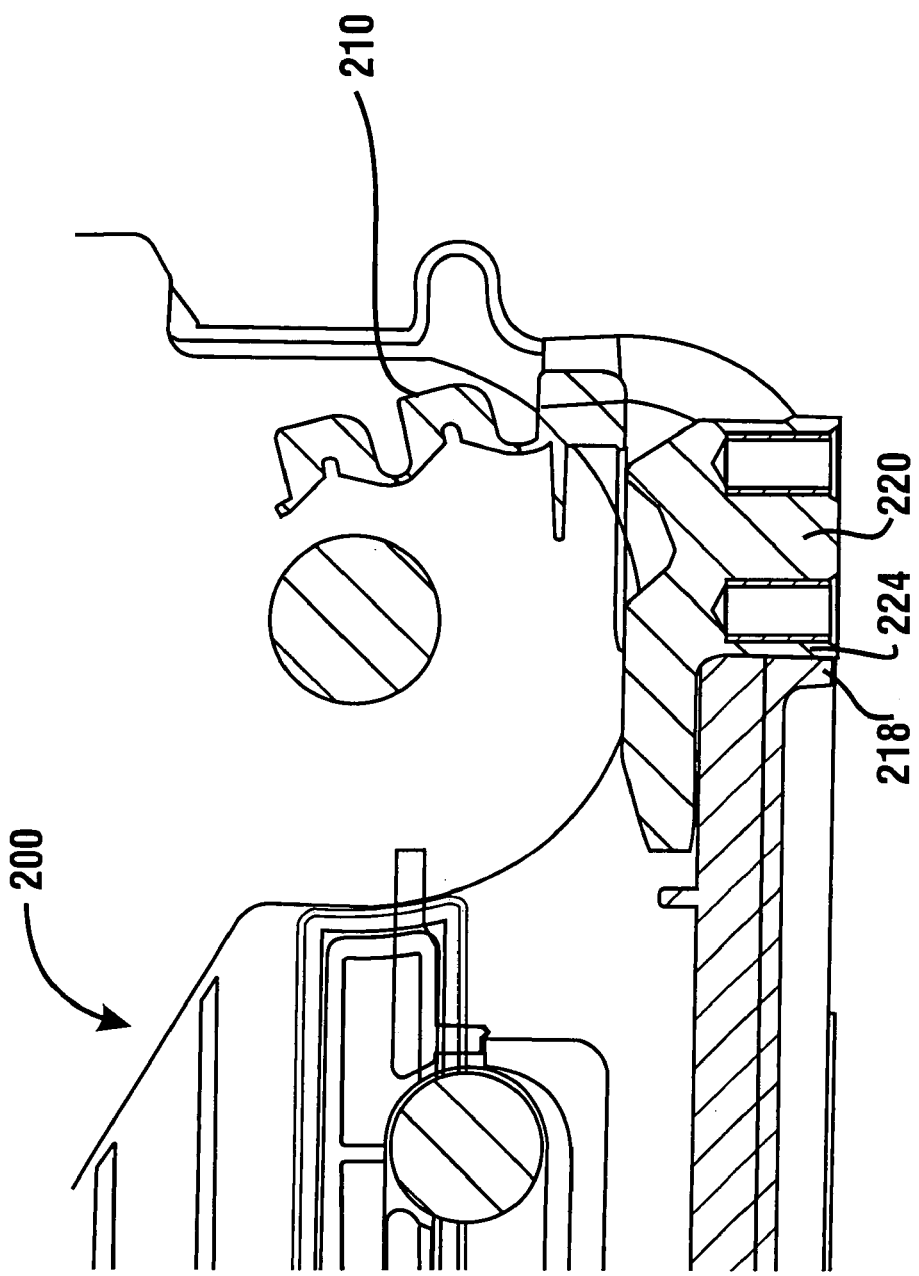
FIG. 26 shows another step in the door opening process.

FIG. 26 shows a second step in the door opening process. FIG. 26, like FIG. 25, is also a cross sectional view taken through the door channel. The cassette 200 has been further moved toward the pin 220, which in this example is stationary. The pin head 222 extends into the door opening 216. The pin body 224 begins to abut the door lip 218. However, in FIG. 26 the door 210 is still in a closed position.

Figure 27:
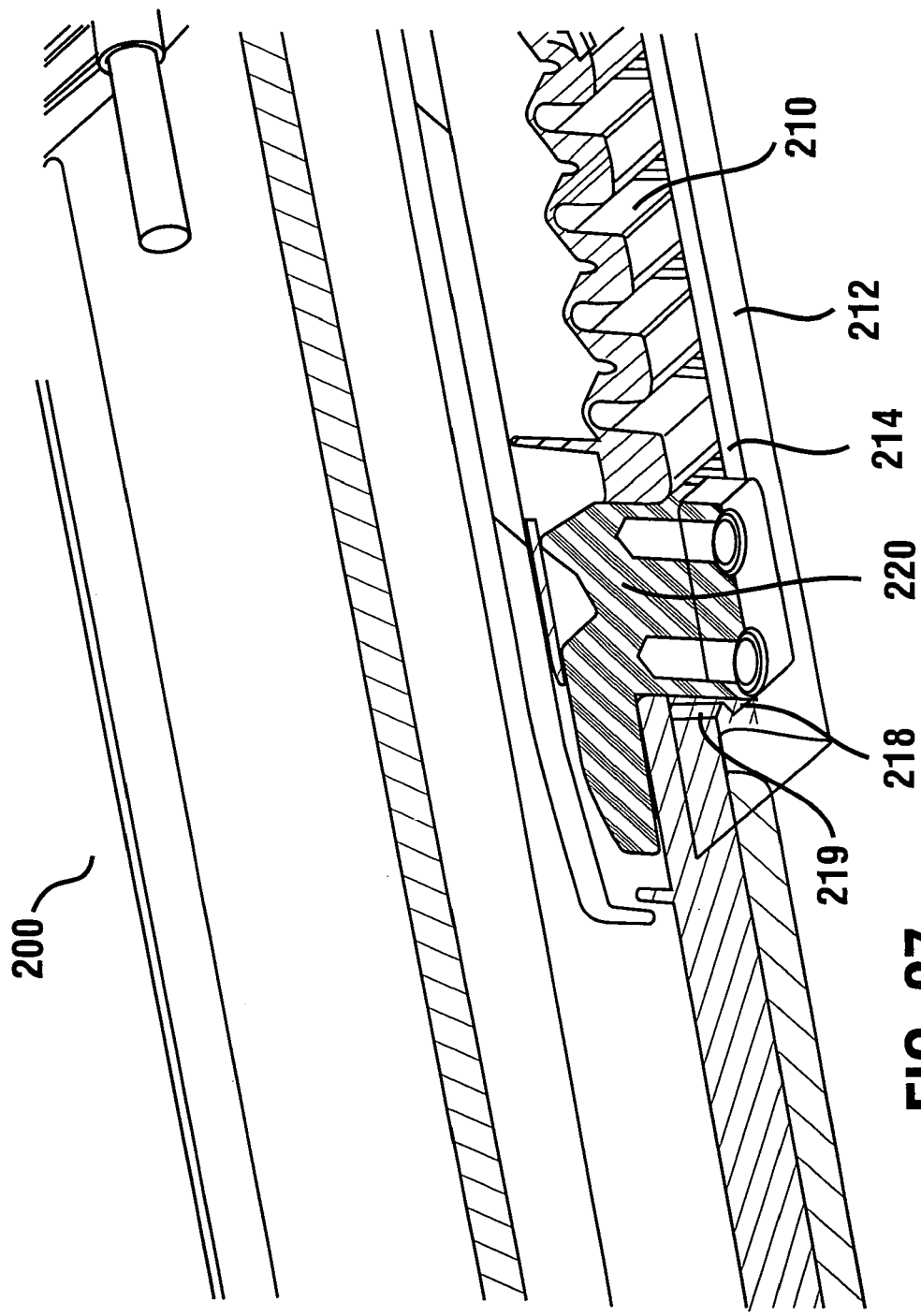
FIG. 27 shows a further step in the door opening process.

FIG. 27 shows a third step in the door opening process. The cassette 200 has been fully inserted. The pin 220 has (relatively) pushed the door lip 218 adjacent to the distant end of the slot 214. The tambour door 210 is in a fully open position. The pin head 222 remains extended through the door opening 216, and the pin body 224 fits in the channel 228.

Figure 28:
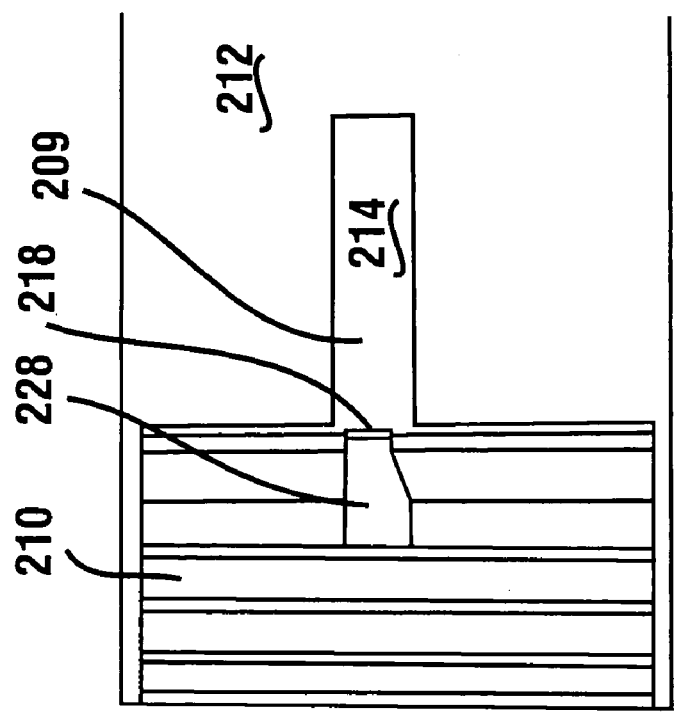
FIG. 28 shows a partial bottom view of a cassette with a door in a partly opened position.

FIG. 28 shows a partial view of the cassette bottom 212 taken with the door lip 218 positioned near the entrance to the slot 214. That is, the tambour door section 210 is in a partly opened position. The tapered channel 228 and a substantially flat (non-tambour) portion 209 of the door 208 are also shown. The flat portion 209 can provide a secure cover for the slot 214 when the door is closed. The door lip 218 may be integrally formed with the flat portion 209. A portion of the door lip 218 may extend from the flat portion 209 a distance substantially equal to the thickness of cassette bottom 212 (and the slot 214). Thus, the door lip 218 can be arranged so that it does not extend past the bottom 212 of the cassette housing.

Figure 29:
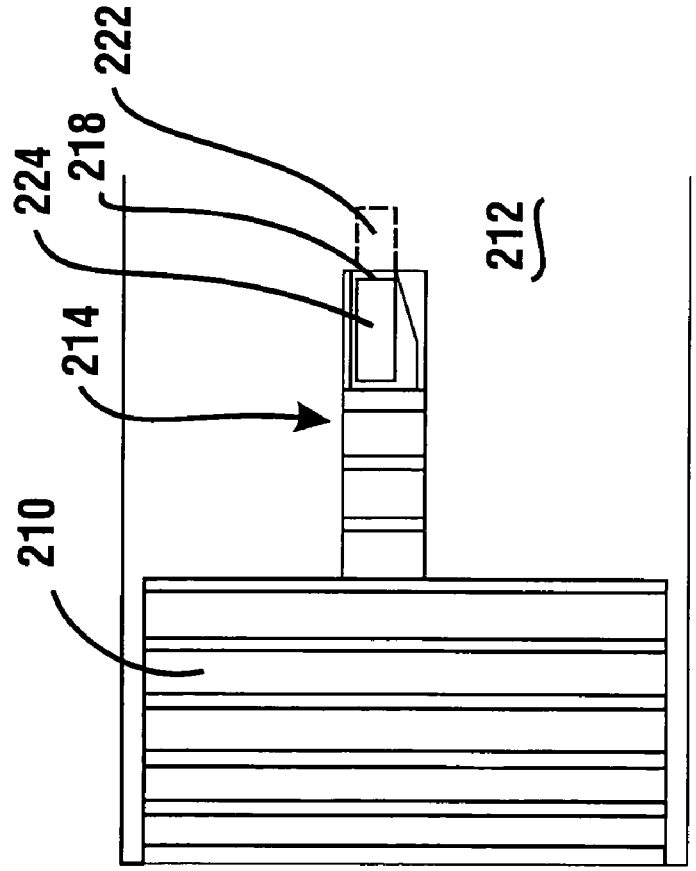
FIG. 29 shows a partial bottom view of a cassette with a door in a fully opened position.

FIG. 29 shows a partial view of the cassette bottom 212 taken with the door lip 218 at the end of the slot 214. That is, the tambour door 210 is in a fully opened position. A tapered pin head 222 (in broken lines) and a pin body 224 are also shown. A part of the furthest-inserted portion of the tambour door 210 can be viewed through the slot 214, whereas the cassette bottom 212 hides the remainder of the furthest inserted portion.

The relationship of the door and pin also includes a security feature. If the tambour door 210 has been prematurely moved (opened) a predetermined distance, such as due to tampering, then the pin 220 will not be able to enter the door channel 228. A door that has been slightly (or greatly) opened causes a tambour portion thereof to curve downwardly which results in blocked entry of the pin head 222 into the channel 228. That is, the opening to the channel is no longer available to the pin head because one or more tambour door strips have been moved between the channel and the pin head to prevent entry of the pin head into the channel. Nor can the pin head 222 enter the door opening 216. Therefore, the pin 220 would not be able to enter the channel 228, engage the lip 218, and open the door 210.

Tampering (or mishandling, etc.) can cause the tambour door 210 to become and remain opened. Even a slightly opened door can cause the door channel 228 to become misaligned with the pin 220, and prevent the cassette from being fully inserted into a dispenser module. That is, if the door is out of alignment (i.e., partly open) prior to insertion, then the pin body 224 will not be able to properly engage the lip 218, and the door cannot be opened by the pin. Rather, the pin head 222 would abut against the exterior of a tambour door section (e.g., at the curved portion). Because a slightly opened tambour door is angularly moved, the opening to the channel 228 would not be properly angularly positioned to receive entry of the pin head 222. The pin head would push against the door exterior (e.g., at a substantially flat or perpendicular angle) and not be able to enter the channel 228. The relative movement of the pin 220 would be stopped by at least one tambour section strip of the door. For example, if the door of FIG. 22 was already partly open, then the pin head 222 would abut a strip section of the door 210 at a location above the channel 228. The partly opened door could not be opened via the pin 220.

In an exemplary arrangement, as a result of the door being partly open and thus misaligned with the pin 220, the cassette cannot be fully inserted into a dispenser module. Thus, the door-to-pin relationship can act as a tamper indicator. The indicator inherently prevents usage of a potentially compromised cassette in a dispenser. A compromised cassette may have an inaccurate currency count. The exemplary arrangement prevents a potentially compromised cassette from being inserted into a dispenser module. The insertion relationship between the cassette and the dispenser module can function as an indicator of possible cassette tampering. For example, the unsuccessful insertion of a cassette into the dispenser module is an indication that the cassette may have been compromised. A problem cassette can be determined responsive to the lack of expected insertion movement of the cassette relative to the dispenser. The problem cassette can be identified for closer inspection, and if necessary a currency recount or other function can be carried out.

In an exemplary arrangement a cassette can also have a tamper indicator device that operates if an opened cassette door has been returned to the closed door position. The tamper indicator device or mechanism can be built into the cassette. As previously discussed, the exemplary cassette can functionally indicate a potential tampering when its door has been at least partly left open. This is due to misalignment during insertion of the cassette into a dispenser. However, a tampered with cassette may have its opened door clandestinely returned to its closed position. The door returned to its closed position may permit alignment of the cassette with the dispenser. The tamper indicator device can be used to reveal this closed-door tampering scenario.

The tamper indicator device can indicate a potential tampering situation by indicating when the door has been returned from an open position to the closed position. An indicator display arrangement can include indicia, such as symbols, numbers, and/or colors. Other indicator display arrangements can also be used, such as the current position (e.g., vertical, horizontal, angular, exterior/interior) of an element or a sole symbol or number. An indicator element may be in the form of a previously discussed indication button for a cassette. An outward extending button can indicate a cassette condition different than when the button is not extended.

An exemplary indicator arrangement comprises two different indicia colors arranged adjacent to each other on a movable display. The colored indicia may be initially displayed as a first color (e.g., green) to represent a secure door (e.g., no indication of tampering), and later displayed (if necessary) as a second color (e.g., red or orange) to represent an indication of potential tampering. The indicia display can be movable parallel or lateral to a face of the cassette. Alternatively, an indicia display may be arranged for rotatable movement. When the display is moved, the color changes. The movable indicia display can be located at an end of the cassette, such as the end opposite the door. The colored indicia can be visible to service personnel through a clear plastic window. Only one color at a time may be visible through the window.

As a result of the door being closed during tampering, the indicia display moves to cause the window to display orange instead of green. That is, the indicia display is moved relative to the window so that the orange has replaced the green showing in the window. A showing of orange is a visual indication to the service person that the cassette has been potentially compromised. In the exemplary arrangement, the tamper indicator device is active when the cassette is in a locked condition. The color can be reset to green when (or automatically as) the cassette is unlocked, such as by use of a key or an inputted code or combination.

A lever, latch, cam, and/or spring-loaded mechanism can be used to move the display to visually change the indicia color when the cassette door has been opened then closed. In an exemplary arrangement, the opening of the door enables an engagement portion of the cassette door to pass by a spring lever. The lever is connected to the indicator display via linkage. The lever is movable (e.g., tiltable) one-way to enable the engagement portion to pass by the lever in a door opening direction. However, return movement of the door in a door closing direction causes the lever to be engaged and tripped, resulting in movement of the indicia display. In the exemplary arrangement, the engagement portion can trip the lever just prior to the door being fully closed. The indicia display can be spring-loaded so that when the door approaches its closed position the lever is tripped causing the spring to release and move the indicia display in a color changing direction. The tripped lever results in the displayed color being visually changed. It should be understood that other (mechanical and/or electrical) arrangements can be used to move the display responsive to closing of the door. That is, other arrangements for operating or moving an indicia or indicator display are within the scope of the invention. For example, another arrangement can comprise a spring loaded rotatable cam instead of a lever.

The exemplary cassette is also able to provide another level of security. For example, a cassette door that has been opened and then returned to its closed position (during tampering) can be kept locked in its closed position. The door can remain locked even if the cassette (while indicating orange) is inadvertently attempted to be inserted into a dispenser. The locked door prevents full insertion of the cassette into the dispenser. Again, unsuccessful insertion of the cassette is a functional indication (or signal or notice) to the service person of a malfunction or impropriety (e.g., potentially compromised) with the cassette. The cassette door can be unlocked when (or automatically as) the cassette is unlocked.

The novel ability to prevent insertion of a potentially compromised cassette into a dispenser can result in a foolproof arrangement. In review, the exemplary arrangement enables a cassette to be prevented from insertion into a dispenser if its door is at least partly open. If the cassette's door was opened and then closed, a visible indication of such action is provided. Even if the cassette handler fails to notice the visible indicator, the cassette still cannot be inserted into the dispenser because the closed door is kept locked. Thus, whether the cassette door is left open or closed after tampering, the exemplary arrangement can prevent the insertion of a compromised cassette into a dispenser. The exemplary arrangement also provides an indication, whether functional and/or visible, that a cassette has been potentially compromised.

The exemplary security arrangement also enables the door of a (non-tampered) cassette to be automatically closed and locked during its removal from the dispenser. During cassette removal the pin 220 returns the door 210 to its closed position. With the cassette door having been opened (during insertion) and then closed (during removal), the door remains in a locked condition. The service person responsible for transporting the cassette can be without the ability (e.g., cassette key) to open the cassette. Thus, the cassette can remain securely locked during its handling and transport.

A dispenser module 229 may include therewith a picker arrangement. A picker arrangement can include a picker shaft driven by a picker drive motor. A stacked module arrangement may include each module having at least one picker mechanism. A picker mechanism can be properly positioned to access and pick media (e.g., currency sheets) from a cassette. The function and operation of a picker arrangement having a picker roller, stripper roller, and take-away roller enable the picking of one sheet at a time from a stack of sheets in a cassette.

The servicing of a currency cassette can include replenishing the cassette with cash before reinserting it into a dispenser module of an automated banking machine. In an exemplary servicing method, a cassette is reloaded with a stack of currency notes. The tambour door is of the cassette is closed. The lid of the cassette is closed and locked. The lid can be locked by using a key to move a latch to a lid locking position. The reloaded cassette is transported to a dispenser of an ATM.

As previously discussed with regard to FIGS. 25–27, the cassette 200 is moved in an insertion direction into a dispenser module. The cassette 200 is moved toward a push pin 220 of the dispenser module. The cassette 200 is aligned with the dispenser module so that movement of the cassette toward the pin 220 causes the pin head 222 to enter a channel 228 in the cassette door 210. As the cassette 200 is further moved toward the stationary pin 220, the channel 228 guides an opening 216 in the cassette door 210 toward alignment with the pin head 222. The channel 228 can be tapered to facilitate both guidance of the pin head 222 therein and guidance of the pin head 222 toward the door opening 216. The pin head 222 can be correspondingly tapered to further facilitate its guidance. The pin head 222 enters and extends through the door opening 216. The movement of the cassette causes the pin body 224 to abut the door lip 218. At this stage of cassette insertion, the cassette door 210 is still in a fully closed position.

As the cassette 200 continues its movement toward the stationary pin 220, the stationary pin body 224 exerts a pushing force against the door lip 218 of the moving cassette. The pushing force causes the door lip 218 to move along the slot 214 of the cassette housing in a door opening direction. The door lip 218 is integral with the cassette door 210. Thus, movement of the door lip 218 causes movement of the door. Further insertion of the cassette 200 into the dispenser causes the door 210 to become further opened. The cassette is moved in the insertion direction until it is fully inserted. When the cassette is fully inserted the tambour door 210 is fully open.

The fully inserted position of the cassette 200 precludes further movement of the cassette in the insertion direction. The push pin 220 has (relatively) pushed the door lip 218 adjacent to the distant end of the slot 214. The fully inserted cassette is operationally positioned adjacent to a picker mechanism of the dispenser module. A picker roller of the picker mechanism can be operated to remove a note from the stack of currency notes in the cassette 200.

An exemplary method of servicing a currency cassette (or an ATM) can include the following steps. Inserting a stack of currency notes into a currency cassette. Closing (or ensuring the closing of) the tambour door of the cassette. Closing the lid of the cassette. Locking the lid with a key operated lock. Wherein the steps of loading the currency into the cassette, closing the cassette door, closing the cassette lid, and locking the lid can be carried out in a service center facility remotely located from the ATM. Transporting the cassette to a dispenser module of an ATM. Aligning the cassette with a cassette-receiving opening of the dispenser module. Inserting the cassette partly into the dispenser opening. Moving (inserting) the cassette toward a stationary push pin of the dispenser module. Further moving the cassette in the insertion direction to cause the push pin head to enter a tapered channel in a tambour door of the cassette. Further inserting the cassette to cause the tapered channel to engage and move along the pin head to align an opening in the cassette door with the pin head. Further inserting the cassette to cause the pin head to enter and extend through the door opening. Further inserting the cassette to cause a lip integral with the tambour door to engage the stationary pin body. Further inserting the cassette while the door lip remains immovably engaged against the stationary pin body. Wherein a cassette housing slot moves relative to the door lip positioned therein, causing the door to move in a door-opening direction relative to the cassette. Further inserting the cassette until it is fully inserted into the dispenser. Wherein when the cassette is fully inserted, the cassette door is fully open. The pin head continues to extend through the door opening of a fully opened cassette door, and the pin body remains in the channel. Furthermore, when the cassette is fully inserted it is operationally positioned adjacent to a picker mechanism of the dispenser module. Wherein a picker roller of the picker mechanism is operative to remove a note from the stack of currency notes in the cassette.

The service method steps can also include removing a cassette from a dispenser module of an ATM. The cassette removing steps can be a reversal of the cassette inserting steps. The removing steps can occur before or after the previously discussed servicing steps of inserting a cassette into a dispenser module. Removal of a cassette from a dispenser module can include the following steps. Partly removing a currency cassette in a withdrawal direction from a dispenser module opening, wherein the door lip is moved away from the stationary pin body, and wherein the pin body engages a tambour door strip. Further removing the cassette while the tambour door via the tambour strip remains immovably engaged against the stationary pin body, wherein the cassette housing slot moves relative to the door lip positioned therein. Further removing the cassette to cause the pin body to disengage from the tambour door strip. Further removing the cassette to cause the pin head to exit the door opening. Further removing the cassette to cause the pin head to exit the channel, wherein positional relation of the pin separated from the tambour door causes the door to be in a closed position. Further removing the cassette until it is fully withdrawn from the dispenser.

Figure 30:
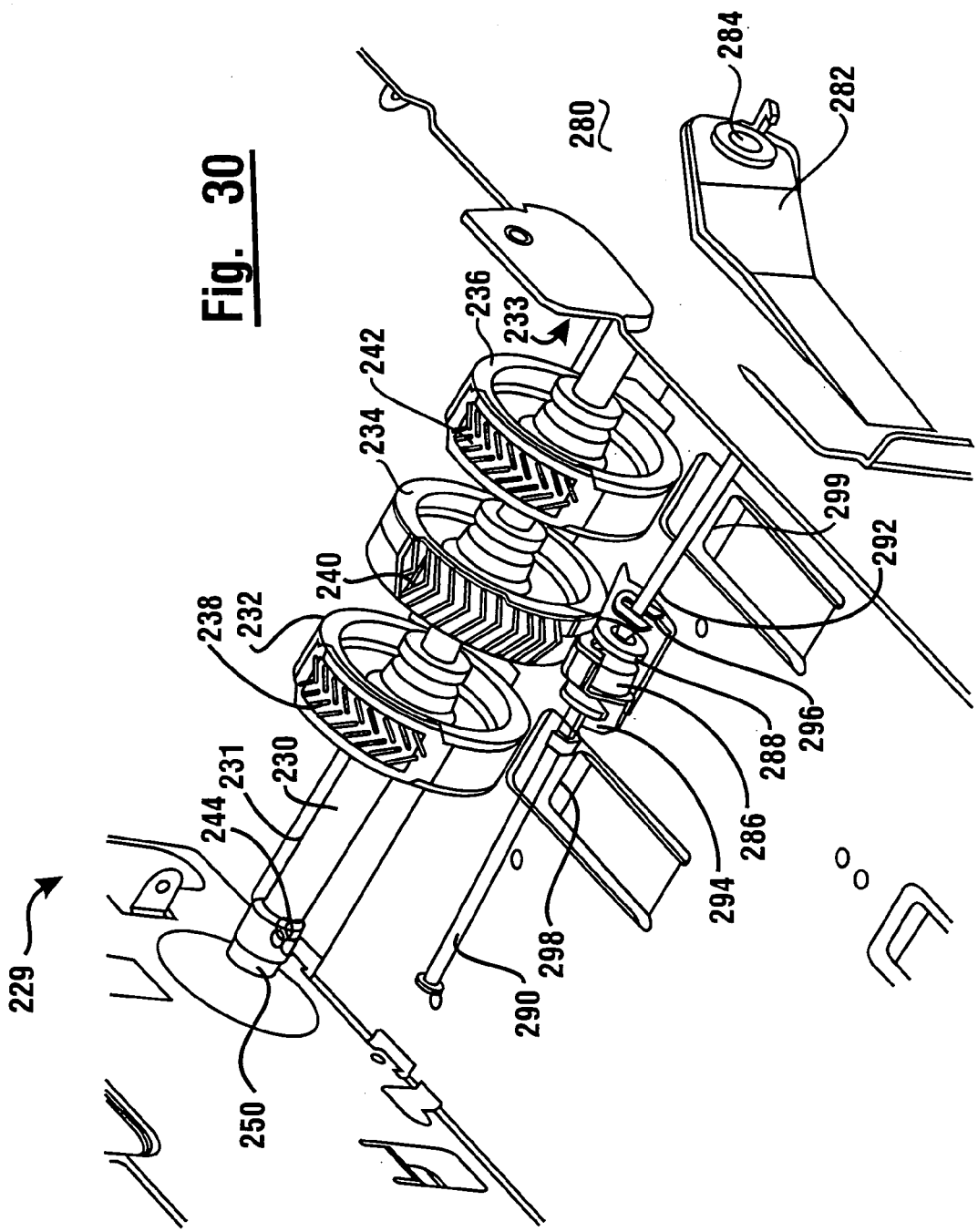
FIG. 30 shows a dispenser module picker mechanism arrangement.

As previously discussed, a picker arrangement in a dispenser module can include a picker roller, stripper roller, and a take-away roller. FIG. 30 shows an exemplary embodiment including a removable picker shaft 230 having picker rollers 232, 234, 236 thereon. The gripper 240 on the center picker roller 234 is circumferentially offset from the respective grippers 238, 242 of the outer picker rollers 232, 236. Thus, the center picker roller 234 can operate to first pick a note from a media (e.g., currency) cassette. Each picker arrangement can be associated with a corresponding media cassette.

FIG. 30 also shows a key and key hole relationship area 244. The picker shaft 230 can have a key hole (or cutout or groove or slot) at a first (drive) end 231 thereof. The key hole can be sized and shaped to receive a correspondingly sized and shaped key (e.g., projection) of a drive pin 250. For example, both the key hole and the key may have mating V-shapes. That is, the picker shaft's V-shaped key hole can receive the drive pin's V-shaped key. The mating permits the drive pin to drive (i.e., rotate) the picker shaft via engagement of at least the key and key hole. Alternatively, a drive arrangement may include the drive pin having the key slot while the picker shaft has the mating key. A key may be an outwardly extending projection, e.g., a projection extending radially and axially from an outer surface.

Figure 31:
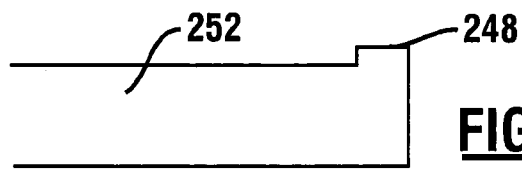
FIG. 31 shows a drive pin having a key.
Figure 32:
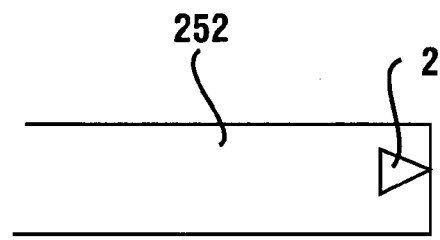
FIG. 32 shows an alternative view of the drive pin of FIG. 31
Figure 33:
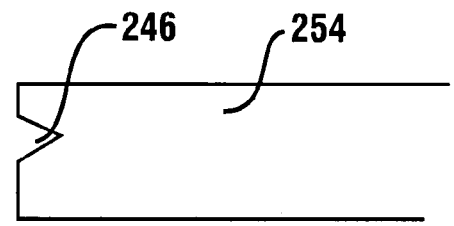
FIG. 33 shows a picker shaft having a key hole.
Figure 34:
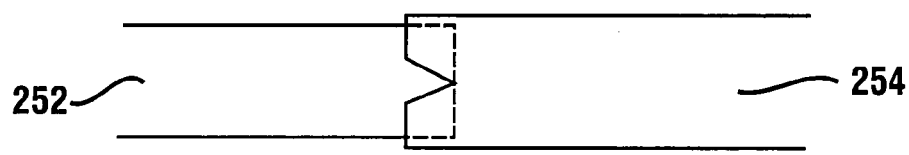
FIG. 34 shows the drive pin of FIG. 32 and the picker shaft of FIG. 33 in a mating arrangement.

FIGS. 31–38 show examples of picker shaft and drive pin mating arrangements. FIGS. 31, 32, and 34 show a drive pin 252 having a key 248. FIGS. 33 and 34 show a picker shaft 254 having a key hole 246. The (female) key hole 246 is operative to receive the (male) key 248, as shown in FIG. 34. The drive pin 252 is able to enter the picker shaft 254 with the key 248 mating with the key hole 246.

Figure 35:
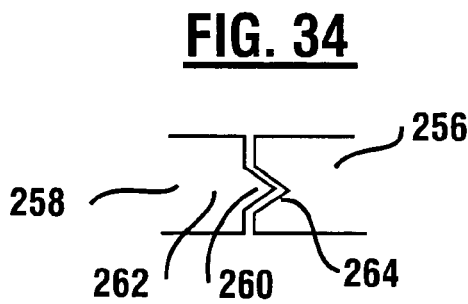
FIG. 35 shows an alternative picker shaft and drive pin mating arrangement.

FIG. 35 shows another mating engagement of a picker shaft 256 and drive pin 258. The picker shaft and drive pin have substantially the same outer diameter. A V-shaped key 260 projects from the remainder of the drive pin body 262. The picker shaft includes a V-shaped cut out slot 264.

Figure 36:
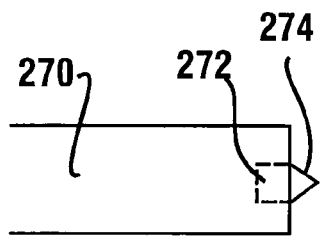
FIG. 36 shows a drive pin having a key and key hole.
Figure 37:
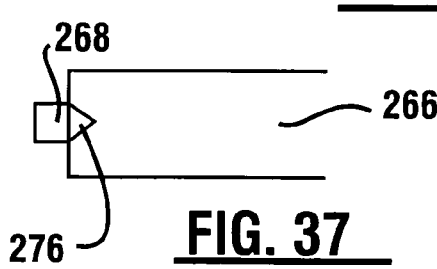
FIG. 37 shows a picker shaft having a key and key hole.
Figure 38:
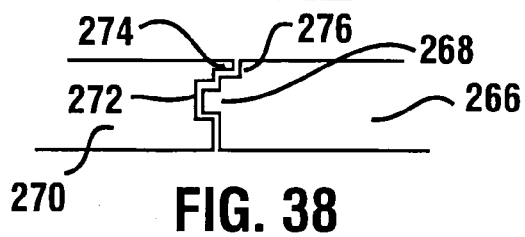
FIG. 38 shows the drive pin of FIG. 36 and the picker shaft of FIG. 37 in a mating arrangement.

FIGS. 36, 37, and 38 show another mating relationship of a picker shaft and drive pin.

The relationship shows a picker shaft 266 having a center axial key 268, and a drive pin 270 having an axial channel key hole 272. The picker shaft is able to engage with the drive pin, with the shaft key 268 mating in the pin key hole 272. The picker shaft 266 also includes a key hole 276 adjacent its outer surface (e.g., circumference), and the drive pin 270 includes a projecting key 274 adjacent its outer surface. The key hole 276 is operative to receive the projecting key 274. Thus, the picker shaft 266 is matingly engaged with the drive pin 270 in at least two locations.

Of course it should be understood that further exemplary embodiments of key and key hole engagement relationships involving a drive pin and picker shaft may be used. For example, the male/female mating arrangements of the drive pin and picker shaft may be reversed in any of FIGS. 31–38.

Additionally, a key may be an inwardly extending projection, e.g., extending radially and axially from an inner circumferential surface.

Referring again to FIG. 30, the picker shaft 230 also has a second (free) end 233 (i.e., the end opposite the drive end 231). The picker shaft can have a constant diameter or a varying diameter. For example, the free end may include a smaller diameter guide pin, such as a pin similar to center axial key 268. The free end can be supported in an opening (or slot or hole) in a side wall 280 of the dispenser module 229. The opening may extend to a closed wall portion (e.g., the wall side disposed from the guide pin). For example, the free end can be held or supported in a wall hole without passing through the closed wall. Alternatively, the wall can have a hole passing entirely therethrough so that a portion of the free end extends out of the side wall.

FIG. 30 shows a module side wall 280 having a tab 282. The tab can be cutout from the dispenser module side wall 280. The tab can comprise a laser cut metal wall tab. Thus, the tab can be integral with or of one-piece construction with the metal wall of the dispenser. Alternatively, the tab can be separately fastened or connected to the dispenser module body. The tab can be a springy or resilient or biasing member, such as a spring loaded tab. The tab 282 can have an opening or hole 284. As previously discussed, the free end portion 233 of the shaft 230 can be held or supported in the tab hole 284. The tab hole 284 enables the shaft end 233 to be retained from movement in a manner further described hereinafter. In exemplary arrangements, the tab 282 can comprise a previously discussed latch 54 or tab 56.

The resiliency of the tab 282 is operative to retain (or trap) the picker shaft 230 in mating connection with the drive pin 250 (at the key). That is, the tab 282 can be positioned to hold the picker shaft in engagement with the drive pin by applying a continuous force pushing against the picker shaft in a direction toward the drive pin. Alternatively, the tab 282 can be positioned to hold the picker shaft in engagement with the drive pin while the tab is in an unbiased or relaxed state. The tab can become active when necessary to retain the shaft. Also, the shaft may or may not have a certain amount of axially play relative to the drive pin. Nevertheless, any attempt by the shaft to axial move (with or without play) out of mating engagement with the drive pin results in a retaining force being applied against the picker shaft by the tab. The tab prevents disengagement of the picker shaft from the drive pin.

The tab 282, in different exemplary arrangements, can have different resting positions (unbiased normal state) relative to the dispenser wall 280. For example, a tab can be neutrally biased in a position extending (flared) inward from the dispenser wall 280. Thus, pushing the tab outwardly in a direction toward the dispenser wall 280 places the tab in a biased state, and the tab tries to return (in an inwardly direction) to its unbiased state. Another arrangement can have the tab in its unbiased state when it is substantially parallel with the dispenser wall. A further arrangement can have the unbiased tab extending (flared) outwardly from the dispenser wall.

The shaft free end 233 can force the free end of the tab 282 in an outward direction (away from the drive pin) during manual insertion of the picker shaft 230 into operative engagement with the drive pin 250. The outwardly pushed resilient tab tries to return (inward) to its resting position. That is, the outwardly biased tab attempts to retract to its unbiased (normal) state.

Hence, after the picker shaft is inserted, the retention tab 282 acts to produce a spring force against the picker shaft. This spring force results in the picker shaft being retained (or locked) in its operating position.

Figure 39:
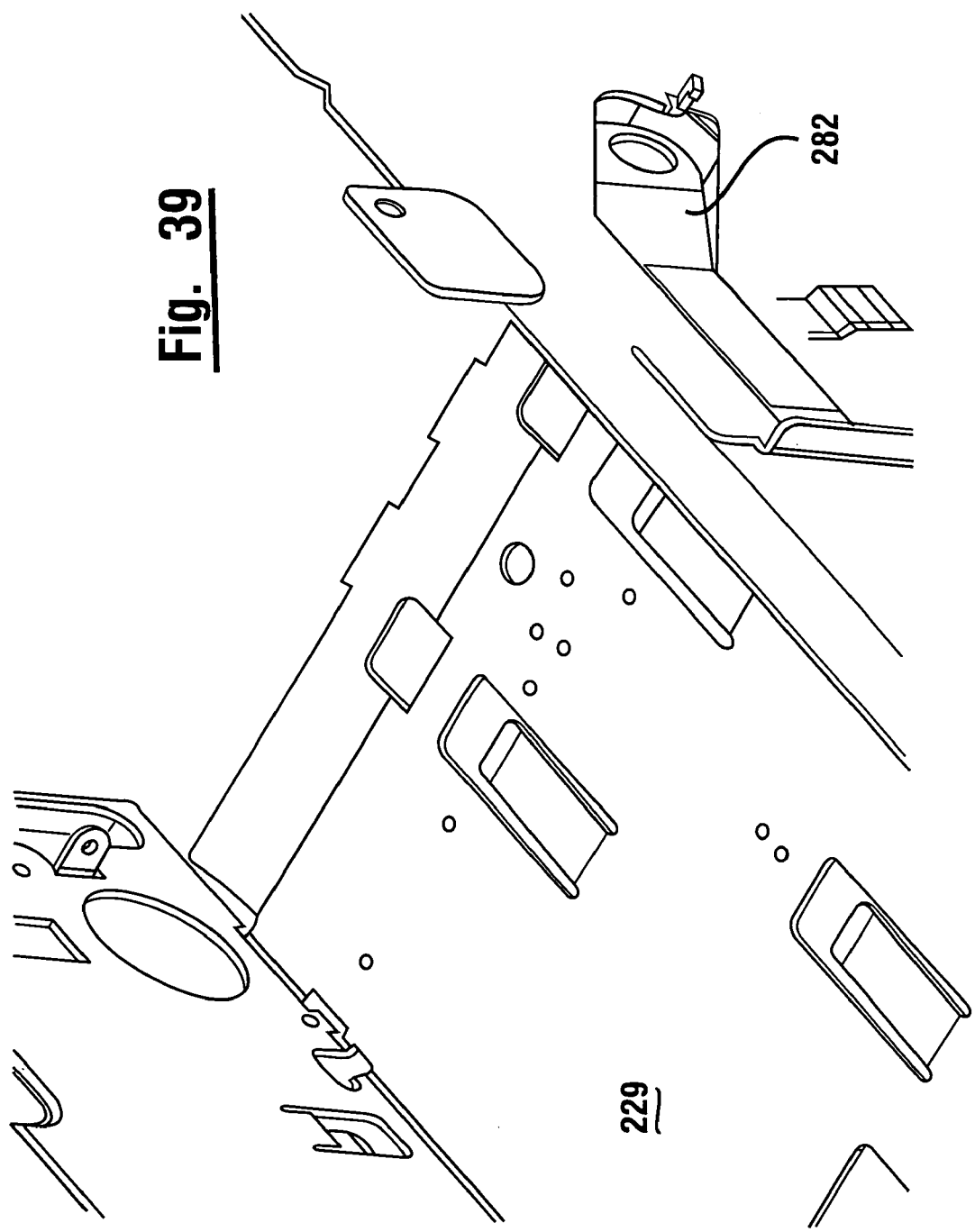
FIG. 39 shows a dispenser module without the picker shaft.

Removal of the picker shaft 230 from the dispenser can occur by moving (e.g., manually moving) the shaft in an axial direction (e.g., relative to the shaft axis) toward the tab 282 until the drive pin key is disengaged from the picker shaft key hole. This movement causes the tab to (further) move in a direction away from the drive pin 250. Alternatively, instead of using the picker shaft to move the tab outwardly, the tab may be directly moved by a service person's hand. With the picker shaft and drive pin disconnected, then the shaft drive end 231 (which in this example has the key hole) can be moved (e.g., lifted or raised) in a direction radially away from the drive pin 250. The shaft drive end 231 can then be moved out of alignment with the drive pin. The shaft can then be moved in a generally axially (and upwardly) direction away from the tab 282 to release the shaft free end 233 from the supporting opening in the tab. FIG. 39 shows the dispenser module 229 of FIG. 30 without the picker shaft and drive pin arrangement therein.

Installation of the picker shaft 230 in the dispenser module 229 can be performed as reversal of the disengagement procedure. The opposite end is inserted into the opening located in the free end of the tab 282. The tab is manually forced (either directly by hand or via the shaft) in a direction away from the drive pin. While the tab is held in a biased condition, the drive end of the picker shaft is mated with the drive pin. Thereafter, the tab is released. The released tab retracts (if necessary) in a direction toward the drive pin to retain the picker shaft in mating engagement with the drive pin. Thus, a picker shaft can be quickly inserted (e.g., dropped or lowered) into or removed from its operating position in a dispenser module. The mating arrangement and the spring tab arrangement permit efficient securing of a picker shaft in a dispenser. The use of additional hardware and fastening parts can be eliminated.

The function and operation of a picker roller, stripper roller, and a take-away roller provide for picking one sheet at a time from the stack of sheets in the cassette. FIG. 30 also shows a stripper roller 286 on a pivotable shaft 290, and a take-away roller 288 on another pivotable shaft 292. The rollers 286, 288 can be removably mountable on their respective shaft. Both the stripper roller and the take-away roller are oppositely adjacent to the center picker roller 234.

The stripper roller 286 can operate to generally prevent exit of all but the first sheet from a currency or other sheet stack in a currency or other sheet holding cassette. The stripper roller 286 can have a one-way clutch or other device to permit or restrict rotational movement in only one direction, e.g., in a direction to return an excess currency note(s). The one-way clutch or other device is operative to resist rotation of the stripper roller 286 in a direction which would facilitate movement of sheets other than the end sheet from the currency stack.

The take-away roller of an exemplary embodiment can freely rotate to assist in moving a currency note away from the center picker roller. The take-away roller may be driven through engagement with the center picker roller.

The pivotable shaft 290 is operative to pivot (or swing) the stripper roller 286 in an arcing direction away from the picker shaft 230. Likewise, the pivotable shaft 292 is operative to pivot (or swing) the take-away roller 288 in an arcing direction away from the picker shaft. Of course the shafts 290, 292 can also pivot the respective rollers 286, 288 toward the picker shaft 230. The ability to move the rollers 286, 288 away from the center picker roller 234 (and each other) enables the rollers to be efficiently serviced or replaced.

A fastener member 294 is operative to hold the pivotable shaft 290 of the stripper roller 286 in an operating position. Another fastener member 296 is likewise operative to hold the pivotable shaft 292 of the take-away roller 288 in an operating position. The fastener or retaining members 294, 296 are operative to releasably clamp a pivotable shaft in a fixed operating area or range. The fastener members 294, 296 can prevent substantial upward (and downward) movement of their respective shaft. The fastener members 294, 296 can also be used to limit the extent of movement of a respective roller in the direction toward the center picker roller 234. The retaining members 294, 296 are operative to limit movement of the respective shafts 290, 292 in at least two perpendicular directions. The fastener members 294, 296 can be attached to the dispenser module 229.

A fastener member can comprise a spring clip. The fastener members 294, 296 can be spring biased to produce a clamping force. The clamping force can be set at a force level such that it can be manually overcome. For example, a fastener member can have a tapered entrance with two flanges forming an opening. The opening can normally be of a diameter smaller than the diameter of a pivoting shaft. Moving a pivoting shaft through the entrance can cause the opening to expand. After the pivoting shaft passes through the entrance the opening can retract to its unbiased (normal) state, thus retaining (or locking) the pivoting shaft in the fastener member.

Biasing or spring members can be used to bias the pivot shafts toward the picker shaft. Resilient spring member 298 produces a force (e.g., push) against the pivot shaft 290 so that the stripper roller 286 is properly positioned adjacent to the center picker roller 234. Likewise, another resilient spring member 299 functions to maintain the take-away roller 288 properly positioned adjacent to (e.g., abutting) the center picker roller 234. The spring members (e.g., spring tabs) can be cut out from the dispenser module floor. The spring members can comprise laser cut metal. Thus, the spring members can be integral with or of one-piece construction with the dispenser. Of course this arrangement is merely exemplary and in other embodiments other arrangements may be used.

The spring members 298, 299 and fastener members 294, 296 can function together to properly position the rollers 286, 288 adjacent to the center picker roller 234. For example, the spring member 298 and fastener member 294 enable play in the pivot shaft 290. This allows the stripper roller 286 to move (if necessary) when plural currency sheets are simultaneously being picked.

Figure 40:
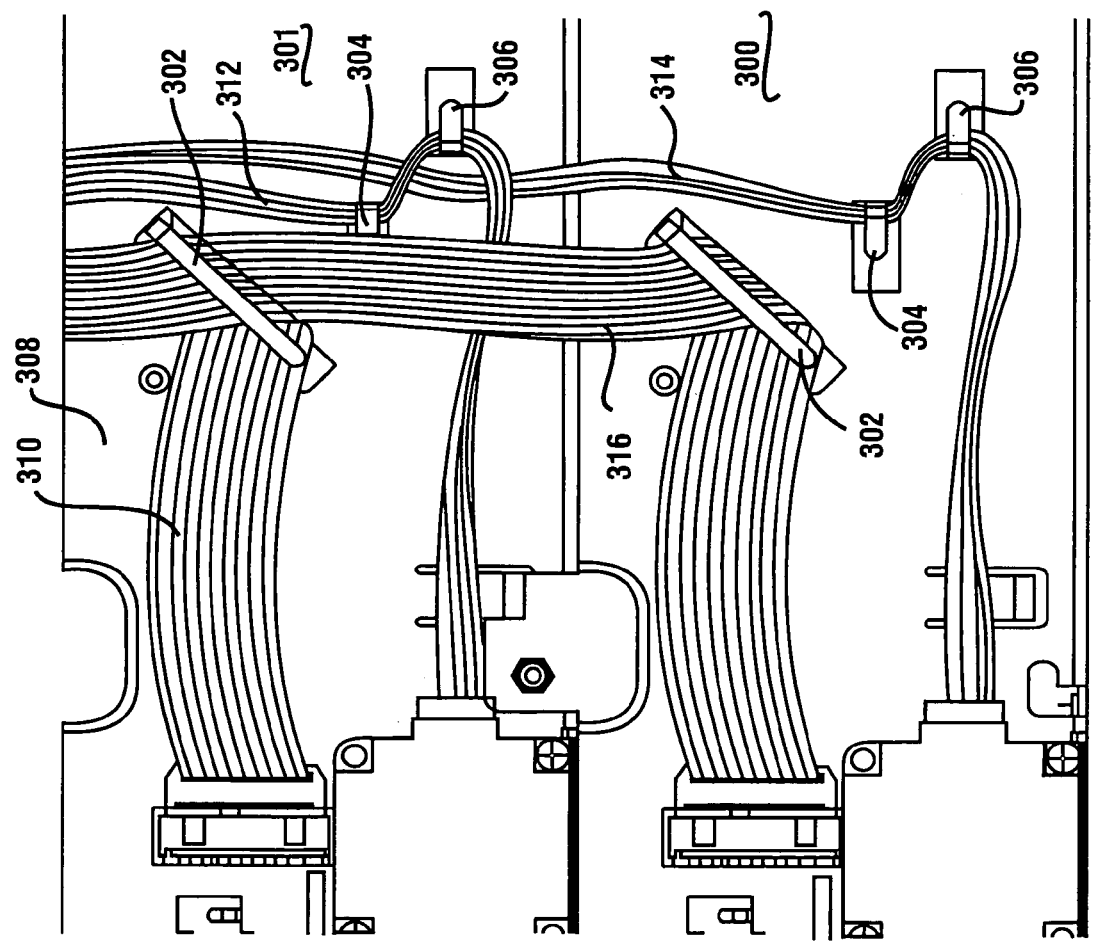
FIG. 40 shows stacked dispenser modules having formed wire supports.

FIG. 40 shows an arrangement of stacked dispenser modules 300, 301. The modules 300, 301 may be similar to the modules previously discussed. Each module may include tab supports for wires, bundles of discrete wire, and/or ribbon cables. FIG. 40 further shows tabs 302, 304, 306 associated with modules 300, 301. The tabs can be used to route or guide wires so that they do not become tangled or interfere with dispensing operations. For example, a wire operatively connected to a picker drive motor may be supported via one or more tabs. The tabs can comprise stamped in wire routing fasteners or clips. A tab can be formed from a module. For example, a tab can be laser cut from a module wall portion 308 (e.g., metal wall). Thus, a tab may be integral or one-piece with a module wall. A tab may also be formed with a non-metal wall (e.g., plastic wall), such as in a plastic molding process.

A tab may be flexible, with one end attached to a module wall while another end is freely movable. A clip may also be spring biased to retain or lock a wire in a particular position or location. The biasing force of a clip may be manually overcome. A free end of a clip may also have an inwardly directed lip or flange to assist in wire retention. For example, a module wall clip may be similar in shape and lip to a writing pen clip. A module may include different tabs of various shapes and sizes. FIG. 40 further shows wires 310 supported by tabs 302, and wires 312 supported by both tabs 304 and 306 in the module 301. The tabs in module 301 can likewise support additional wires. Shielded wires can be routed against a module sheet metal surface using formed tabs. An arrangement of wall-formed tabs can eliminate the need of additional (separate) parts to route and secure wires. It follows that the handling of the additional parts can also be eliminated.

Furthermore, formed tabs for securing plural wire bundles can be positioned relative to each other so as to allow additional securement of the wires. The arrangement of tabs can be predetermined so that a wire bundle of a first module provides support to one or more wire bundles of an adjacent second module. For example, tabs can be arranged so that a wire bundle of a higher module can cross over or overlap one or more wire bundles routed from a lower module in such a way that additionally secures the lower bundles as they continue upward (e.g., up the side of modules). FIG. 40 shows a higher wire bundle 312 crossing over (in the module 301) an extended lower wire bundle 314, and a higher wire bundle 310 overlapping (in the module 301) an extended lower wire bundle 316. Other arrangements for providing additional wire securement due to crossing over or overlapping may also be used. For example, lower wire bundles may be used to further secure higher wire bundles. Additionally, the same tab in a module may be used to support different wire bundles from the same module or from different modules.

An exemplary form of an automated banking machine includes an advanced function dispenser (AFD). The AFD includes one or more dispenser mechanisms operative to transport media (e.g., currency notes) from a storage area in a media cassette to a user (e.g., customer) of the automated banking machine. In an exemplary form of currency note dispensing, a currency note can be picked from a cassette by a note picker mechanism. As previously discussed, the picker mechanism may include a picker shaft and picker rollers. The picked note can then be transported in a first (e.g., vertical) direction via belts to a note presenter. The presenter is operative to move the note (or stack of notes) in a second (e.g., horizontal) direction to present the note(s) to the user.

It should be understood that the terms vertical and horizontal are merely exemplary and that the dispenser mechanism may be configured to transport notes in other varying directions. For example, a dispenser mechanism may be positioned such that a picked note is transported in an angled (e.g., horizontal) direction via belts away from a picker mechanism toward a note presenter, and then transported in another angled (e.g., vertical) direction from the note presenter to the user. Alternative note transport arrangements may have a picked note transported directly to the user without a change in transport direction.

Figure 41:
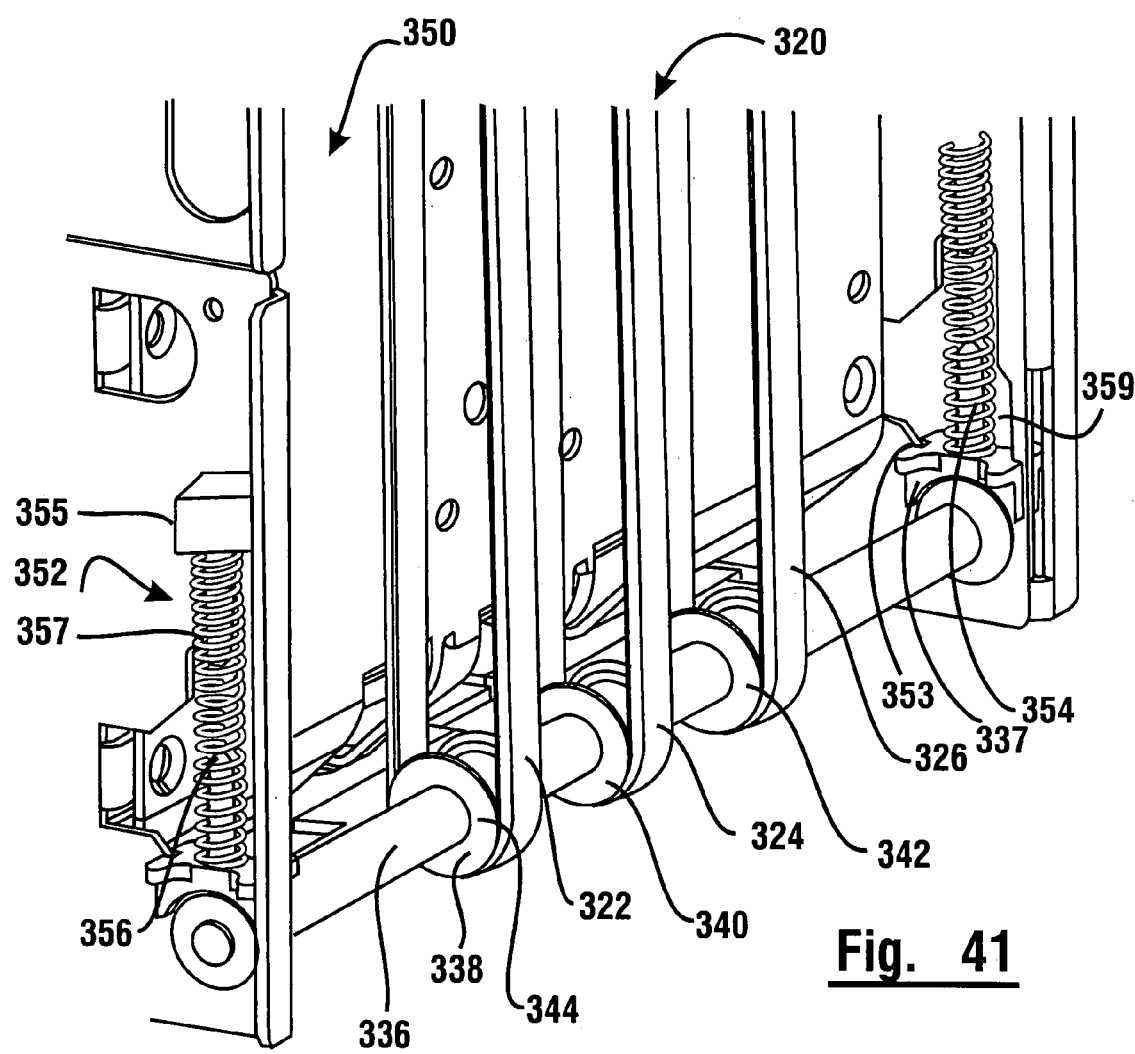
FIG. 41 shows a view of a lower portion of a vertical transport mechanism.
Figure 42:
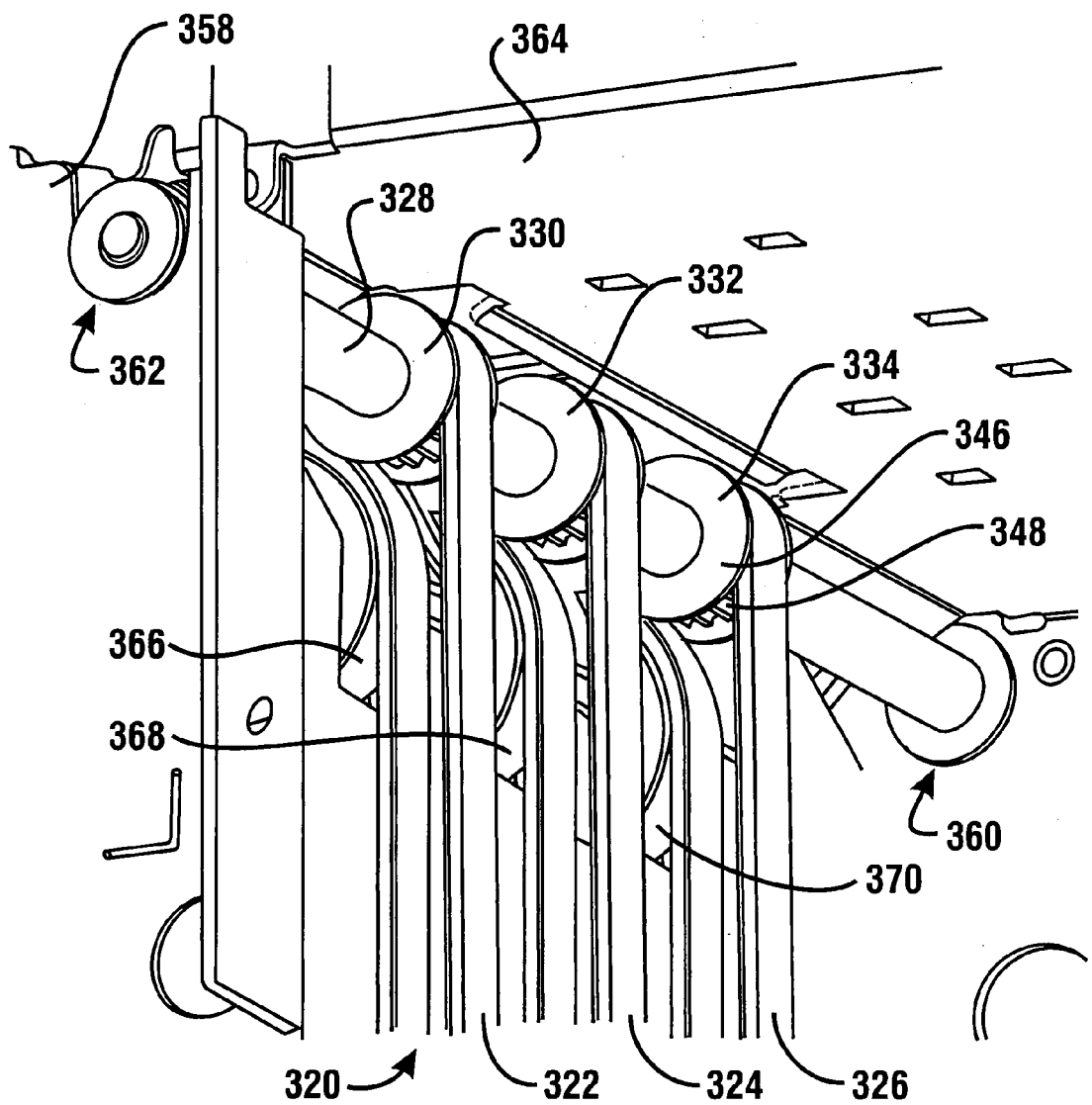
FIG. 42 shows a view of the upper portion of the vertical transport mechanism.
Figure 43:
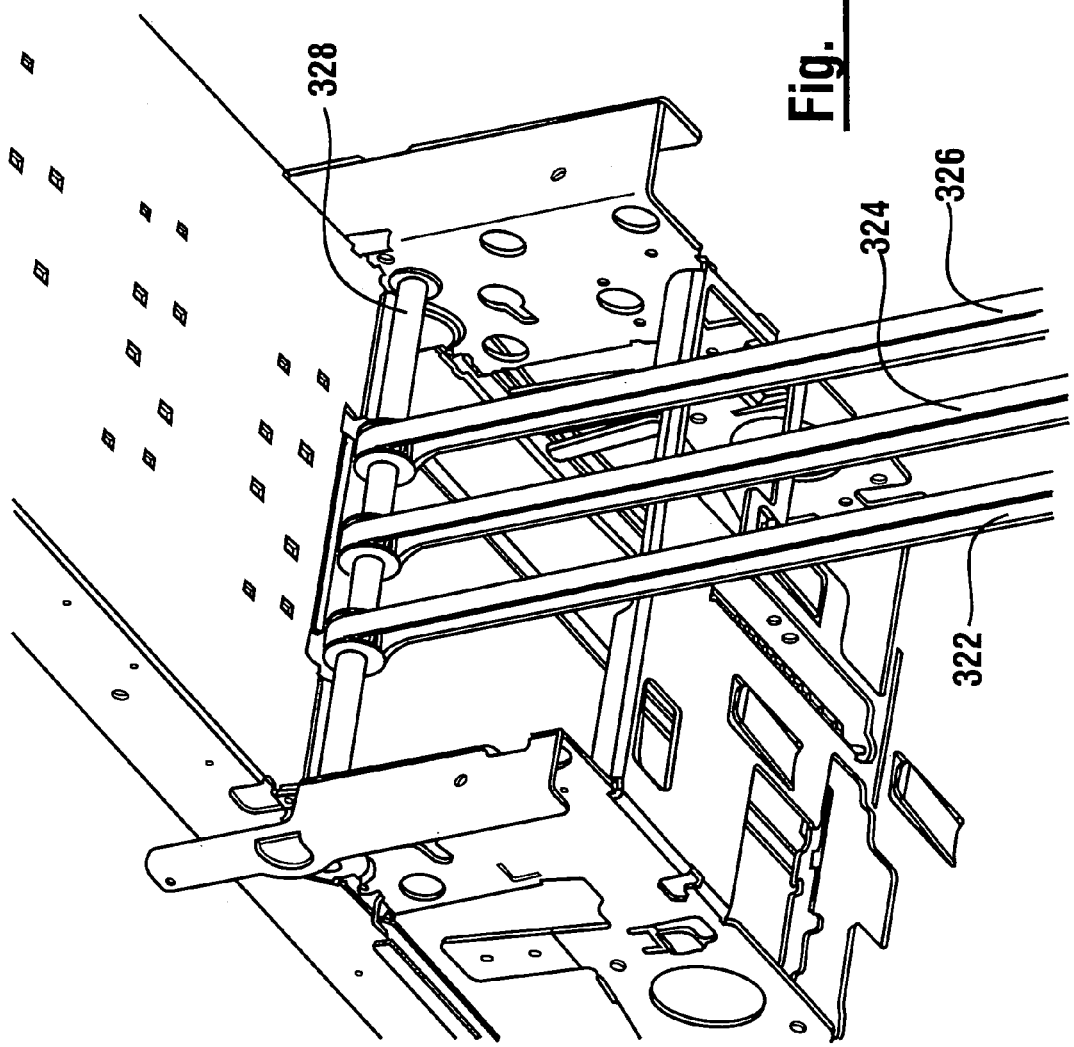
FIG. 43 shows another view of the upper portion.
Figure 44:
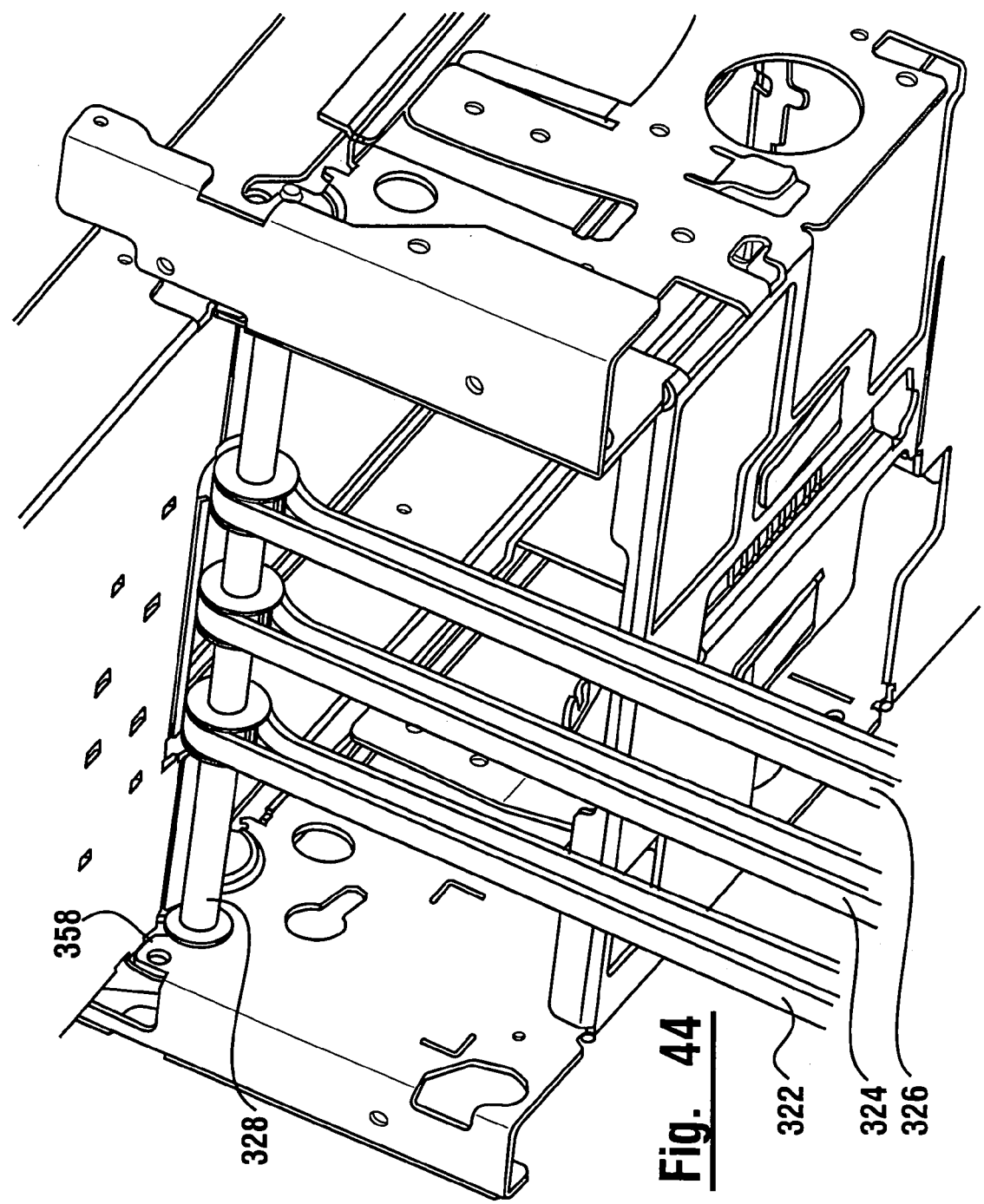
FIG. 44 shows an additional view of the upper portion.

FIGS. 41 and 42 show an exemplary arrangement for transporting media in a first direction (e.g., vertical direction) in a dispenser. The arrangement can transport media from adjacent a picker mechanism toward a presenter mechanism. FIG. 41 shows a view of the lower portion of a vertical transport mechanism 320 while FIG. 42 shows a view of the upper portion of the vertical transport mechanism 320. FIGS. 43 and 44 show additional views of the upper portion. The vertical transport mechanism can be supported in a dispenser adjacent to a plurality of stacked dispenser modules. For example, the vertical transport mechanism may be arranged adjacent to an inner wall of the dispenser housing, with the inner wall facing the modules' picker mechanisms.

The vertical transport mechanism 320 includes a plurality of belts 322, 324, 326 on corresponding rotatable rollers 330, 332, 334. The belts used in the vertical transport mechanism can be timing belts. Each roller 330, 332, 334 on an upper roller shaft 328 is matched with a corresponding roller 338, 340, 342 on a lower roller shaft 336. The upper shaft 328 can be a drive shaft, with the upper rollers 330, 332, 334 being drive rollers. The lower shaft 336 can be an idle shaft (e.g., freely rotatable shaft or driven shaft), with the lower rollers 338, 340, 342 being idle rollers. For example, belt 322 can ride on driving roller 330 and free roller 338. The idle shaft 336 can be driven by the drive shaft 328 via the belts.

Both the lower and upper rollers can have side flanges 344, 346 to assist in retaining a belt thereon. That is, the rollers can have a concave outer circumferential surface configuration. The concavity of the rollers assists in preventing belt slippage and serve to maintain the belts in engaged relation with the rollers.

Figure 45:
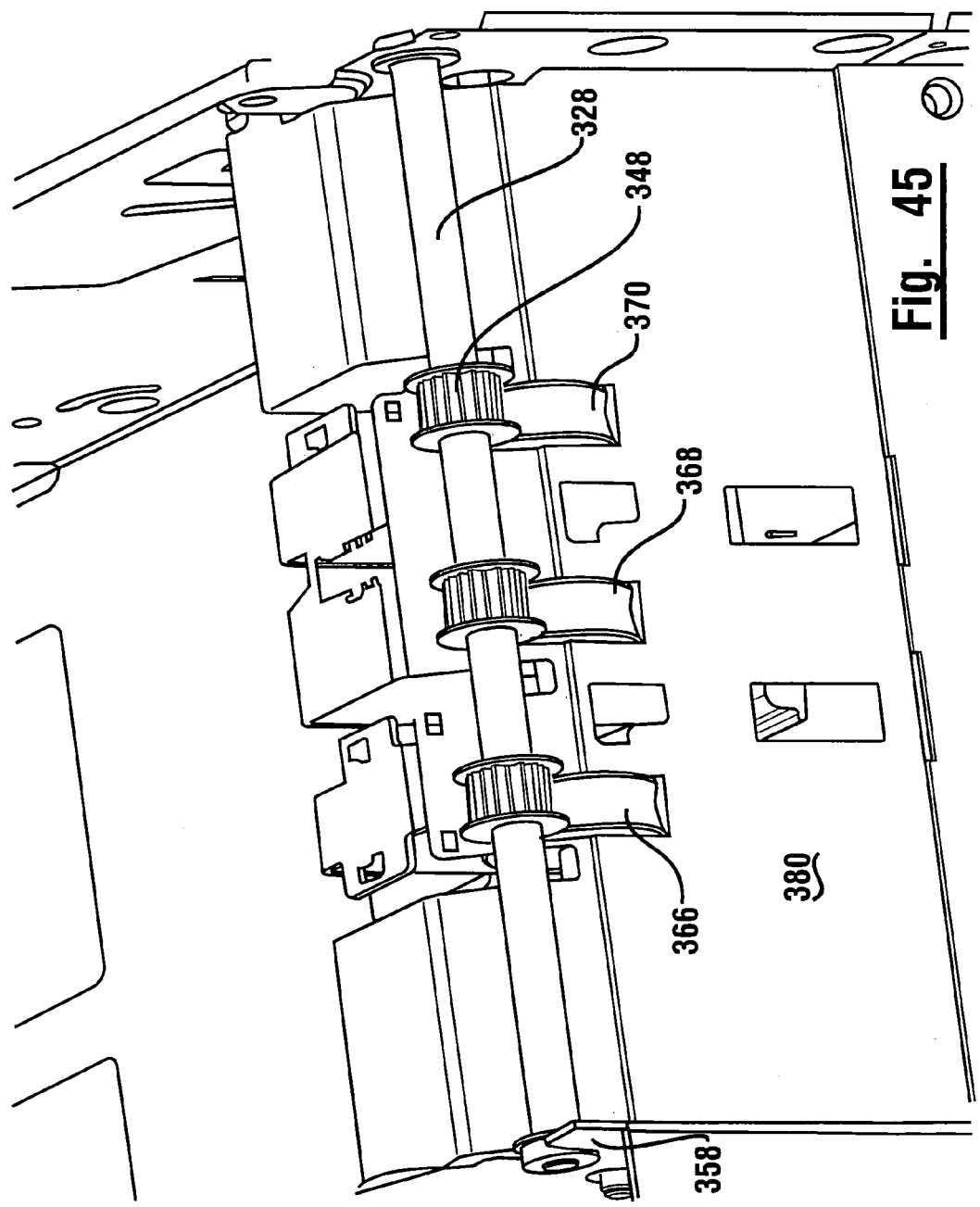
FIG. 45 shows a view of drive shaft rollers.

The drive shaft can have grooved timing pulleys. The upper shaft rollers 330, 332, 334 can also have teeth (e.g., bumps, slots, projections, grippers, friction members) 348 to assist in driving (e.g., gripping) the belts. The idle shaft can have non-grooved spindles. The lower shaft rollers 338, 340, 342 can be smooth (e.g., without teeth). FIG. 45 shows a view of upper shaft rollers without belts thereon.

The belts can be operated to vertically transport currency notes (or other types of sheet media) intermediate the belts and a transport wall 350. The transport wall may be comprised of aligned walls of stacked dispenser modules. One face (e.g., a flat surface side) of a note can slide against the wall while the other face of the note is engaged with and driven by the belts. Each of the belts can be arranged so that all the belts simultaneously engage the same single note. It should be understood that the belts can also simultaneously transport spaced notes that are sequenced back to back. For example, a second note may be entering the belts before the first note has exited therefrom. In an exemplary arrangement, three belts are equally spaced relative to each other in order to grip and move a currency sheet. However, it should be understood that a greater or fewer number of belts may be used to move sheets.

In an exemplary arrangement, the lower shaft 336 can be vertically movable relative to the upper shaft 328. For example, the upper shaft can be fixed from movement in a first direction (e.g., vertical direction) relative to a housing of the machine while the lower shaft can be movable relative to the housing in the first direction. A biasing arrangement can be used to continually bias (e.g., push) the lower shaft in a direction away from the upper shaft. FIG. 41 shows a biasing arrangement 352 including torsion springs 354 adjacent ends of the lower shaft 336. The springs 354 may be attached to sliding blocks 355 arranged in tracks or guides. A block can be attached to the upper end of a spring 354. The vertically movable blocks 355, loaded with the springs 354, can hold the idle shaft 336 under tension.

The ends of the lower shaft 336 can be retained in a respective bearing flange 337 that is slidable in a sheet metal slot 359 in the dispenser housing. The flange 337 can be guided in the slot 359 via tongue and groove arrangements 353. FIG. 41 shows a flange 337 extending on both sides of a slot 359. Each bearing flange 337 can be attached to the lower end of a spring 354. A spring guide 356 is attached to the bearing flanges 337. The blocks 355 also have spring guides 357.

The spring loaded lower shaft 336 can maintain the belts in a state of tension (e.g., keeping the belts tight) even though they may have stretched over a time period. As the belts stretch the blocks (and bearing flanges) fall due to gravity, causing the belts to be kept in tension. The spring force, block weight, and bearing flange weight can be predetermined to maintain the necessary tension in the belts. The spring arrangement can be operative to maintain the belts at generally the same tension force throughout movement of the lower shaft. The spring loaded lower shaft arrangement assists in preventing belt slippage.

The biasing arrangement 352 may also include a ratchet arrangement. One or more ratchet devices can be ratcheted one-way so that the lower shaft cannot move (e.g., upwardly) toward the upper shaft to reduce belt tension. Several different ratchet arrangements can be used. For example, the blocks can be attached to a ratchet device. A block ratchet device prevents the block from backtracking (e.g., moving upwardly). Likewise, the bearing flanges can be respectively attached to ratchet devices to prevent their backtracking. In other ratchet arrangements, the ratchet device may include spring loaded cams which only permit one-way movement of a first cylinder (or shaft or pin) relative to a second cylinder. The cylinders may be telescoping. Again, the lower shaft biasing arrangement enables the belts to be kept at a tightness which permits them to be driven to transport the notes.

FIGS. 42-45 also show that the upper roller shaft 328 can be supportingly positioned in a supporting frame 358. One end of the upper shaft can be positioned in an opening 360 in the frame while the other end can be seated in a slotted opening 362 in the frame. In other arrangements, both ends of the drive shaft can be seated in slotted openings. Thus, the drive shaft can be quickly positioned in the dispenser frame. Once the drive shaft is positioned in the frame, then it can be retained or trapped in its position by closure of a platen or cover 364. The installed cover 364 prevents removal of the drive shaft from the slot 362.

FIGS. 42 and 45 further show rotatable guide rollers 366, 368, 370. The guide rollers may be part of a note presenter mechanism. The presenter can include the guide rollers on a shaft. The guide rollers are operative to abut or push into the belts 322, 324, 326 to direct or guide the notes therefrom. The guide rollers are operative to abut or push into the belts 322, 324, 326 to direct or guide the notes therefrom. The guide rollers are operative to provide curvature to the belts. The guide rollers impart directional curvature to a note leaving the belts. The guide rollers can rotate in conformity with the belts to move a note therebetween in the same direction. The notes are guided by the guide rollers toward the presenter.

As shown in FIG. 42, the guide rollers 366, 368, 370 can respectively partially extend beneath the drive rollers 330, 332, 334. Thus, the belts 322, 324, 326 can also ride on the guide rollers. The curvature and position of the guide rollers relative to the drive rollers permit notes to be separated (or removed) and guided away from the vertical belts. The curved positioning of the guide rollers against the belts enables the notes to leave the belts and ride on the guide rollers. In an exemplary arrangement, gravity causes the notes to leave the belts. In another exemplary arrangement, the guide rollers contain a note gripping sticky cover material. As shown in more detail in FIG. 45, the guide rollers 366, 368, 370 can have a dish-shaped (e.g., concave) outer circumferential surface portion. The concavity of a guide roller can assist in maintaining or retaining a belt thereon.

Figure 46:
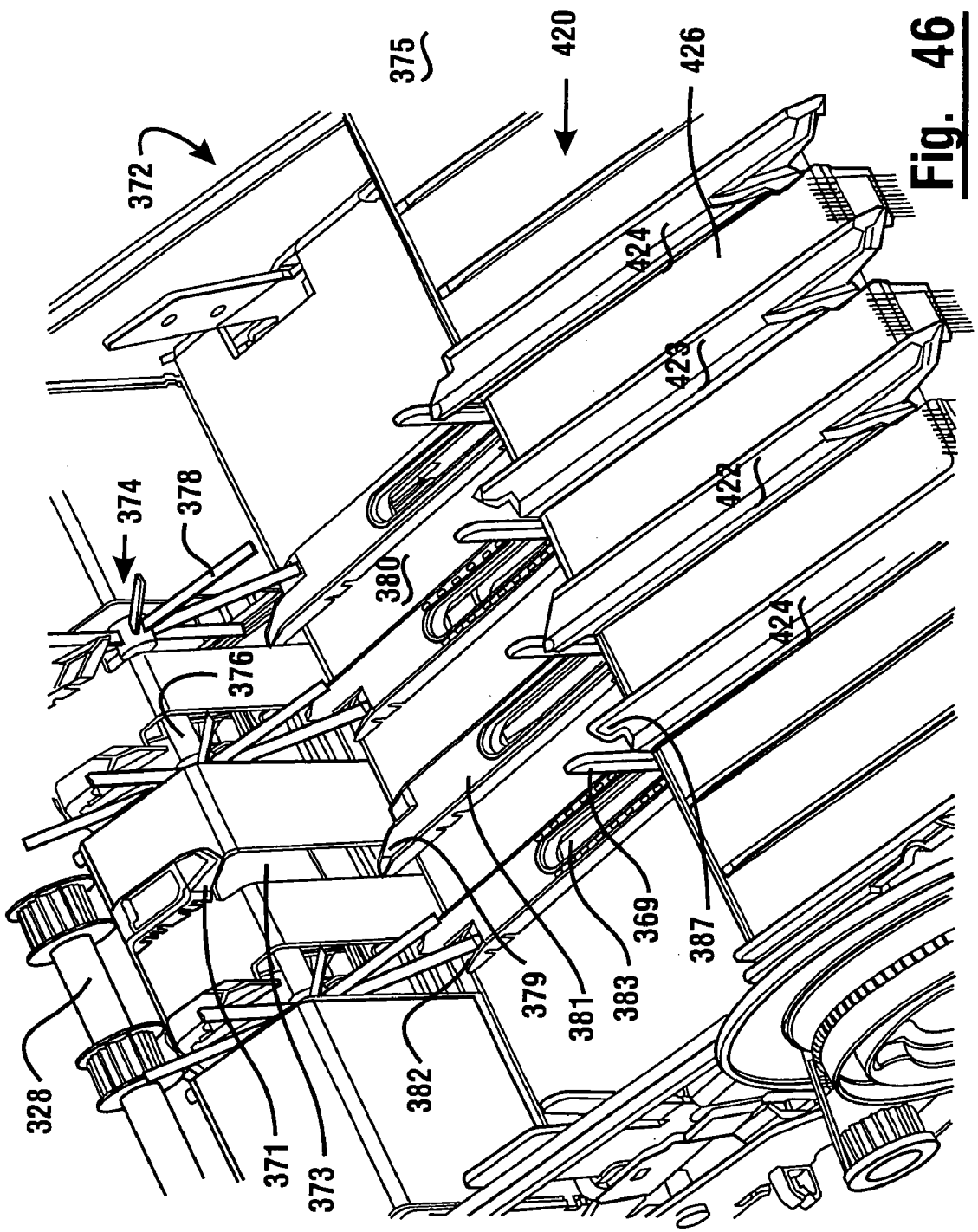
FIG. 46 shows a partial view of a horizontal transport mechanism.

FIG. 46 shows an exemplary arrangement for transporting media in a (horizontal) direction substantially perpendicular to the transporting direction of the vertical transport mechanism 320. FIG. 46 shows a view of a horizontal transport mechanism 372 of a media dispenser. The transport mechanism 372 can be part of a note presenter 375. The note presenter can be removably attached to the top of a dispenser module. The transport mechanism 372 can include the previously discussed rotatable guide rollers 366, 368, 370.

The horizontal transport 372 includes paddle wheels 374 rotatable on a common paddle wheel shaft 376. Currency notes leaving the vertical belts 322, 324, 326 of vertical transport mechanism 320 can be engaged by the paddle wheels 374. The paddle wheels 374 are operative to cause a note to transfer from the vertical transport mechanism 320 to the horizontal transport mechanism 372.

The paddle wheels 374 each include a plurality of individual paddles 378. The paddles can be flexible and/or noodle-like but with sufficient resiliency to impart a force to urge sheets to move. Each paddle wheel can have its paddles angularly aligned with the paddles of the other wheels. Therefore, at least one paddle on each wheel can contact a note at substantially the same (simultaneous) time. Commonality of engagement with a note permits the note to remain in relatively fixed alignment during engagement with the paddle wheels. This aligned simultaneous note engagement enables the paddle wheels to move a note without substantially twisting or skewing the note.

The paddles 378 are operative to engage a note leaving the guide rollers 366, 368, 370. The paddles 378 can direct the note to a note stacking tray 380 where plural notes can be stacked one upon another. The tray has rails 381 on which the generated stack can rest. The rails 381 have reduced or tapered end surfaces 382 for corresponding passage of the outer circumference surface of a respective paddle 378. A tapered surface permits the tip or distal end of a paddle to avoid (or slightly contact) the tray during its rotation. The use of the tapered end surfaces 382 can extend the life of the paddles 378.

In an exemplary arrangement, the presenter 375 includes a presenter floor rail arrangement 420. As shown in FIG. 46, slots 383 in the tray rails 381 are configured to receive an end portion 387 of floor rails 422, 423, 424. The slots 383 can be open at one end. The tapered ends of the tray rails 381 include an extended portion 379 that is operative to be matingly aligned with separated portions 371 of the floor rails 422, 423, 424. As can be seen in FIG. 46, the extended portions 379 of the tray rails 381 are axially movable in a respective slot 373. The slots 373 also guide the tray 380 during its axial movement. Likewise, tray guides 369 can be positioned adjacent the tray 380 to guide the other end of the tray 380 during its axial movement. The slots 383 enable the tray to ride on the tray guides 369. Thus, the tray 380 can be raised to horizontally align the tray rails 381 with the floor rails 422, 423, 424. A fully raised tray results in the tray rails and the floor rails sharing a common plane. A fully raised tray causes each set of the three horizontally aligned rails (e.g., rails 371, 381, 422 at same elevation) to act as a single rail.

Adjacent raised guide floor rails 422, 423, 424 produce a parallel channel or groove therebetween. The bottom or base of the push device 390 can have projections that can correspondingly mate into the channels. The male/female relationships of the rails and base enable the push device to accurately slide in parallel alignment relative to the presenter floor rails. This parallel movement of the push device also enables the push device to realign and rerail belts so as to assure belt engagement with the supporting rolls.

The dispenser can include a divert container (or cassette). A divert container is operative to receive and store therein diverted media. Diverted media (e.g., currency notes, sheets or bills) can be that which was determined to have some type of problem (e.g., an unacceptable media condition) by the automated banking machine and is not to be presented to a user (e.g., unpresentable media). For example, a note which failed a test by a note validator may be sent to a divert container. A dispenser may include a divert container located adjacent to (e.g., beneath) the presenter. The note tray 380 can be arranged to pivot to removably drop unacceptable notes into the divert container. A note tray may be adjacent blocking structure that keeps notes from inadvertently entering (or falling) into the divert container. For example, the tray guides 369 can be used to prevent notes from leaving the tray during note stacking, yet allow the tray to tilt to release notes into a divert cassette. The open ended tray slots 383 enable the end of the tray to pass through the tray guides 369 during the tilting of the note tray 380.

Figure 47:
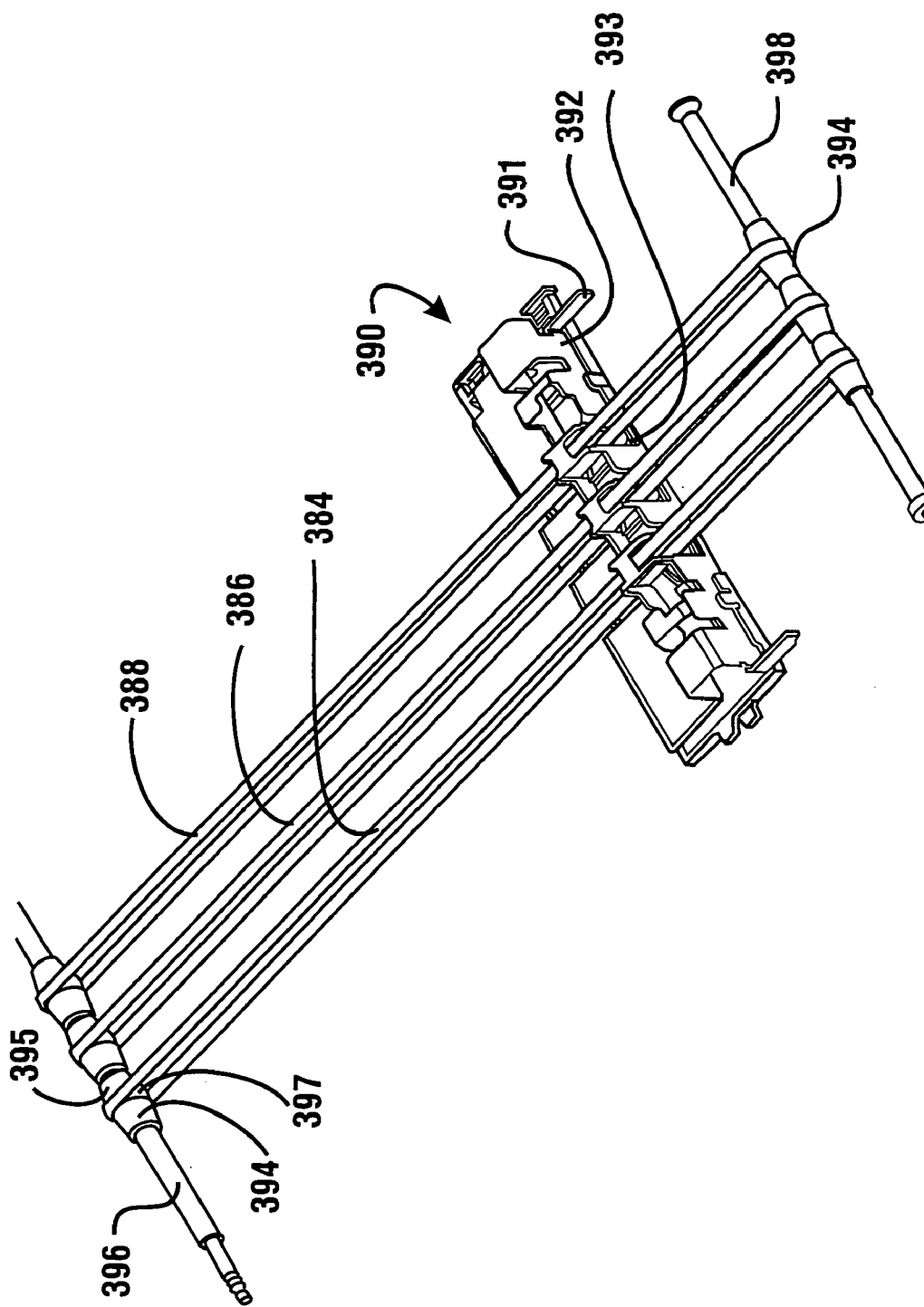
FIG. 47 shows a presenter belt and push plate arrangement.

FIG. 47 shows an exemplary presenter belt arrangement. After a presenter note tray is filled with the desired number and/or denomination of notes, then the tray 380, with the note stack thereon, can be lifted to proceed with presenting the note stack to a user. The presenter belt arrangement is operative to movingly engage the top of a lifted note stack. The presenter belts 384, 386, 388 rotate on rollers 394 of shafts 396, 398. The tray 380 is raised with the note stack eventually engaging the presenter belts.

FIG. 47 also shows a push device 390 including a push plate 392. The presenter belts 384, 386, 388 are operative to move the push device 390 therewith. In alternative arrangements, the push device can be moved independently of the belts. The push plate 392 can engagingly push a note stack as the push device 390 moves parallel to the aligned belts 384, 386, 388. The presenter belts can pass through respective openings 393 in the push plate. The push plate can surround the belts. That is, the belts can be trapped in the push plate. The push plate is operative to move along the belts to push at least a portion of a note stack in a user presenting direction. Thus, the presenter belts can work together with the push plate 392 to transport the notes as a stack.

The push device 390 is located in a starting position behind the raised note stack. The positioning enables the push device to receive and push the note stack toward the presenter exit. During transport the note stack can be contacted by the belts 384, 386, 388, the push plate 392, and one or more walls (e.g., floor) of the presenter. The floor of a presenter can include one or more raised rails on which a note stack can ride or slide. The raised rails can engage the notes with a smaller surface that results in less friction and smoother note sliding. The push device 390 can further include guides 391 to assist in keeping a note stack in alignment with the push plate. In an exemplary stack moving process, a note stack is moved by the belts 384, 386, 388 and push plate 392 from the note tray 380 toward a user in a direction away from the paddle wheels 374.

The push device 390 is able to assist in realigning and rerailing the belts. The belts 384, 386, 388, shaft rollers 394, and push device 390 are arranged relative to each other to cause automatic rerailing of the belts. That is, the arrangement can cause self realignment of a belt relative to its rollers.

The shaft rollers 394 are configured to assist in realigning the belts 384, 386, 388. The rollers 394 can be crowned (e.g., convexly tapered). The outer circumferential surface of a crowned roller 394 includes a center (rail) portion 397 located between tapering portions 395. The center portion has a larger diameter than the tapering portions. The center portion 397 can comprise a non-tapering substantially flat plateau or rail on which a belt can ride. The diameter of each tapering portion 395 narrows in a direction extending away from the center portion 397.

The push plate 392 can assist in realigning the belts 384,386,388. As previously discussed, the belts can be trapped in the push plate. Should a belt become disengaged far enough from one (or both) of its rollers 394, then movement (horizontally) of the push device 390 is operative to engagingly move or return the disengaged belt close enough to a taper 395 of the empty crowned roller 394. Once the belt reaches the roller taper 395, it can climb the taper to the center 397 of the roller. Thus, the arrangement of crown rollers 394 and the push plate 392 permits the belts 384, 386, 388 to be automatically readjusted, realigned, and/or rerailed on the crown rollers 394.

The roller shafts 396, 398 can also be vertically movable to compensate for varying stack heights or thicknesses. The shafts may be spring biased in a (downward) direction toward a note stack. For example, a biasing arrangement similar to the previously discussed biasing arrangement 352 for the idle shaft 336 may be used. Thus, the belts are operative to engage different sized stacks. It follows that the presenter is operative to present different sized stacks of currency notes to a user.

In an exemplary note transport process, notes are guided into the note stacking tray 380 by the paddle wheels 374 to form a note stack in the note presenter 375. The note stack rests on the tray rails 381. The note tray 380 is raised until the tray bottom is substantially aligned with a presenter floor 426. A fully raised tray also causes the tray rails 381 to be respectively aligned with the floor rails 422, 423, 424. With the rails in substantial alignment, the push device 390 is operative to push a note stack out of the tray 380 and onto the floor rails of the note presenter. The push device is further operative to push the note stack along the floor rails toward the roller shaft 398 and the presenter exit.

Figure 48:
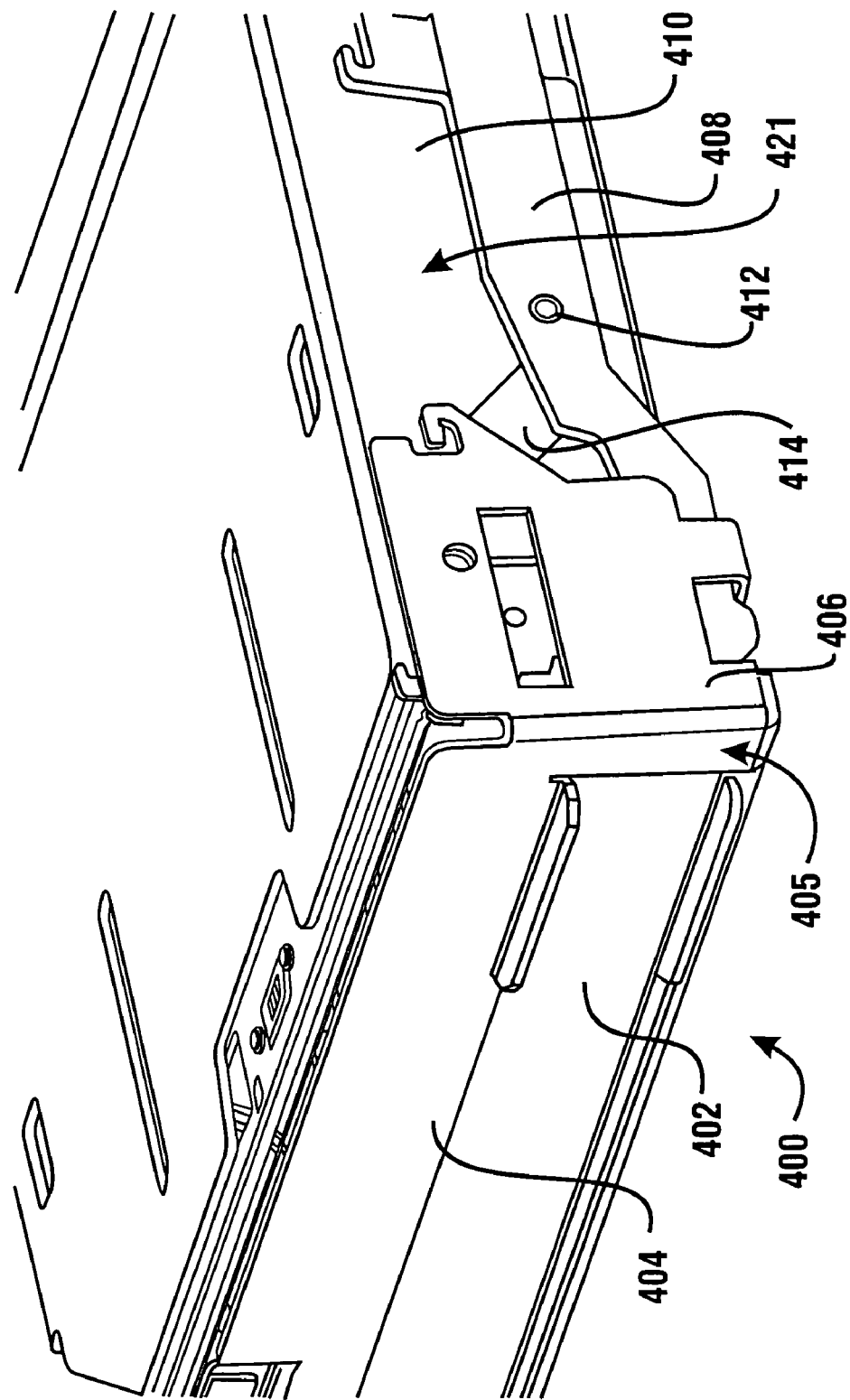
FIG. 48 shows a presenter gate arrangement with a gate in a closed position.

A stack of currency notes may be presented to a user through a presenter gate arrangement. The gate arrangement can be a part of the presenter 375. The gate arrangement can include a gate or door or cover. FIG. 48 shows a presenter gate arrangement 400 having a gate 402 in a closed position.

Figure 61:
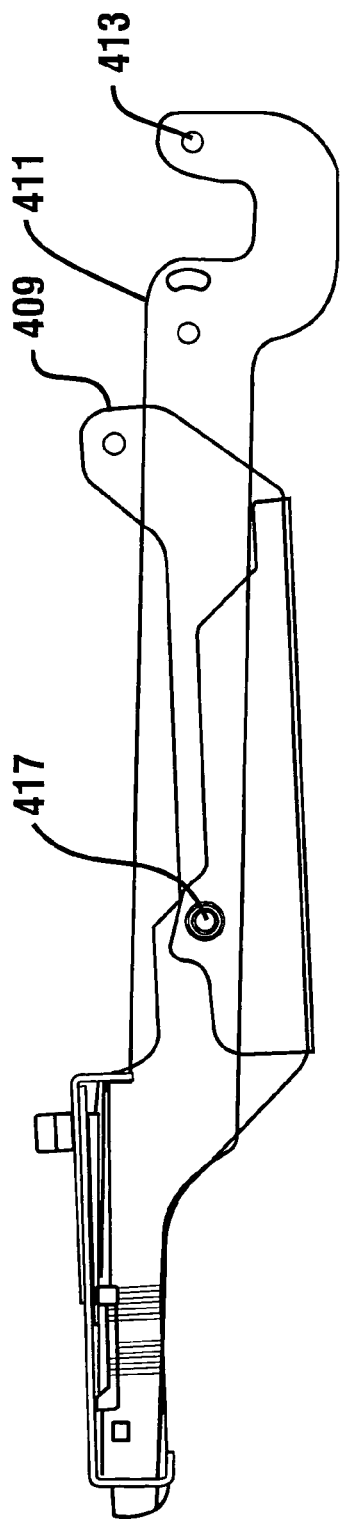
FIG. 61 shows an angled view of a dual cam arm arrangement.
Figure 62:
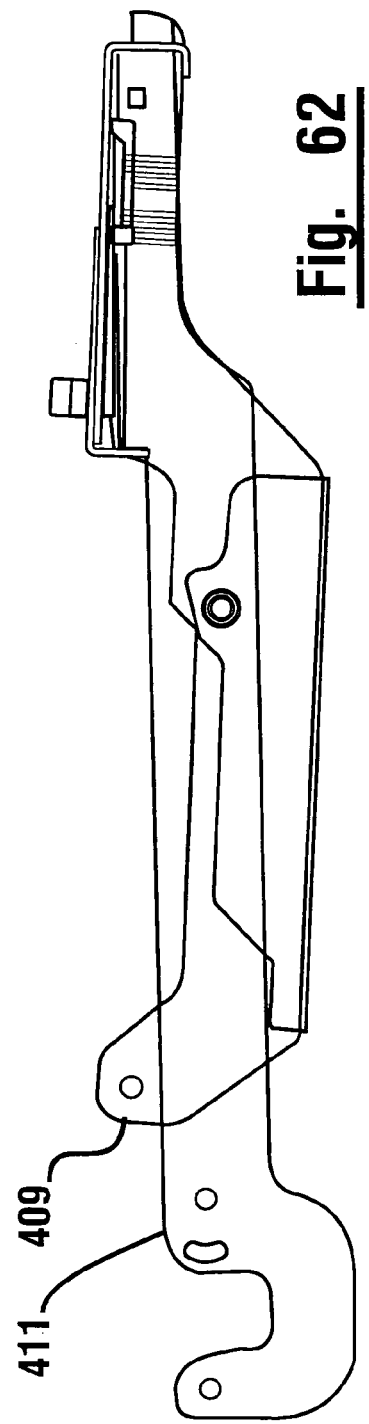
FIG. 62 shows an alternative view of the dual cam arm arrangement.

The gate 402 is movable in a substantially vertical (e.g., upward) direction. The gate is upwardly movable to a position behind a frame member (or portion) 404 of the presenter housing 421. The frame member 404 may be a plate attached to or integral with a security cover 405. The gate arrangement has at least one cam arm 408 operatively connected (or integral or one-piece) with the gate 402. The presenter housing 421 includes at least one actuator lever 410 having an angled slot 414. The lever 410 is linked with the arm 408. The arm 408 includes a projection 412 (e.g., shaft or bushing or pin) which is operative to ride or slide in the lever slot 414. An exemplary form of the gate arrangement includes two actuator levers 410, two (dual) arms 408 attached to the gate 402 at respective opposite sides thereof, and each arm 408 having a shaft 412 slidable in a respective lever slot 414. FIGS. 61 and 62 show a dual cam arm arrangement.

It should be understood that other gate arrangements for operating the gate 402 are within the scope of the invention. For example, a gate arrangement can comprise only one cam and one lever, instead of a pair. Another gate arrangement can have the slot angled differently. For example, contrary to shown slot 414, the higher end of the angled slot can be positioned further from the gate than the lower end. A further gate arrangement can include having the angled slot in the cam arm (instead of the lever), and having the shaft for riding in the slot on the actuator lever (instead of with the cam arm). Additional shaft/slot configurations may be used.

Figure 49:
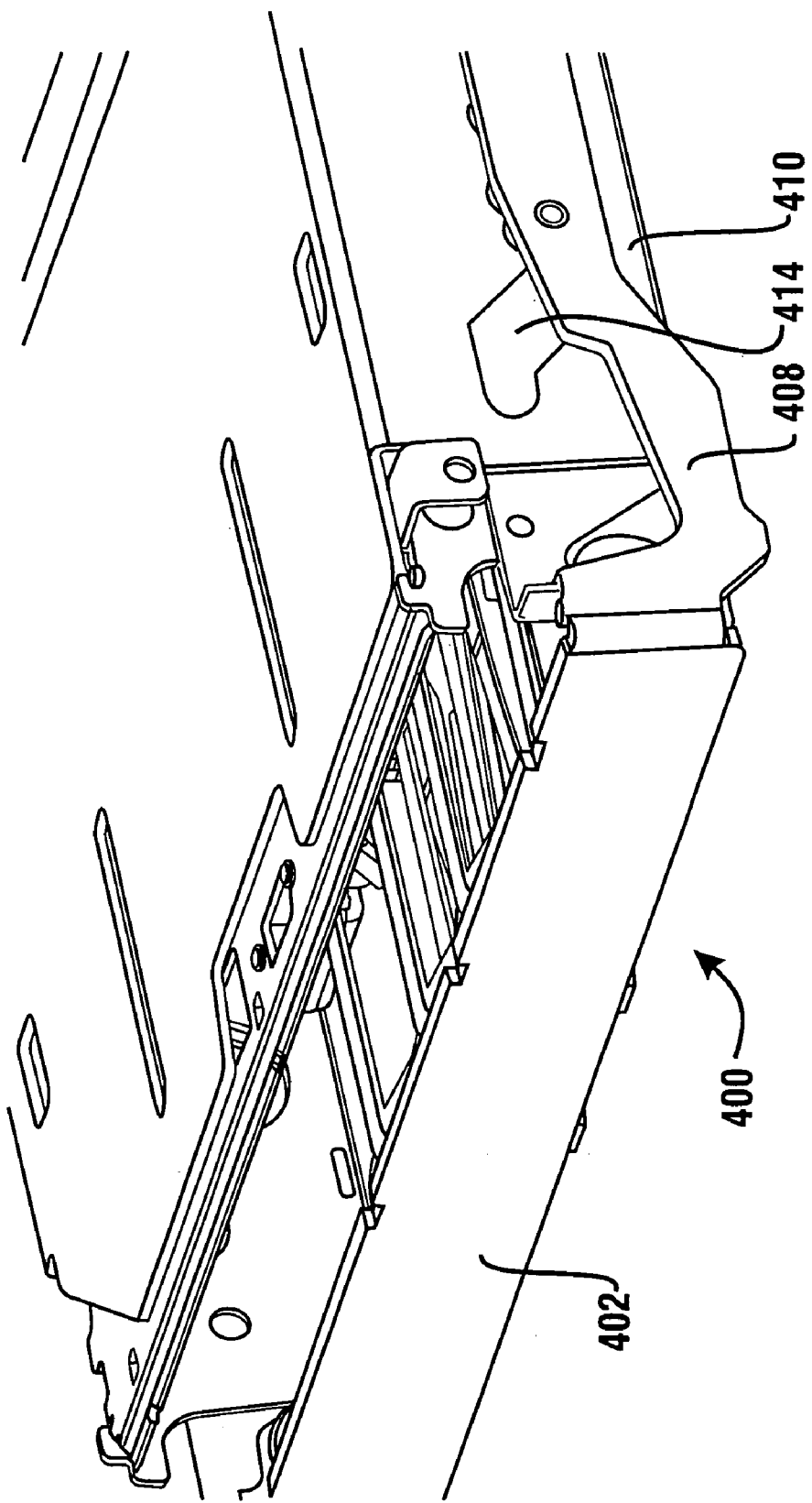
FIG. 49 shows an additional view of a gate in a closed position.

FIG. 49 shows an additional view of the gate 402 in a closed position. In FIG. 49 the frame member 404 has not been shown to provide additional clarity.

Figure 50:
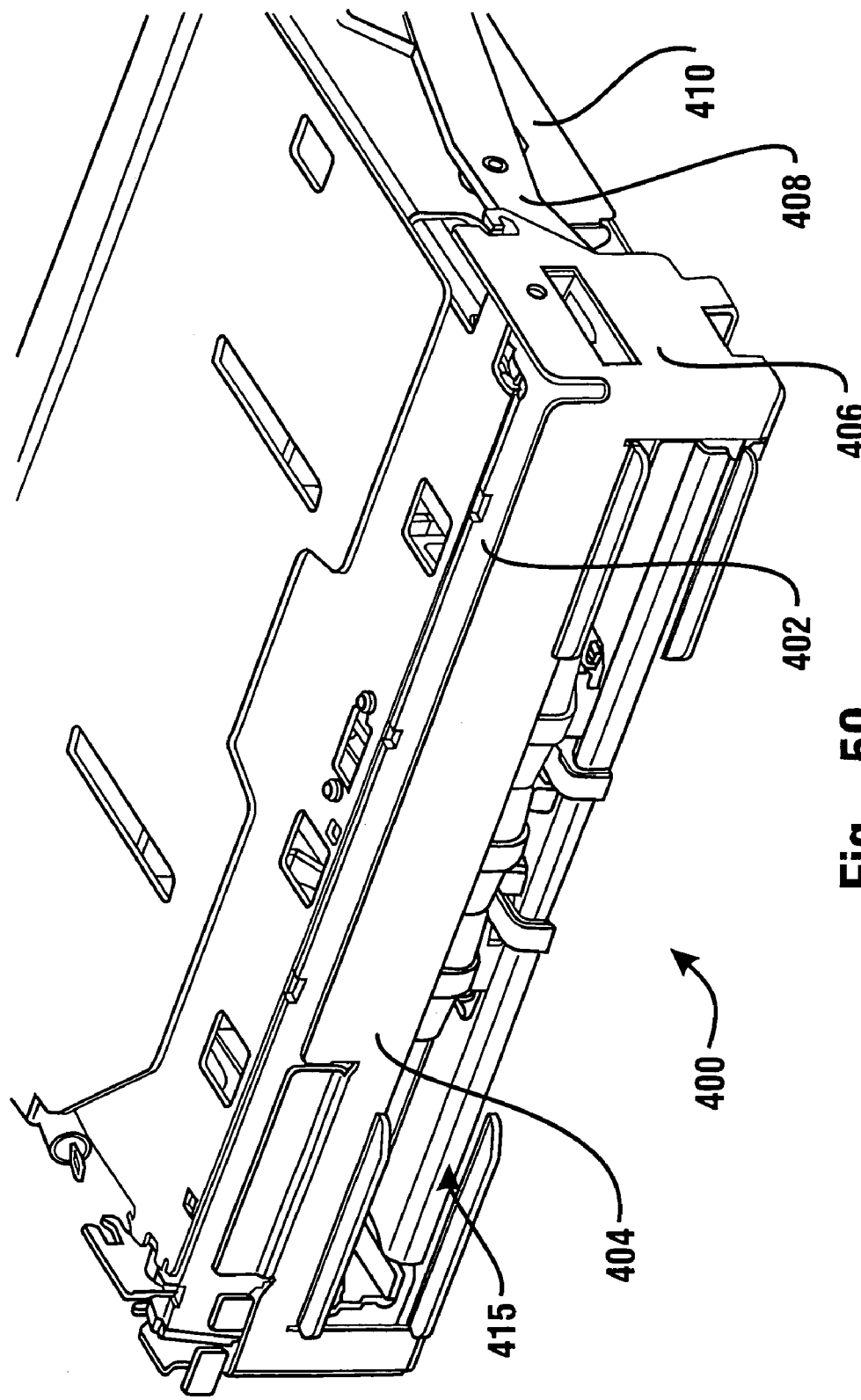
FIG. 50 shows a presenter gate arrangement with a gate in an open position.
Figure 51:
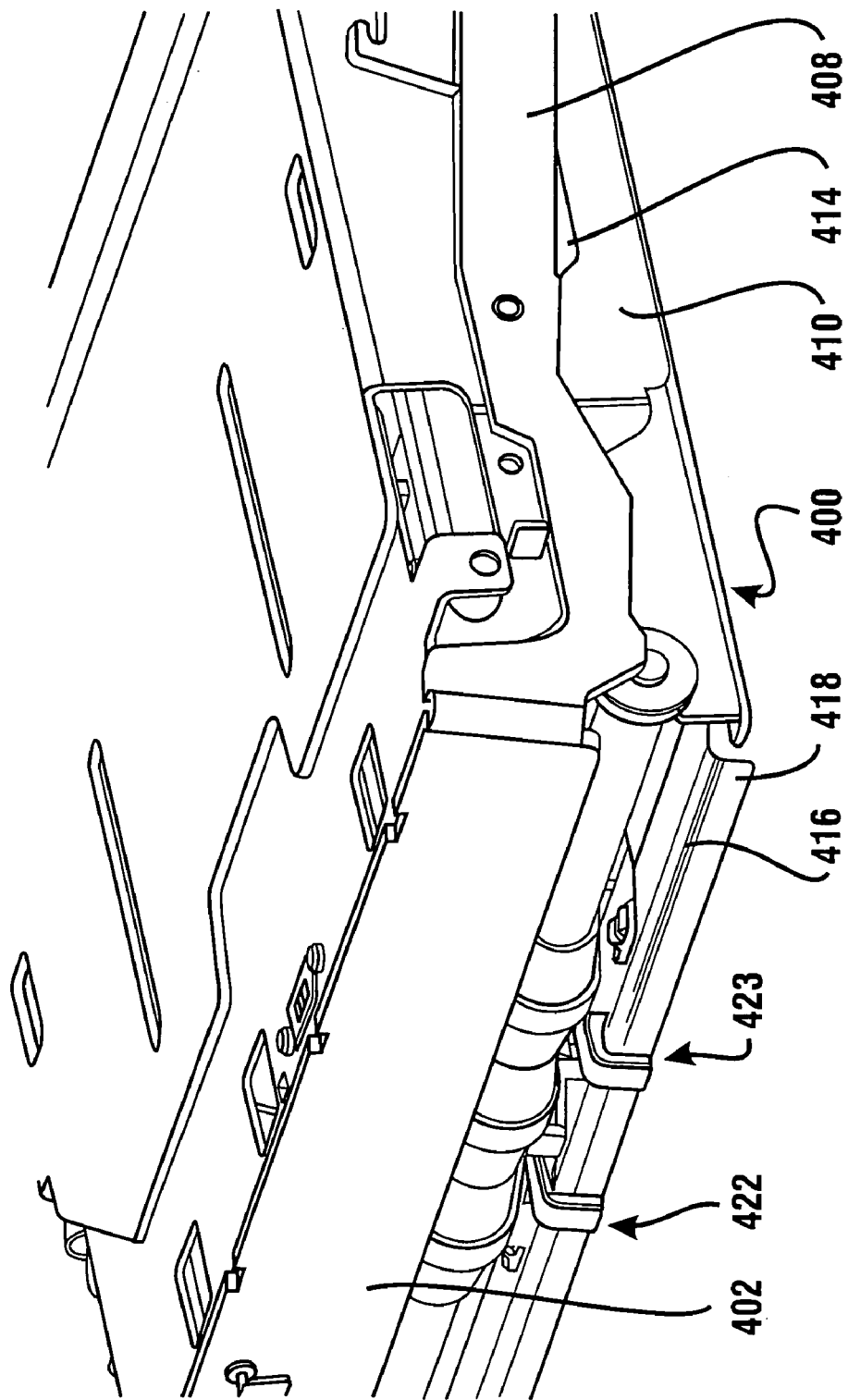
FIG. 51 shows an alternative view of a presenter gate in an open position.
Figure 52:
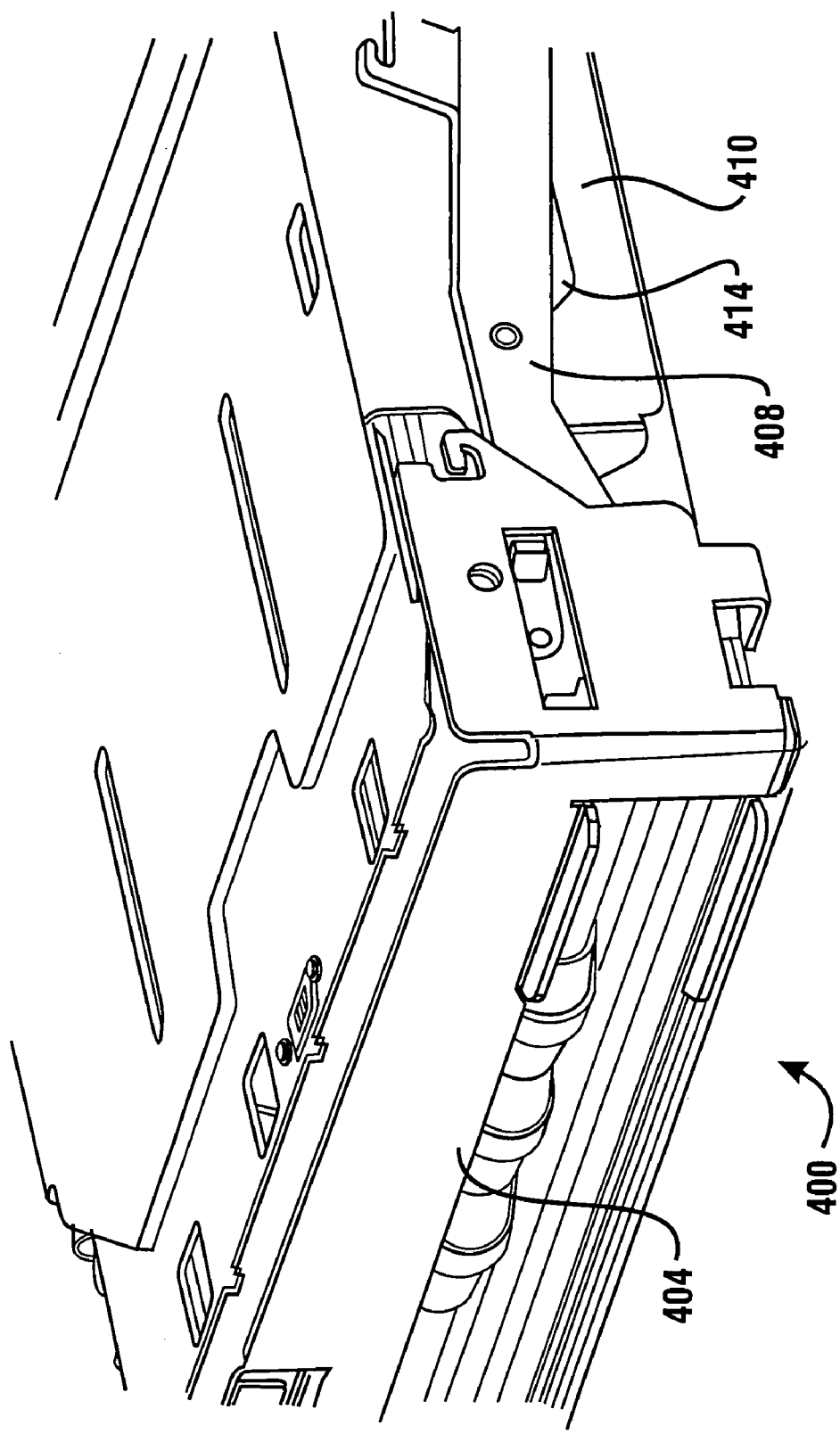
FIG. 52 shows another view of a presenter gate in an open position.
Figure 53:
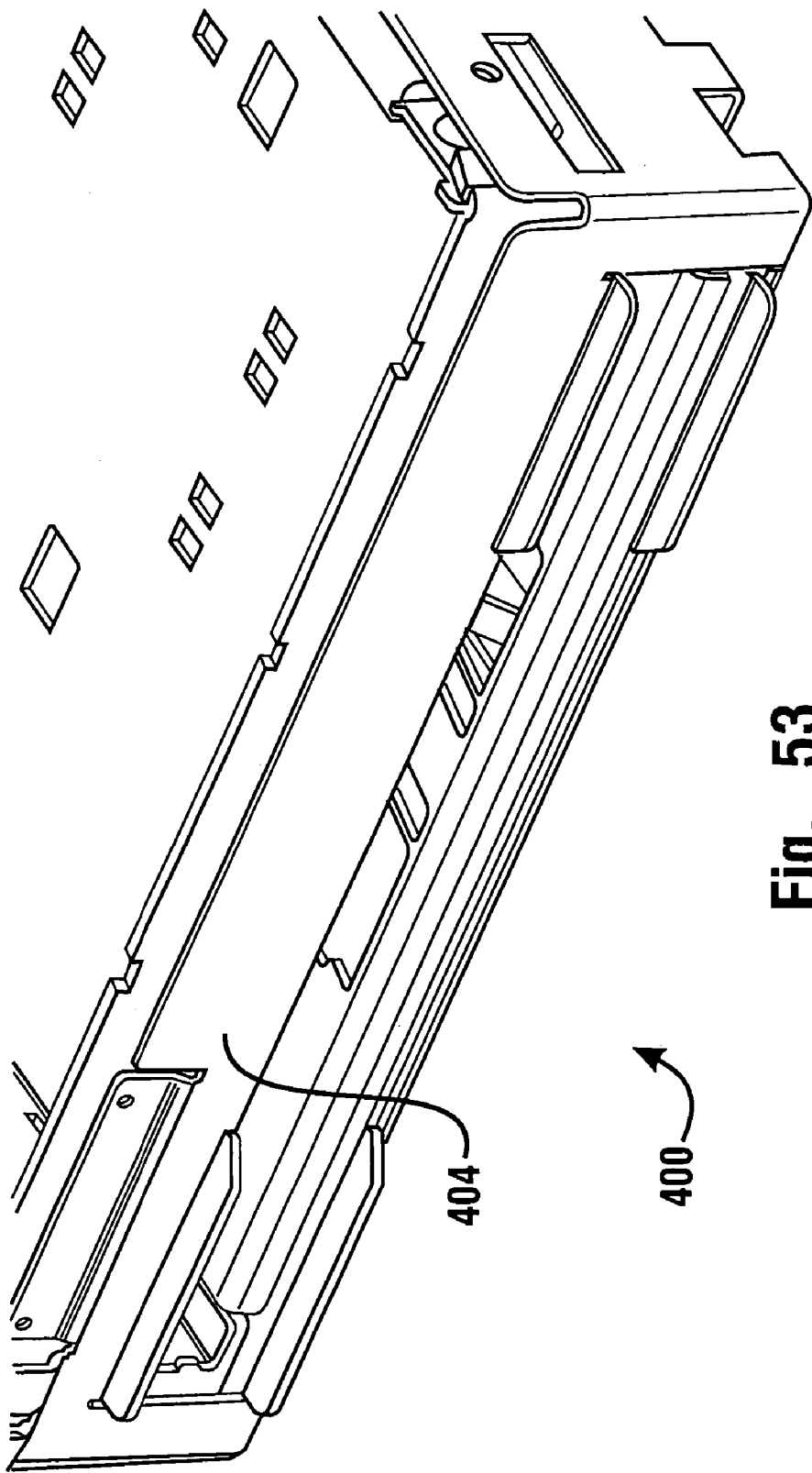
FIG. 53 shows a further view of a presenter gate in an open position.

FIG. 50 shows a view of the gate arrangement 400 with the presenter gate 402 in an open position. The gate 402 is partly hidden behind frame member 404. FIGS. 51–53 show alternative views of the gate arrangement 400 with the presenter gate in an open position. For clarity, not all of the gate arrangement components are shown in each of the Figures. For example, in FIG. 51 the frame member 404 has not been shown so that the gate 402 may be viewed in an upward open position.

During a gate opening procedure, axial actuation of the lever 410 (e.g., in a direction away from the gate) causes the gate arm shaft 412 to move upwardly along the angled slot 414. Movement of the shaft 412 up the slot 414 causes the end of the cam arm 408 adjacent to the gate 402 to pivot upwardly. The arm end is attached to the gate. Movement of the arm end upwardly causes the gate to also move upwardly. A note stack can be presented to a user when the gate is in an open position. The notes can pass through the open area or passage 415 created by the moved gate.

The actuator lever 410 can be used to drive the stack pusher device 390. The push device 390 and the lever 410 can be linked in a reverse drive arrangement. For example, the push device 390 can engage a drive chain, cable or rope connected to the lever 410. The chain can be arranged to travel about a pulley or roller. As the push device 390 moves toward the gate 402 it engages the drive chain. Further movement of the push device 390 causes the chain to move about the pulley. Movement of the chain results in the lever 410 being pulled in a direction away from the gate. The lever 410 can be spring-loaded to return to its original gate closing position.

Alternatively, the push device 390 and the lever 410 can be linked in a direct drive arrangement. Such direct drive is permitted, for example, by having the lever with the angled slot positioned with its higher end located further from the gate than its lower end. The push device 390 can directly engage and push the lever 410 toward the gate. As the lever 410 is pushed, the cam arm pin 412 rides up the angled slot causing the gate to open.

Other mechanisms can be used to drive a lever 410, such as a motor. If plural actuator levers 410 are used (e.g., one on each side of the presenter housing 421), then they may be linked so that they are commonly driven, such as by a common motor. Motor actuation of a lever 410 can be timed so that its gate opening operation corresponds with the arrival of a note stack. Position sensors can be used in the presenter 375 to indicate the arrival of a note stack. The sensors can notify a controller (e.g., computer) to cause the motor to open the gate. The lever(s) can be set to move a predetermined axial distance to ensure that the gate moves a predetermined vertical distance to completely open. The angled slot can also be of a predetermined angle and length to ensure proper gate movement.

In other exemplary arrangements the gate can be only partially opened based on the stack size (height). That is, the gate may not need to be fully opened to permit exit of a note stack. Other sensors or note counters can inform the controller the size of the note stack. The controller can determine the distance the gate should be opened to allow passage of the particular note stack. Based on the determined gate distance, the controller can further determine the corresponding distance that the lever needs to be moved. The controller can then cause the lever to be moved only the determined axial distance. The ability to open the gate only the necessary or minimum distance is an additional security feature of the presenter gate arrangement. The smaller the housing opening presented to a user, then the smaller the ability for tampering through the opening.

A portion of the gate can also be matingly arranged to move on an inner track or rail of the housing frame to guide and align the gate during its movement. The gate portion can also remain in the inner track when the gate is in a closed position.

The note presenter 375 has further security features to prevent and/or reduce unlawful tampering. As previously mentioned, the gate arrangement can include a security cover 405. The cover can include the (front) frame member 404 and side flange members 406. The note presenter 375 can be positioned in an ATM such that the gate 402 faces a customer accessible outlet opening in the ATM. The cover members 404, 406 can assist in preventing customer access to the inner components or workings of the presenter. The cover side flange member 406 can also prevent access to the cam arm 408, the actuator lever 410, and the connection between the gate 402 and the cam arm 408.

FIG. 51 shows a security plate 416 having an end with a flange lip 418 protruding downwardly. The lip 418 can prevent user entry into an area underneath the presenter. The opposite end of the security plate 416 may be attached at a location inside the presenter housing frame. The location being unattainable to a user. The opposite end may have a flange which fastens into a housing slot.

Figure 54:
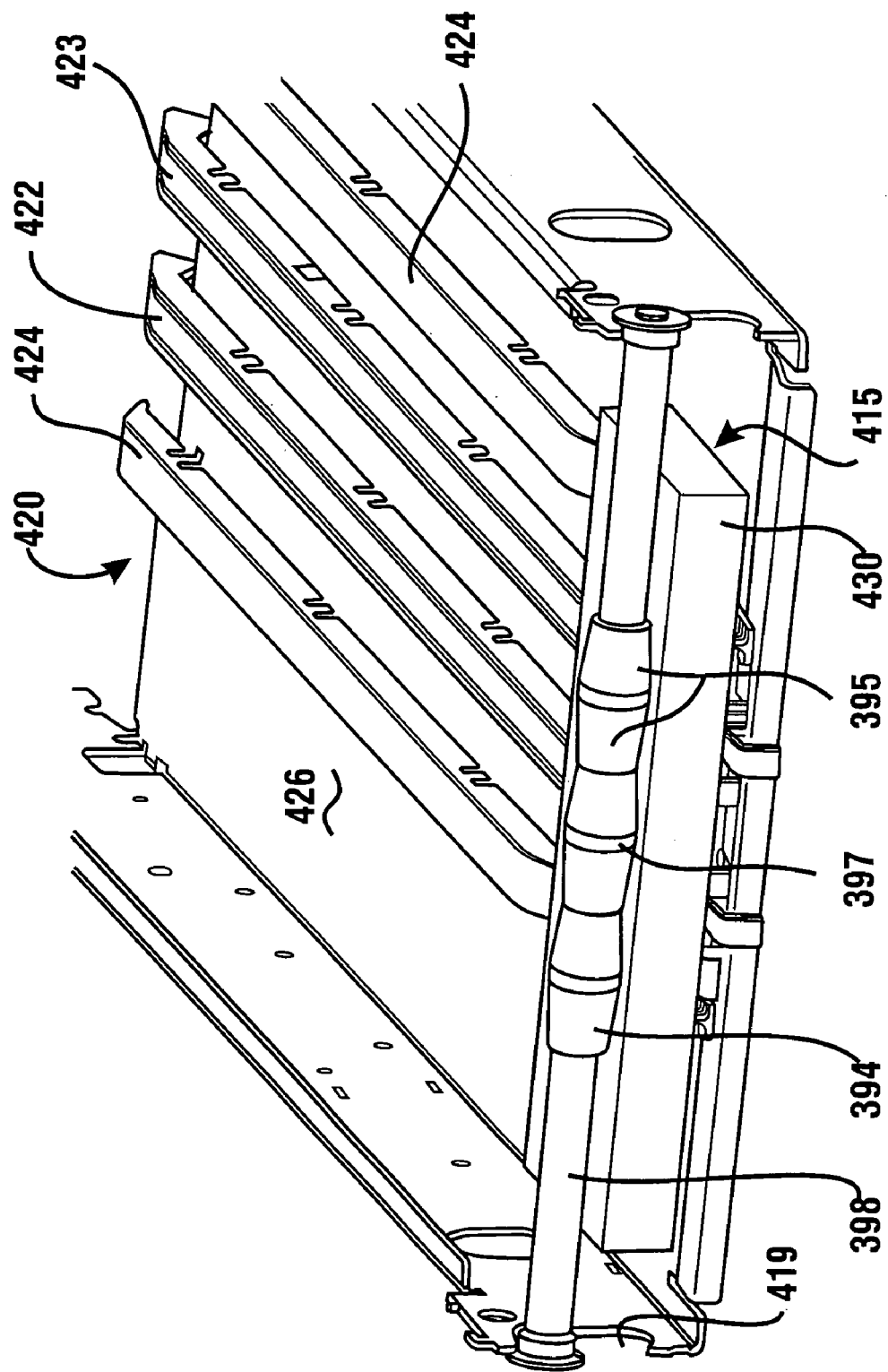
FIG. 54 shows a sheet stack adjacent to a presenter exit passage.
Figure 55:
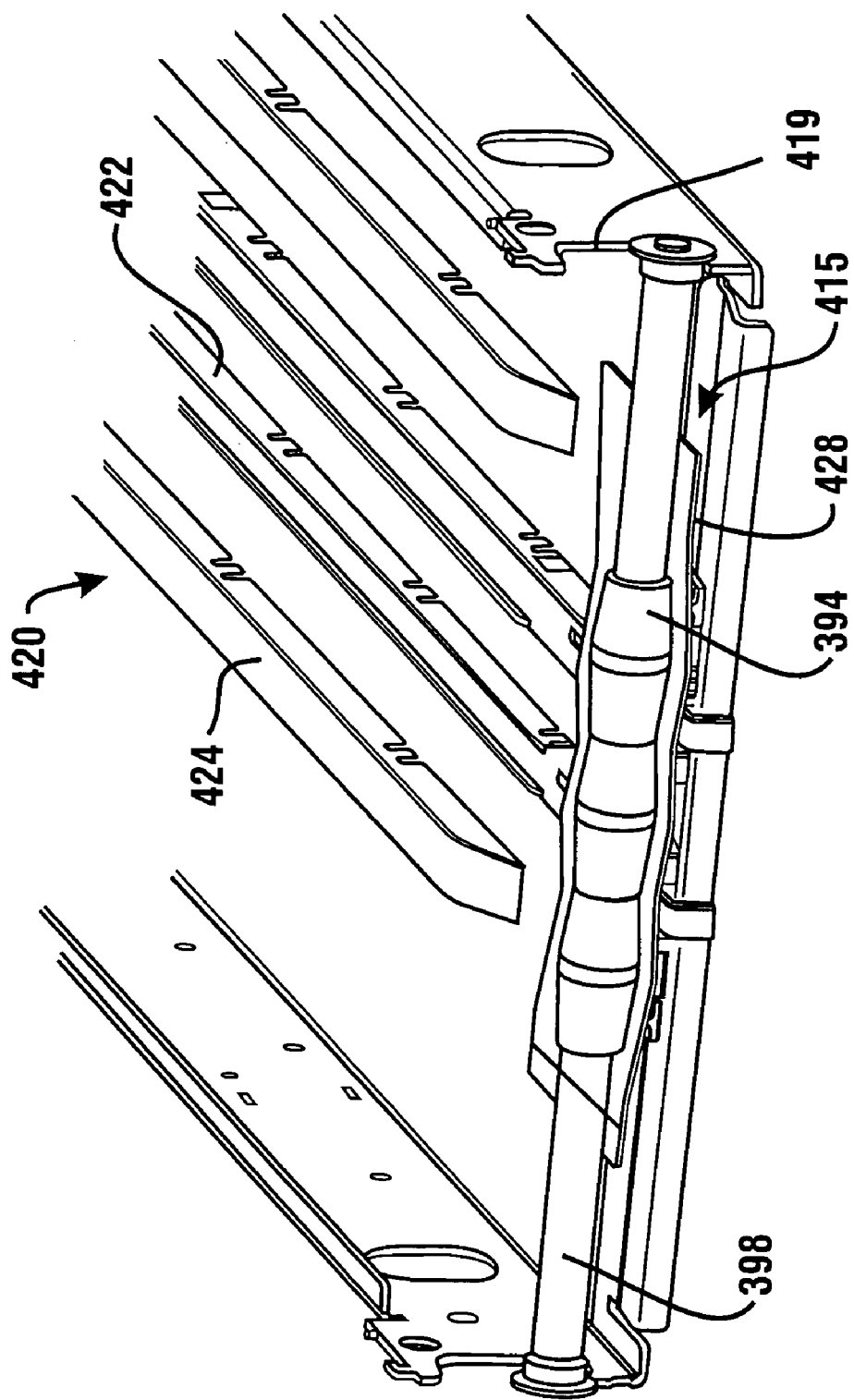
FIG. 55 shows an alternative sheet stack adjacent to a presenter exit passage.

As previously mentioned, the presenter floor rail arrangement 420 can include rails 422, 423, 424 on which a note stack can slide. A note stack may consist of a single note or a plurality of stacked notes. FIGS. 54–55 show another view of the presenter floor rail arrangement 420 having the outer rails 424 and the center rails 422, 423 adjacent the presenter floor 426. The center rails 422, 423 can have a greater length than the outer rails 424. The center rails 422, 423 can also have at least one flexible portion, the use of which is described hereinafter.

Figure 56:
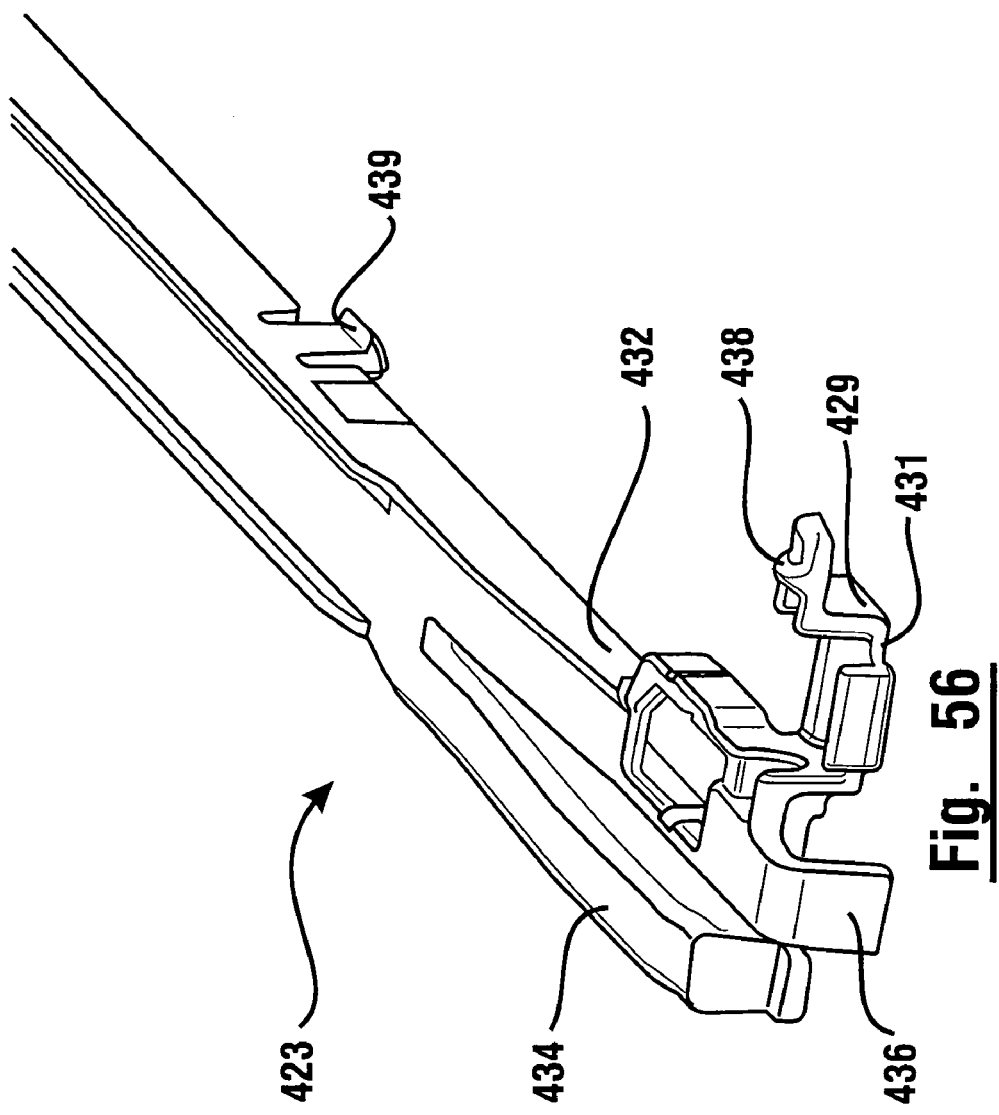
FIG. 56 shows a view of an end of a flexible rail.
Figure 57:
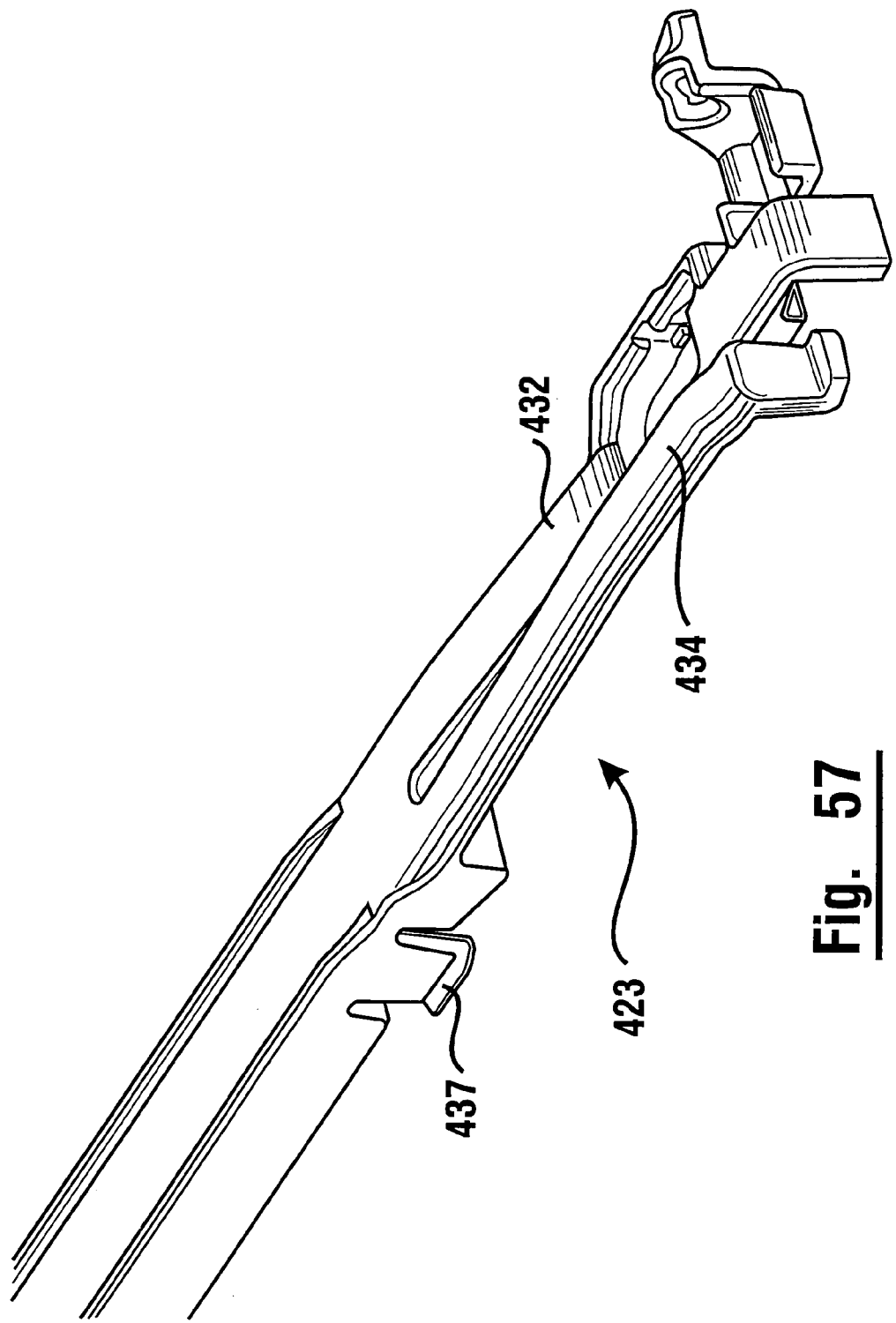
FIG. 57 shows an alternative view of the flexible rail.

FIGS. 56-57 show views of an end of the center rail 423. The shown end can be placed nearest to the note passage area 415. Each center rail has a rail end including both a flanged finger 432 and a flexible finger 434. The flexible finger 434 is able to twist (or rotate) relative to the remainder of the rail body 423. The flexible finger 434 can comprise a spring finger. The spring finger may impart an upward spring bias.

The roller shaft 398, previously discussed in regard to FIG. 47, is vertically movable relative to the rail fingers 432, 434. An exiting stack of notes passes between the rail fingers and the crowned rollers 394. FIG. 54 (and FIG. 59) shows a relatively large note stack 430 (e.g., plural stacked notes) adjacent to a crown roller shaft 398 and the note passage area 415. FIG. 55 (and FIG. 58) shows a view similar to FIG. 54 but with a relatively smaller note stack 428 (e.g., a single note) at the note passage area 415. FIGS. 54 and 55 show that the roller shaft 398 is vertically movable to permit the presentation of different sized note stacks. The ends of the roller shaft 398 can be movable in respective guide slots 419 in the presenter housing 421. The larger the stack, the further the roller shaft 398 is elevated. The roller shaft 398 can be arranged to rest in its lowermost slot position. The shaft 398 can be arranged to slide upward in the slots 419 to an elevation corresponding to the size of the note stack. The relationship of the belts 384, 386, 388 to a note stack can assist in raising (or pulling upward) the shaft 398.

As explained in more detail herein, the rail ends can form wave or waffle contours in sheets. A lip 436 of the flanged finger 432 can extend to overlap the previously discussed (e.g., FIG. 51) flanged lip 418 of the security plate 416. That is, an end of the center flexible rail 423 can project in a downward direction outside of the security lip 418. The flanged finger 432 can also include an extending transverse portion 431. The transverse portion 431 may be fastened to or integrally formed with the rail 423. The transverse portion 431 includes a vertical segment 429 having a raised hump 438 extending therefrom.

A process of securing a center rail 423 in the presenter can include having the flanged finger lip 436 tightly abutting the security lip 418 while the other end of the center rail is secured in the presenter housing adjacent to the note stacking tray 380. Furthermore, the rails (i.e., center and outer rails) can be held in place by having a plurality of spaced securing flanges 437, 439 positioned underneath corresponding tabs (e.g., spring tabs) on the presenter floor 426. When the gate 402 is in a closed state then the center rails 422, 423 and the security plate 416 are positioned behind the gate, and are protected from user access by the gate structure.

A stack of notes can be exited from the presenter in a relatively horizontal state. The flexible rails 422, 423 are operative, in conjunction with the crowned rollers 394, to produce a wavy (or "waffle") configuration to notes exiting the presenter. The center rail fingers 432, 434 are positioned opposite to the smaller diameter portion 395 of the crowned rollers 394. The spring fingers 434 are biased upward into the open gate area. The positional relationship of spring fingers 434 intermediate crowned rollers can cause a wave configuration to be imparted to notes and stacks exiting the presenter. The spring fingers can be aligned relative to the rollers 394 such that each spring finger 434 is aligned opposite a tapering portion 395. The raised hump portion 438 of the flanged finger 432 can also contribute to the "waffle" effect. The raised hump portion 438 can be aligned opposite the outer tapered portions of the outermost rollers.

The "waffle" effect on a note stack adds or causes stiffening to thin, flexible note stacks. This stiffening makes it easier to move a note stack through the note passage area 415. The stiffening can prevent the leading end of a note from drooping downward as it exits the crowned rollers. Contrarily, notes exiting from the presenter without the imparted wavy configuration would tend to immediately curl downward. Impartation of the wavy configuration to notes can reduce note jams and also increase security. An example of a wavy configuration imparted to a note stack 428 can be found in FIG. 55.

A spring finger 434 is operative to permit both large note stacks and single sheets to pass thereon. A large note stack 430 (due to the greater weight of the stack) can compress the spring finger downward against its spring force a distance greater than a smaller note stack 428 is capable. A heavy stack may even flatten (e.g., press the spring finger 434 to its lowest position) the waffle rail arrangement. However, a large stack of notes is less likely to immediately curl downward. That is, large note stacks may not require any wavy configuration. Nevertheless, the bottom note of a large stack would still contact the transverse portion 431. The arrangement of the rail fingers 432, 434 permits wavy impartation to those note stacks which are most in need of a wavy configuration. That is, the flexible rail fingers 432, 434, due to the greater vertical extension of the spring fingers 434, are operative to create a greater wavy impartation to a smaller (thinner) stack of notes. The amount of waviness created in a stack can be directly proportionate to the size of the note stack.

Figure 58:
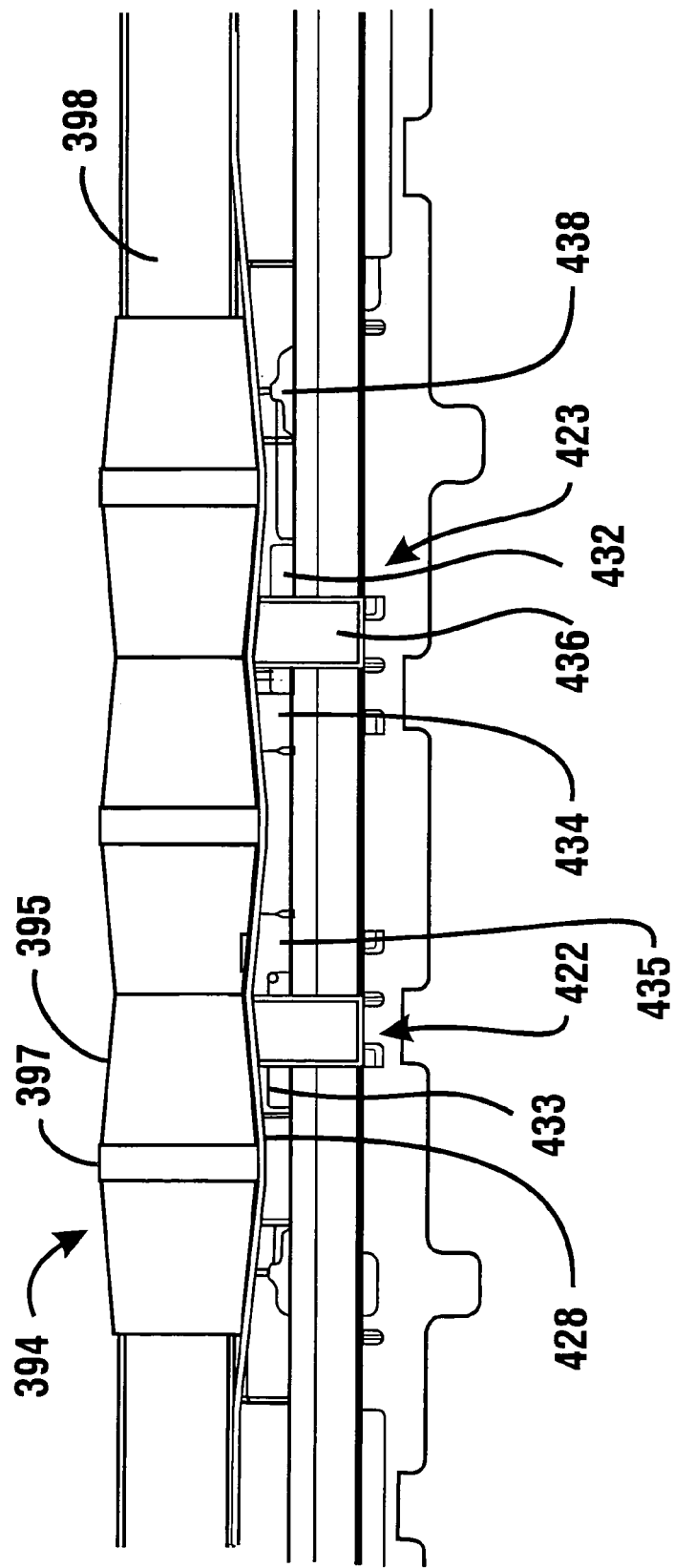
FIG. 58 shows a sheet stack receiving a wavy impartation.
Figure 59:
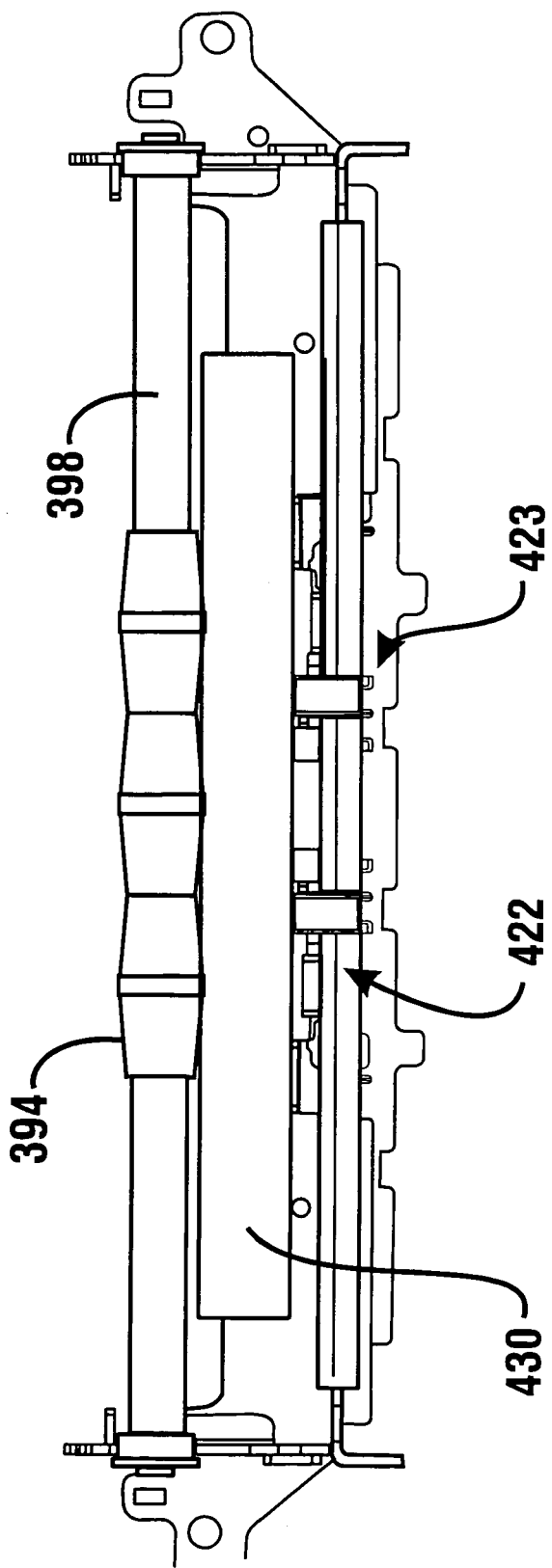
FIG. 59 shows an alternative sheet stack adjacent rail waffles.

FIGS. 58-59 show additional views of note stacks exiting a presenter. A crowned roller arrangement is also shown. The crowned roller 394 includes a convex taper 395 and a plateau 397. FIG. 58 shows a small note stack 428 (which may be a sole sheet) receiving a large wavy impartation. FIG. 59 shows a large note stack 430 receiving a small (if any) wavy impartation.

FIGS. 58 and 59 also show that fingers of the flexible rails 422, 423 can be differently positioned. For example, as shown in facing FIG. 58, rail 422 has its spring finger 435 to its right side, whereas rail 423 has its spring finger 434 to its left side. Thus, the spring fingers 434, 435 are intermediate the flanged fingers 432, 433. Other combinations of flanged finger and the spring finger arrangements can be used. For example, an arrangement of flexible rails may include rails having only the configuration of the rails 423.

Figure 60:
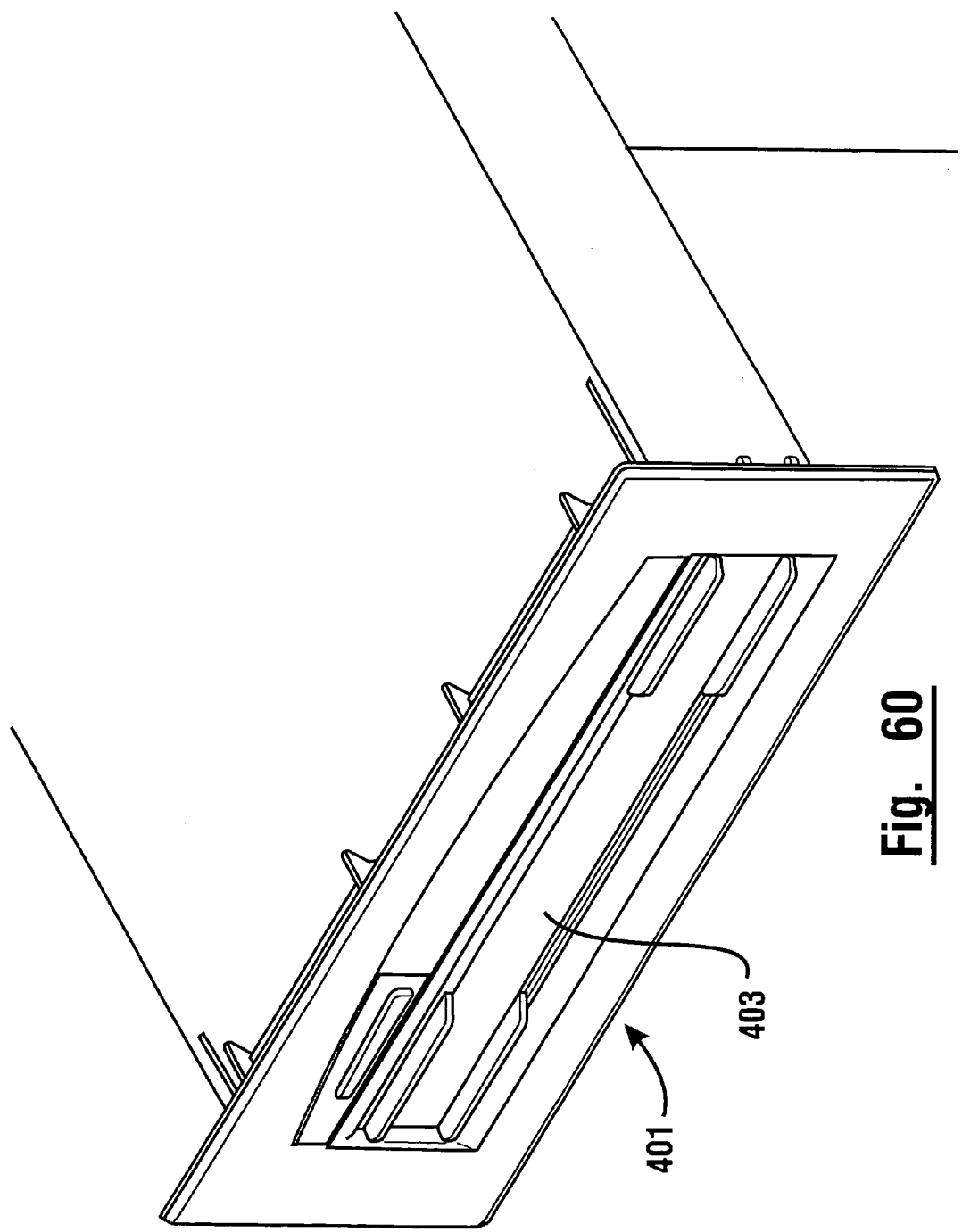
FIG. 60 shows an alternative view of a gate and a gate arrangement.

FIG. 60 shows an additional view of a presenter gate arrangement 401 having a gate 403 in a closed position.

FIGS. 61 and 62 show additional angled views taken from opposite sides of a dual cam arm arrangement. Cam arms 409, 411 are shown. An end of each cam arm includes a pivot point 413. The pivot point 413 can comprise a pivot pin or a pivot shaft hole. The cam arm is operative to pivot about the axis of the pivot point 413 as the cam arm pin 417 rides upward in the angled slot of an actuator lever.

Figure 63:
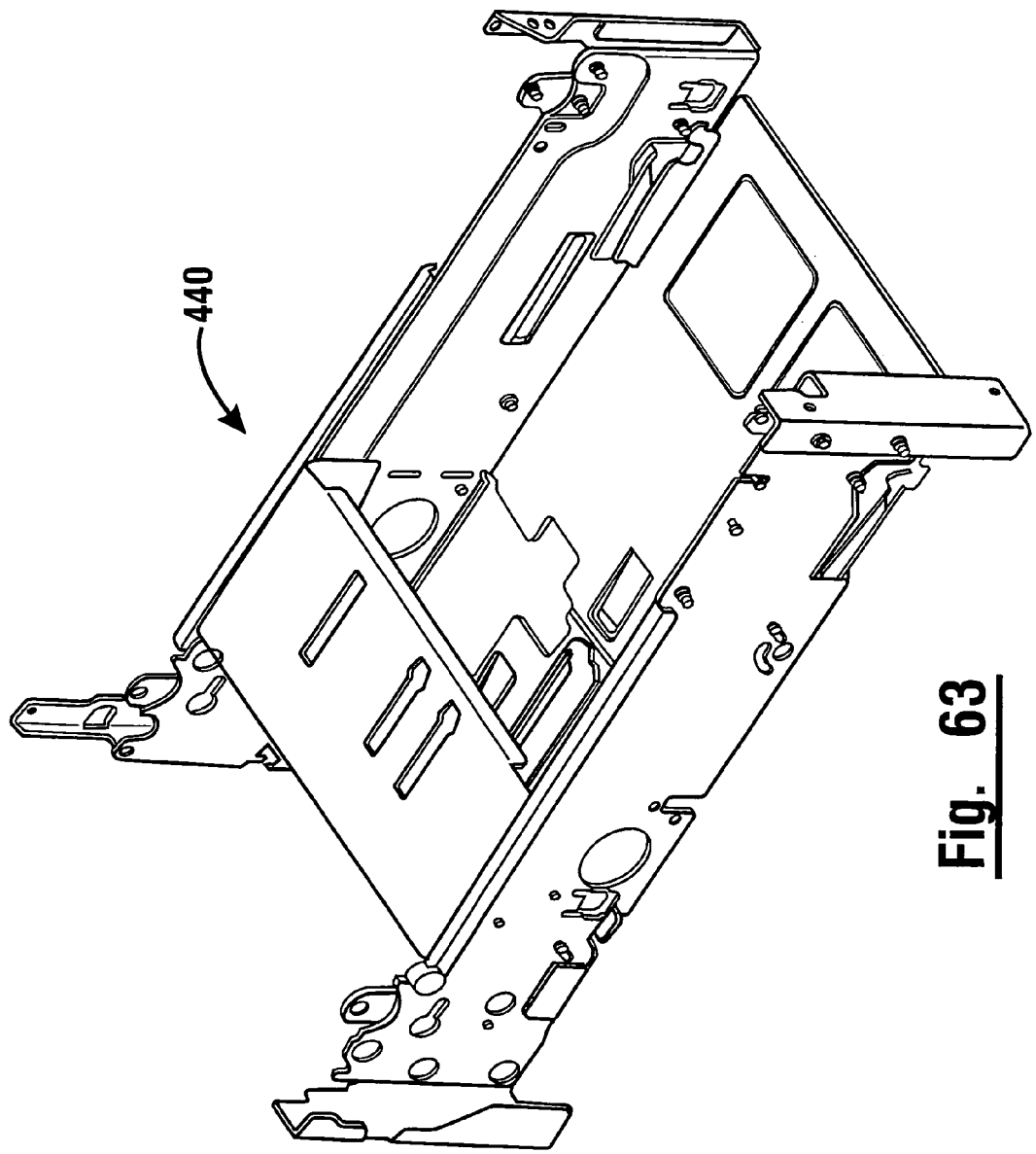
FIG. 63 shows a presenter frame shell.

FIG. 63 shows a perspective view of a shell 440 of a presenter housing frame.

Thus the exemplary embodiments achieve one or more of the above stated objectives, eliminates difficulties encountered in the use of prior devices and methods, solves problems, and attains the desired results described herein.

In the foregoing description certain terms have been used for brevity, clarity and understanding, however, no unnecessary limitations are to be implied therefrom because such terms are intended for descriptive purposes only and are intended to be broadly construed. Moreover, the descriptions and illustrations herein are by way of examples and the invention is not limited to the exact details shown and described.

In the following claims, any feature described as a means for performing a function shall be construed as encompassing any means known to those skilled in the art to be capable of performing the recited function and shall not be deemed limited to the particular structure shown herein or equivalents thereof.

Having described the features, discoveries and principles of the invention, the manner in which it is constructed and operated and the advantages and useful results attained; the new and useful structures, devices, elements, arrangements, parts, combinations, systems, operations, methods and relationships are set forth in the appended claims.

We claim:

1. Apparatus including:
   a media dispenser,
     wherein the dispenser is adapted for use in an automated banking machine,
     wherein the dispenser includes a sheet transport arrangement,
       wherein the transport arrangement includes a drive shaft having at least one drive roller in supporting connection therewith,
       wherein the transport arrangement includes an idle shaft having at least one idle roller in supporting connection therewith,
       wherein the idle shaft is spring loaded,
       wherein the transport arrangement includes at least one belt respectively supported on a drive roller and an idle roller,
         wherein the drive shaft is operative to drive the idle shaft via the at least one belt,
         wherein the idle shaft is movable relative to the drive shaft to maintain the at least one belt in a state of tension.

2. The apparatus according to claim 1 wherein the idle shaft is supported at each end in a respective slidable flange.

3. The apparatus according to claim 2 wherein the dispenser includes a housing having slots, wherein each flange is slidable in a respective slot.

4. The apparatus according to claim 2 wherein each flange is attached to a respective spring.

5. The apparatus according to claim 4 wherein each spring is attached to a flange at one spring end, and wherein each spring is attached to a slidable block at an opposite spring end.

6. The apparatus according to claim 1 wherein the idle shaft is associated with at least one ratchet device, wherein the at least one ratchet device prevents movement of the idle shaft toward the drive shaft.

7. The apparatus according to claim 1 wherein the drive rollers and idle rollers have a concave outer circumferential surface configuration.

8. The apparatus according to claim 1 wherein the drive rollers have a grooved outer circumferential surface.

9. The apparatus according to claim 8 wherein the idle rollers have a generally smooth outer circumferential surface relative to the grooved surface of the drive rollers.

10. The apparatus according to claim 1 wherein the dispenser includes a housing having a slotted opening, wherein an end of the drive shaft is removably mounted in the slotted opening.

11. The apparatus according to claim 10 wherein the dispenser includes a housing cover, wherein the cover in a closed position is operative to retain the end of the drive shaft in the slotted opening.

12. The apparatus according to claim 1 wherein the dispenser includes at least one guide roller adjacent the drive roller, wherein a guide roller extends at least partially between the drive roller and the idle roller, wherein the guide roller is operative to provide curvature to a belt supported on the drive roller and the idle roller.

13. The apparatus according to claim 1 wherein the transport arrangement is operative to transport currency notes intermediate the at least one belt and a transport wall, wherein the transport wall comprises aligned walls of stacked dispenser modules.

14. The apparatus according to claim 1 wherein the at least one belt comprises at least three belts.

15. The apparatus according to claim 1 wherein the media dispenser comprises a currency dispenser in an automated teller machine (ATM), wherein the currency dispenser contains currency notes therein.

16. The apparatus according to claim 1 wherein the transport arrangement comprises a currency note transport arrangement, wherein the currency note transport arrangement is operative to dispense currency notes from an automated teller machine (ATM).

17. A method carried out in connection with a media dispenser of an automated banking machine, wherein the media dispenser includes a sheet transport, wherein the sheet transport includes a drive shaft and at least one drive roller in supporting connection with the drive shaft, wherein the sheet transport includes an idle shaft and at least one idle roller in supporting connection with the idle shaft, wherein the sheet transport includes at least one belt, wherein in an operative condition of the sheet transport the at least one belt is in supporting connection with the at least one drive roller and the at least one idle roller, wherein the idle shaft is in operative connection with at least one spring, and wherein the idle shaft is movable relative to the drive shaft, the method comprising:
  (a) placing the at least one belt in supporting connection with at least one drive roller and at least one idle roller;
  (b) placing the at least one belt in a state of tension via the at least one spring;
  (c) rotating the drive shaft to drive the at least one belt;
  (d) responsive to (c), moving a sheet in engagement with the at least one belt;
  (e) moving the idle shaft away from the drive shaft via the at least one spring to maintain the at least one belt in a state of tension.

18. An apparatus including:
an ATM including a currency dispenser,
wherein the dispenser includes a dispenser housing,
wherein the dispenser includes a sheet transport arrangement,
  wherein the transport arrangement includes a drive shaft having at least three drive rollers thereon,
    wherein the drive rollers have a concave grooved outer circumferential surface configuration,
    wherein an end of the drive shaft is removably mounted in a slotted opening in the dispenser housing,
      wherein a housing cover in a closed position is operative to retain the end of the drive shaft in the slotted opening,
  wherein the transport arrangement includes a spring loaded driven shaft having at least three driven rollers thereon,
    wherein the driven rollers have a concave non-grooved outer circumferential surface configuration,
    wherein the driven shaft is supported at a first end in a first flange,
      wherein the first flange is attached to at least one first spring,
      wherein the first flange is slidable in a first slot in the dispenser housing,
    wherein the driven shaft is supported at a second end in a second flange,
      wherein the second flange is attached to at least one second spring,
      wherein the second flange is slidable in a second slot in the dispenser housing,
  wherein the transport arrangement includes at least three belts,
    wherein each belt is supported on both a drive roller and a driven roller,
      wherein the drive shaft is operative to drive the driven shaft via the belts,
      wherein the springs are operative to cause the driven shaft to move away from the drive shaft to maintain the belts in tension.

19. Method comprising:
  (a) placing at least one belt on a drive shaft and a spring loaded idle shaft of a media dispenser adapted for use in an automated banking machine, in a state of tension via the spring loading, wherein the drive shaft is operative to drive at least one idle roller in supporting connection with the idle shaft via the at least one belt, and wherein the drive shaft is in supporting connection with at least one drive roller;
  (b) rotating the drive shaft and moving the at least one belt; and
  (c) moving the idle shaft relative to the drive shaft via the spring loading to maintain the at least one belt in a state of tension.

20. The method according to claim 19 wherein the media dispenser includes a currency note transport arrangement, wherein the currency note transport arrangement is operative to dispense currency notes from an automated teller machine (ATM), wherein step (a) includes placing at least one belt of the currency note transport arrangement in a state of tension.

* * * * *